US006156966A

United States Patent [19]

Shinsky

[11] Patent Number: 6,156,966

[45] Date of Patent: Dec. 5, 2000

[54] FIXED-LOCATION METHOD OF COMPOSING AND PERFORMING AND A MUSICAL INSTRUMENT

[76] Inventor: Jeff K. Shinsky, 15531 Mira Monte, Houston, Tex. 77083

[21] Appl. No.: 09/119,870

[22] Filed: Jul. 21, 1998

Related U.S. Application Data

[63] Continuation of application No. 08/898,613, Jul. 22, 1997, Pat. No. 5,783,767, which is a continuation-in-part of application No. 08/531,786, Sep. 21, 1995, Pat. No. 5,650,584.

[60] Provisional application No. 60/020,457, Aug. 28, 1995.

[51] Int. Cl.[7] .............................. G10H 5/00; H02M 5/00

[52] U.S. Cl. ................................ 84/657; 84/613; 84/619; 84/669

[58] Field of Search ............................. 84/613, 619, 637, 84/650, 657, 669

[56] References Cited

U.S. PATENT DOCUMENTS

| | | | |
|---|---|---|---|
| 5,099,738 | 3/1992 | Hotz | 84/617 |
| 5,266,735 | 11/1993 | Shaffer et al. | 84/609 |
| 5,619,003 | 4/1997 | Hotz | 84/615 |
| 5,783,767 | 7/1998 | Shinsky | 84/657 |

*Primary Examiner*—Jeffrey Donels
*Attorney, Agent, or Firm*—Harrison & Egbert

[57] ABSTRACT

A method and apparatus for composing and performing music on an electronic instrument in which individual chord progression chords can be triggered in real-time, while simultaneously generating the individual notes of the chord, and/or possible scale and non-scale notes to play along with the chord, and making them available for playing in separate fixed-locations on the instrument. The method of composition involves the designation of a chord progression section on the instrument, then assigning chords or individual chord notes to this chord progression section according to a song key's defined customary scale or customary scale equivalent. Further, as each chord is played in the chord progression section, the individual notes of the currently triggered chords are generated and simultaneously made available for playing in a separate fixed location on the instrument. Fundamental and alternate notes of each chord may be generated and made available in separate fixed locations for composing purposes. Possible scale and/or non-scale notes, to play along with the currently triggered chord, can also be generated and simultaneously made available for playing in separate fixed locations on the instrument. All composition data can be stored in memory, or on a storage device, and can later be retrieved and performed by a user from a fixed location on the instrument, and on a reduced number of input controllers. Further, multiple instruments of the present invention can be utilized together to allow interaction among multiple users during composition and/or performance, with no knowledge of music theory required.

22 Claims, 44 Drawing Sheets

Set Scale Type to Y with root note N 16-80 16-82 16-84

| Weedout Table | | |
|---|---|---|
| Index | Corrected Note Off | New Note On |
| 0 | 76 (82)(55)(1) | 74 (82)(55)(1) |
| 1 | 79 (82)(55)(1) | 77 (82)(55)(1) |
| 2 | | 83 (82)(55)(1) |
| 3 | 83 (95)(55)(1) | 82 (95)(55)(1) |

16-86

16-88

Figure 16B

FIXED-LOCATION METHOD OF COMPOSING AND PERFORMING AND A MUSICAL INSTRUMENT

This is a continuation in part of application Ser. No. 08/898,613, filed Jul. 22, 1997, U.S. Pat. No. 5,783,767, which is a continuation in part of application Ser. No. 08/531,786, filed Sep. 21, 1995, U.S. Pat. No. 5,650,584, which claims the benefit of Provisional Application No. 60/020,457 Filed Aug. 28, 1995.

FIELD OF THE INVENTION

The present invention relates generally to a method of composing and performing music on an electronic instrument. This invention relates more particularly to a method and an instrument for composing in which individual chords and/or chord notes in a chord progression can be triggered in real-time. Simultaneously, other notes and/or note groups are generated, such as individual notes of the chord, scale, and non-scale notes which may be selectively played along with the chord and/or chord notes. These other notes are made available in separate fixed locations on the instrument. All composition data can later be retrieved and performed from a fixed location on the instrument on a reduced number of keys. Further, multiple instruments of the present invention can be utilized together to allow interaction among multiple users during composition and/or performance, with no knowledge of music theory required.

BACKGROUND OF THE INVENTION

A complete electronic musical system should have both a means of composing professional music with little or no training, and a means of performing music, whether live or along with a previously recorded track, with little or no training, while still maintaining the highest levels of creativity and interaction in both composition and performance.

Methods of composing music on an electronic instrument are known, and may be classified in either of two ways: (1) a method in which automatic chord progressions are generated by depression of a key or keys (for example, Cotton Jr., et al., U.S. Pat. No. 4,449,437), or by generating a suitable chord progression after a melody is given by a user (for example, Minamitaka, U.S. Pat. No. 5,218,153); (2) a method in which a plurality of note tables is used for MIDI note-identifying information, and is selected in response to a user command (for example, Hotz, U.S. Pat. No. 5,099, 738); and (3) a method in which one-finger chords can be produced in real-time (for example, Aoki, U.S. Pat. No. 4,419,916).

The first method of composition involves generating pre-sequenced or preprogrammed accompaniment. This automatic method of composition lacks the creativity necessary to compose music with the freedom and expression of a trained musician. This method dictates a preprogrammed accompaniment without user selectable modifications in real-time, either during composition or performance.

The second method of composition involves the use of note tables to define each key as one or more preselected musical notes. This method of using tables of note-identifying information is unduly limited and does not provide the professional results, flexibility, and efficiency achieved by the present invention.

The present invention allows any and all needed performance notes and/or note groups to be generated on-the-fly, providing many advantages. Any note or group of notes can now be auto-corrected during performance according to a generated note or note group, thus preventing incorrect notes from playing over the various chord and/or scale changes. Generating note groups on-the-fly allows every possible combination of harmonies, non-scale note groups, scale note groups, combined scale note groups, chord groups, chord inversions/voicings, note ordering, note group setups, and instrument setups to be accessible at any time, using only the current trigger status message, and/or other current triggers described herein, such as those which can be used for experimentation with chord and/or scale changes. A user is not limited to pre-recorded tables of note identifying information. This allows any new part to be added at any time, and musical data can be transferred between various instruments for unlimited compatibility and flexibility during composition and/or performance. Since all data is generated on-the-fly, the database needed to implement the system is minimal. The present invention also allows musically-correct one-finger chords, as well as individual chord notes, to be triggered with fill expression from the chord progression section while providing a user with indicators for playing specific chord progressions, in a variety of song keys.

The third method of composition allows a user to trigger one-finger chords in real-time, thus allowing a user some creative control over which chord progression is actually formed. Although this method has the potential to become an adequate method of composition, it currently falls short in several aspects. There are five distinct needs which must be met, before a person with little or no musical training can effectively compose a complete piece of music with total creative control, just as a trained musician would. Any series of notes and/or note groups can be generated on-the-fly simultaneously, and provided to a user as needed, utilizing only one set of triggers. This allows for unlimited system flexibility during composition and/or performance:

(1) A means is needed for assigning a particular section of a musical instrument as a chord progression section in which individual chords and/or chord notes can be triggered in real-time with one or more fingers. Further, the instrument should provide a means for dividing this chord progression section into particular song keys, and providing indicators so that a user understands the predetermined song key and chord progression number and/or relative position. For example a song in the key of E Major defines a chord progression 1-4-5, as described more fully below.

Shimaya, U.S. Pat. No. 5,322,966, teaches a designated chord progression section, but the chord progression section disclosed in Shimaya follows the chromatic progression of the keyboard, from C to B. Shimaya provides no allowance for dividing this chord progression section into particular song keys and scales. One of the most basic tools of a composer is the freedom to compose in a selected key. Another basic tool allows a musician to compose using specific chord progressions based on song key. As in the previous example, when composing a song in the key of E Major, the musician should be permitted to play a chord progression of 1-4-5-6-2-7-3, or any other progression chosen by the musician. The indicators provided by the present invention can also indicate relative positions in the customary scale and/or customary scale equivalent of a selected song key, thus eliminating the confusion between major song keys, and their relative minor equivalents.

In our culture's music, there are thousands of songs based on a simple 1-4-5 chord progression. Yet, most people with little or no musical training, and using known systems and methods, have no concept of the meaning of a musical key or a chord progression. The present invention also allows for the use of chromatics at the discretion of a user. The inexperienced composer who uses the present invention is made fully aware at all times of what he is actually playing, therefore allowing "non-scale" chromatic chords to be added by choice, not just added unknowingly.

(2) There also remains a need for a musical instrument that provides a user the option to play chords with one or more fingers in the chord progression section as previously described, while the individual notes of the currently triggered chord are simultaneously generated and made available for playing in separate fixed chord locations on the instrument. Individual notes can be sounded in different octaves when played. Regardless of the different chords which are being played in the chord progression section, the individual notes of each currently triggered chord can be generated and made available for playing in these same fixed chord location(s) on the instrument in real-time. The fundamental note and the alternate note of the chord can be made available in their own fixed locations for composing purposes, and chord notes can be reconfigured in any way in real-time for unlimited system flexibility.

This fixed chord location feature of the present invention allows a user with little or no musical training to properly compose a complete music piece. For example, by specifying this fixed chord location, and identifying or indicating the fundamental note and alternate note locations of each chord, a user can easily compose entire basslines, arpeggios, and specific chord harmonies with no musical training, while maintaining complete creative control.

(3) There also remains a need for a way to trigger chords with one or more fingers in the chord progression section, while scale notes and/or non-scale notes are simultaneously generated and made available for playing in separate fixed locations on the instrument. These scale notes and/or non-scale notes can also be played in different octaves. This method of generating scale and/or non-scale notes to be played from fixed locations on the instrument allows unlimited real-time system flexibility, during both composition and/or re-performance playback.

(4) There also remains a need for a way to trigger chords with one or more fingers in the chord progression section, while the entire chord is simultaneously generated and made available for playing from one or more keys in a separate fixed location, and can be sounded in different octaves when played. This feature allows a user to play right hand chords, inversions, the root position of a chord, and popular voicing of a chord at any time a user chooses and with dramatically reduced physical skill, yet retains the creativity and flexibility of a trained musician.

(5) Finally, there needs to be a means for adding to or modifying a composition once a basic progression and melody are decided upon and recorded by a user. A user with little or no musical training is thus able to add additional musically correct parts and/or non-scale parts to the composition, to remove portions of the composition that were previously recorded, or to simply modify the composition in accordance with the taste of the musician. The on-the-fly note generation methods of the present invention allows any note, series of notes, harmonies, note groups, chord voicings, inversions, instrument configurations, etc. to be accessible at any time by a user to achieve professional composition and/or re-performance results.

Techniques for automating the performance of music on an electronic instrument are also well known, and primarily involve the use of indication systems which display to a user the notes to play on the electronic instrument to achieve the desired performance. These techniques are primarily used as teaching aids of traditional music theory and performance (e.g., Shaffer et al., U.S. Pat. No. 5,266,735). These current methods provide high tech "cheat sheets". A user must follow along to an indication system and play all chords, notes, and scales just as a trained musician would. These methods do nothing to actually reduce the demanding physical skills required to perform the music.

There are three distinct needs which must be met before a person with little or no musical training can effectively perform music while maintaining the high level of creativity and interaction of a trained musician.

The first need involves performing music, such as melody lines, from a reduced number of keys in a fixed location. This technique dramatically reduces the amount of physical skill needed to perform music and/or melody lines. A user may perform a song at different skill levels. This allows an inexperienced user to play the melody of a song from a fixed location on the instrument without moving his hand. Additional notes, entire chords, and harmonies are also provided to allow a user to improvise just as a trained professional would, as well as for performance enhancement.

The second need involves playing all of the individual chord notes in a song's chord progression from a fixed location on the instrument. This dramatically reduces the amount of physical skill needed to perform music, while allowing a user total creative control in playing basslines, arpeggios, and chordal melodies from the fixed location.

The third need involves playing the entire chord in a song's chord progression with one or more keys from a fixed location on the instrument. This method also dramatically reduces the amount of physical skill needed to perform music, while still allowing a user total creative control in playing all inversions, chord voicings, and harmonies without moving his hand from the fixed chord location. The fixed location note generation methods of the present invention allow any previously recorded music to be played from a broad range of musical instruments, as well as with unlimited system flexibility due to all of the various notes, note groups, setup configurations, harmonies, etc. that are accessible to a user at any time.

It is a further object of the present invention to complete the system by allowing multiple instruments of the present invention to be effectively utilized together for interactive composition and/or performance among multiple users, with no need for knowledge of music theory, and while still maintaining the highest levels of creativity and flexibility that a trained musician would have. Users may perform together utilizing instruments connected directly into one other, connected through the use of an external processor or processors, connected over a network, or through various combinations of these.

SUMMARY OF THE INVENTION

There currently exists no such adequate means of composing and performing music with little or no musical training. It is therefore an object of the present invention to allow individuals to compose and perform music with dramatically reduced physical skill requirements and no need for knowledge of music theory while still maintaining the highest levels of creativity and flexibility that a trained musician would have. The fixed location methods of the present invention solves these problems while still allowing a user to maintain creative control.

These and other features of the present invention will be apparent to those of skill in the art from a review of the following detailed description, along with the accompanying drawings.

DETAILED DESCRIPTION OF A PREFERRED EMBODIMENT

The present invention is primarily software based and the software is in large part a responsibility driven object oriented design. The software is a collection of collaborating software objects, where each object is responsible for a certain function.

Figure 1A:
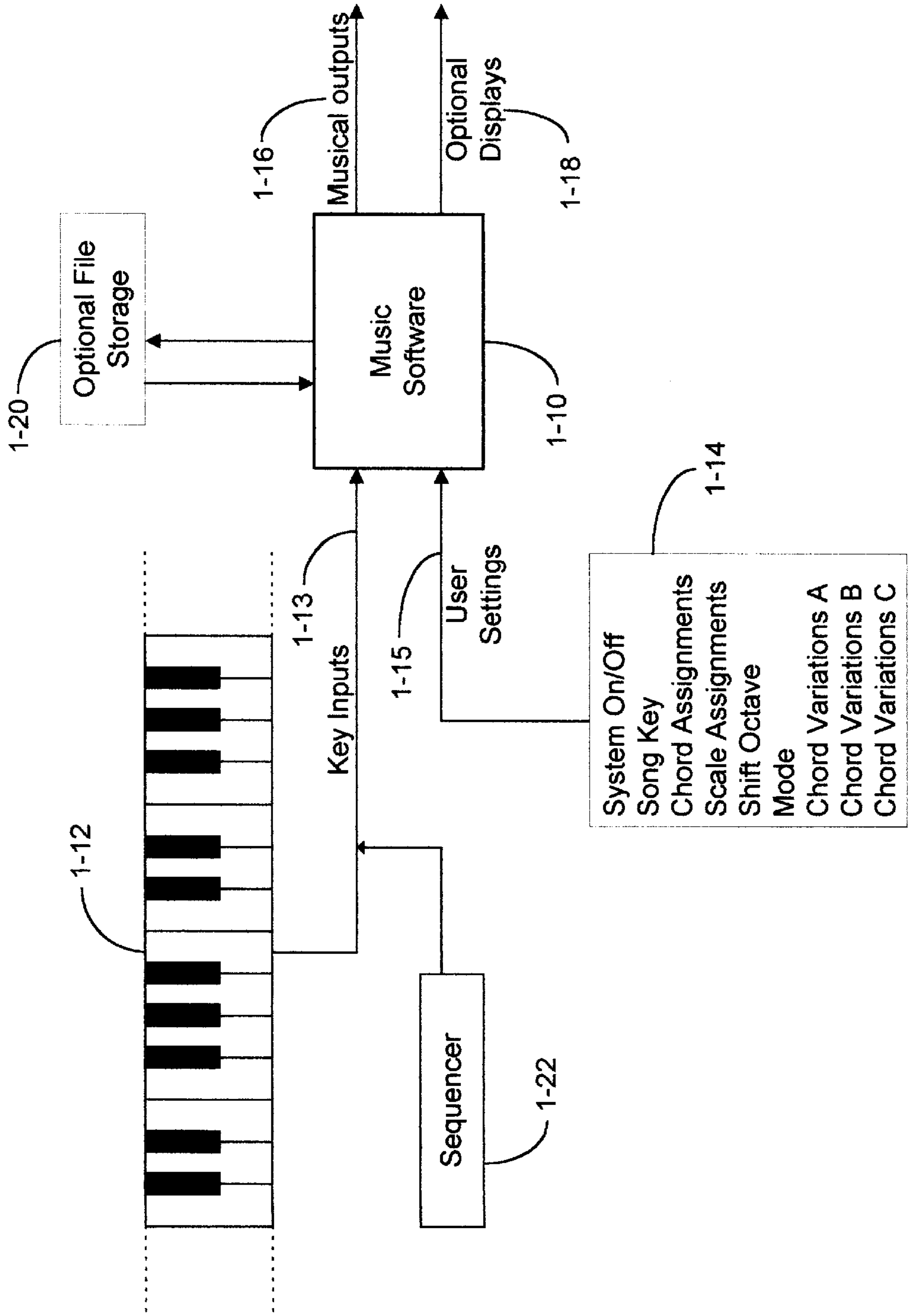
FIG. 1A is a schematic diagram of a composition and performance instrument of the present invention.
Figure 1B:
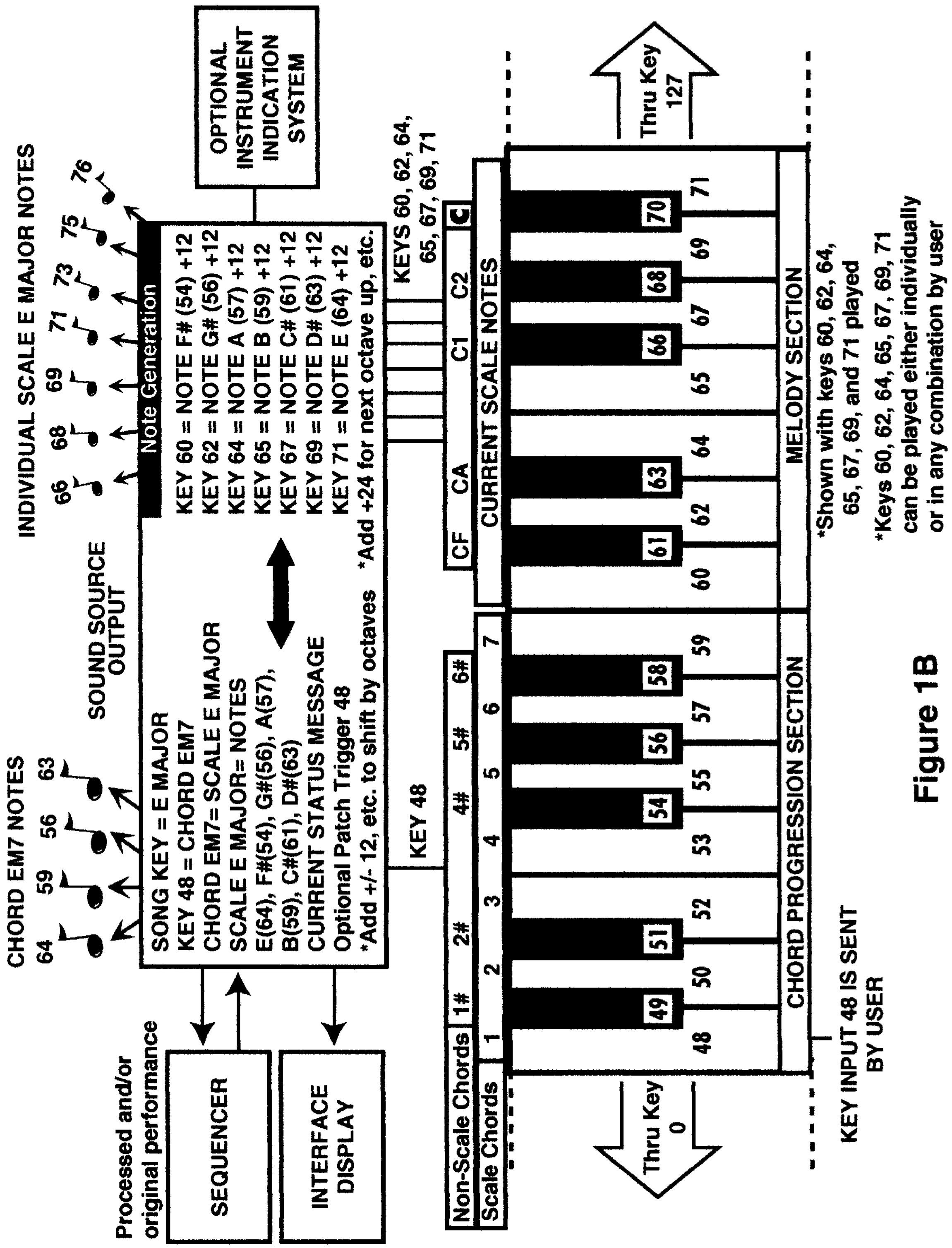
FIG. 1B is a general overview of the chord progression method and the fixed scale location method.
Figure 1C:
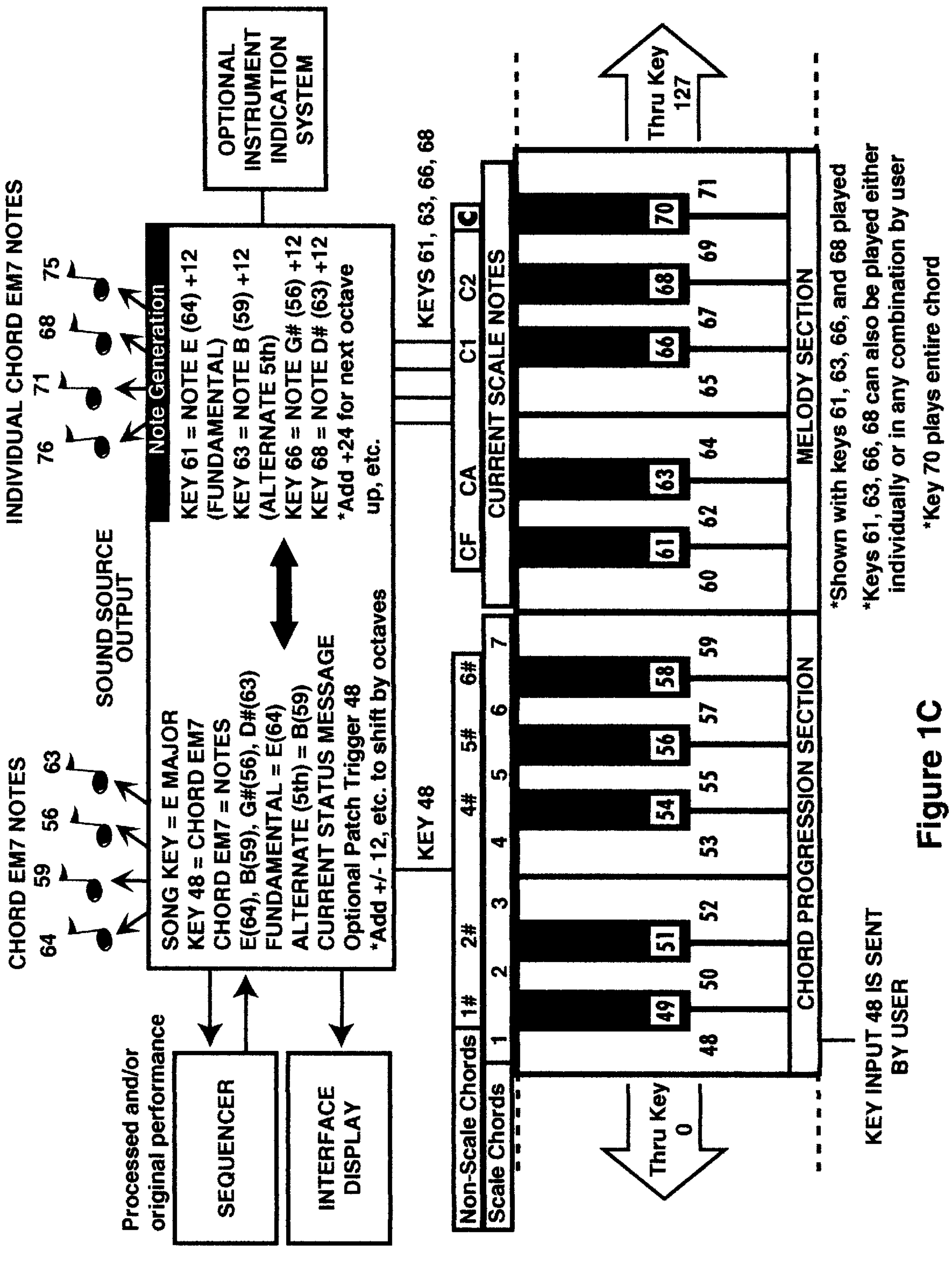
FIG. 1C is a general overview of the chord progression method and the fixed chord location method.
Figure 1D:
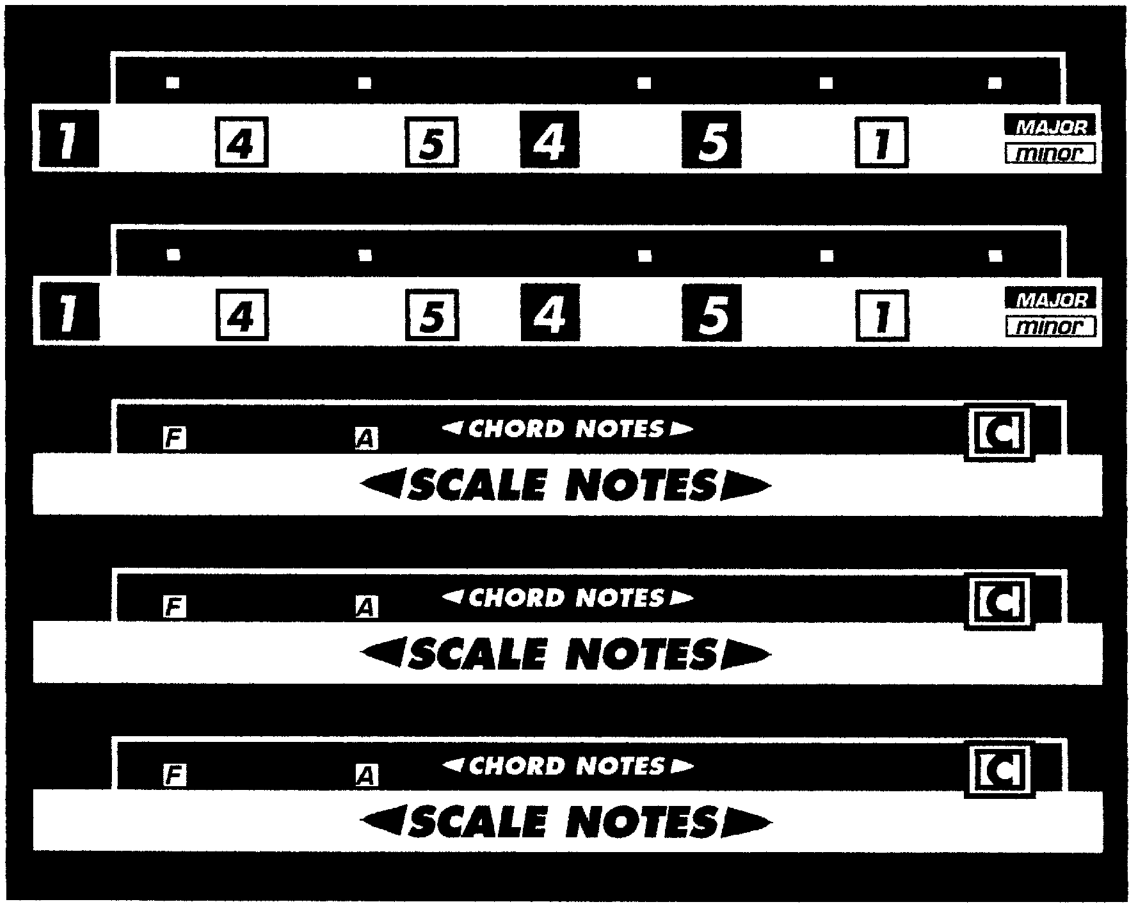
FIG. 1D is one sample of a printed indicator system which can be attached to or placed on the instrument.
Figure 2:
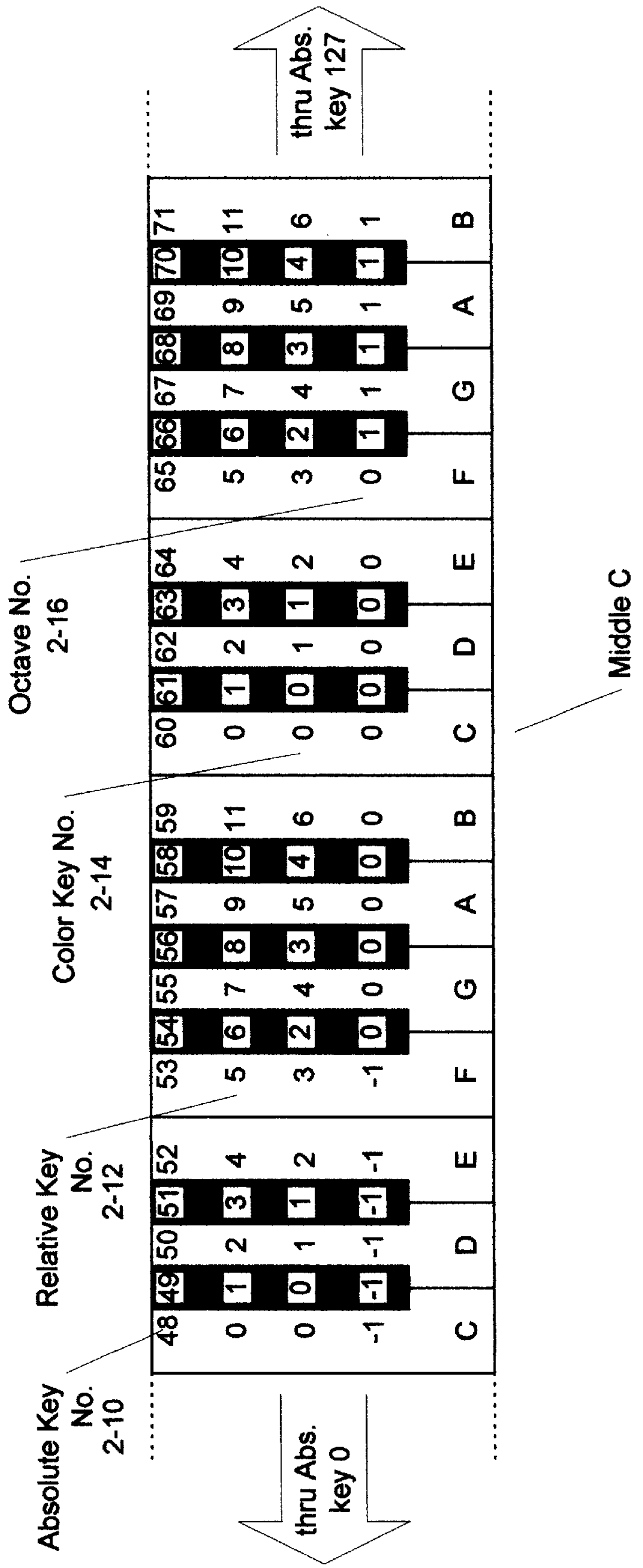
FIG. 2 is a detail drawing of a keyboard of the present invention defining key elements.
Figure 3:
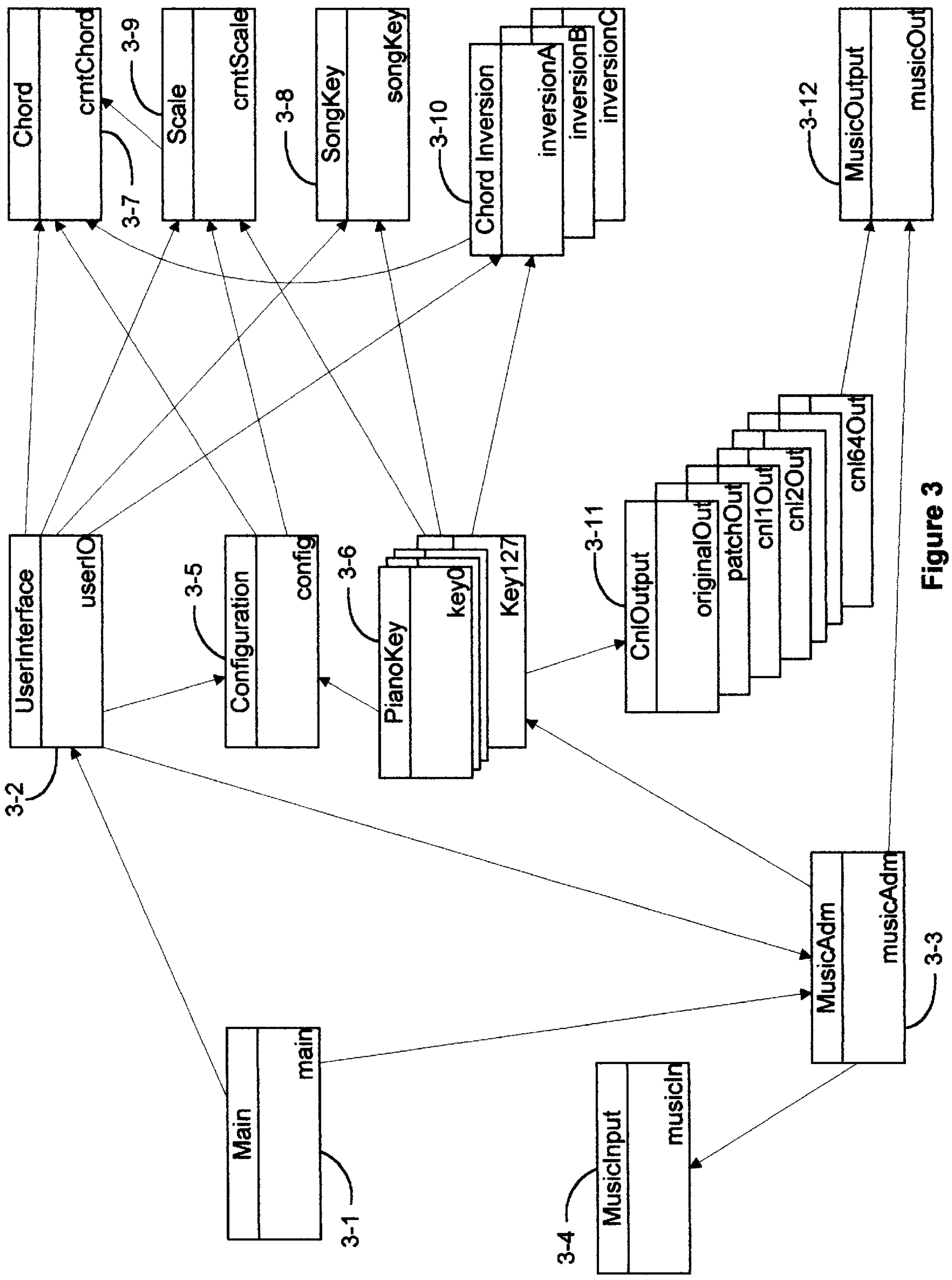
FIG. 3 is an overall logic flow block diagram of the system of the present invention.

For a more complete understanding of a preferred embodiment of the present invention, the following detailed description is divided to (1) show a context diagram of the software domain (FIG. 1A); (2) describe the nature of the musical key inputs to the software (FIG. 2); (3) show a diagram of the major objects (FIG. 3); (3) identify the responsibility of each major object; (4) list and describe the attributes of each major object; (5) list and describe the services or methods of each object, including flow diagrams for those methods that are key contributors to the present invention; and (6) describe the collaboration between each of the main objects.

Referring first to FIG. 1A, a computer 1-10 memory and processing elements in the usual manner. The computer 1-10 preferably has the music software program installed thereon. The music software program comprises an off-the shelf program, and provides computer assisted musical composition and performance software. This program accepts inputs from a keyboard 1-12 or other user interface element and a user-selectable set of settings 1-14. The keyboard 1-12 develops a set of key inputs 1-13 and the settings 1-14 provides a user settings input group 1-15

It should be appreciated that the keyboard may comprise a standard style keyboard, or it may include a computer keyboard or other custom-made input device, as desired. For example, gloves are gaining in popularity as input devices for electronic instruments. The computer 1-10 sends outputs to musical outputs 1-16 for tone generation or other optional displays 1-18. The optional displays 1-18 provide a user with information which includes the present configuration, chords, scales and notes being played (output).

The music software in the computer 1-10 takes key inputs and translates them into musical note outputs. This software and/or program may exist separately from its inputs and outputs such as in a personal computer and/or other processing device. As one example, the disclosed invention may comprise one or more input controllers used in conjunction with said computer and/or processing device. The software and/or program may also be incorporated along with its inputs and outputs as any one of its inputs or outputs, or in combination with any or all of its inputs or outputs. It is also possible to have a combination of these methods. All of these, whether utilized separately or together in any combination may be used to create the "instrument" as described herein.

The User settings input group 1-14 contains settings and configurations specified by a user that influence the way the software interprets the Key inputs 1-13 and translates these into musical notes at the musical outputs 1-16. The user settings 1-15 may be input through a computer keyboard, push buttons, hand operated switches, foot operated switches, or any combination of such devices. Some or all of these settings may also be input from the Key inputs 1-13. The user settings 1-15 include a System on/off setting, a song key setting, chord assignments, scale assignments, and various modes of operation.

The key inputs 1-13 are the principle musical inputs to the music software. The key inputs 1-13 contain musical chord requests, scale requests, melodic note requests, chord note requests and configuration requests and settings. These inputs are described in more detail in FIG. 2. The preferred source of the key inputs or input controllers is a digital electronic (piano) keyboard that is readily available from numerous vendors. This provides a user with the most familiar and conventional way of inputting musical requests to the software. The music software in the computer 1-10, however, may accept inputs 1-13 from other sources such as computer keyboards, or any other input controllers comprising various switching devices, which may or may not be velocity sensitive. A sequencer 1-22 or other device may simultaneously provide pre-recorded input to the computer 1-10, allowing a user to add another "voice" to a composition, and/or for re-performance.

The system may also include an optional non-volatile file storage device 1-20. The storage device 1-20 may be used to store and later retrieve the settings and configurations. This convenience allows a user to quickly and easily configure the system to a variety of different configurations. The storage device 1-20 may comprise a magnetic disk, tape, or other device commonly found on personal computers and other digital electronic devices. These configurations may also be stored in ROM or RAM to provide real-time setups from an input controller, user interface, or external device such as a CD, etc.

The musical outputs 1-16 provide the main output of the system. The outputs 1-16 contain the notes, or note identifying information representative of the notes, that a user intends to be sounded (heard) as well as other information, or musical data, relating to how notes are sounded (loudness, etc.). In addition, other data such as configuration and key inputs 1-13 are encoded into the output stream to facilitate iteratively playing back and refining the results. The present invention can be used to generate sounds by coupling intended output with a sound source, such as a computer sound card, external sound source, internal sound source, software-based sound source, etc. which are all known in the art. The sound source described herein may be a single sound source, or multiple sound sources acting as a unit to generate sounds of any or all of the various notes or note groups described herein. An original performance can also be output (unheard) along with the processed performance (heard), and recorded for purposes of re-performance, substitutions, etc. MIDI is an acronym that stands for Musical Instrument Digital Interface, an international standard. Even though the preferred embodiment is described using the specifications of MIDI, any adequate protocol could be used to accomplish the same results.

FIG. 2 shows how the system parses key inputs 1-13. Only two octaves are shown in FIG. 2, but the pattern repeats for all other lower and higher octaves. Each key input 1-13 has a unique absolute key number 2-10, shown on the top row of numbers in FIG. 2. The present invention may use a MIDI keyboard and, in such a case, the absolute key numbers are the same as the MIDI note numbers as described in the MIDI specification. The absolute key number 2-10 (or note number), along with velocity, is input to the computer for manipulation by the software. The software assigns other identifying numbers to each key as shown in rows 2 through 4 in FIG. 2. The software assigns to each key a relative key number 2-12 as shown in row 2. This is the key number relative to a C chromatic scale and ranges from 0–11 for the 12 notes of the scale. For example, every 'F' key on the keyboard is identified with relative number 5. Each key is also assigned a color (black or white) key number 2-14. Each white key is numbered 0–6 (7 keys) and each black key is numbered 0–4 (5 keys). For example, every 'F' key is identified as color (white) key number 3 (the 4th white key) and every 'F#' as color (black) key number 2 (the 3rd black key). The color key number is also relative to the C scale. The 4th row shown on FIG. 2 is the octave number 2-16. This number identifies which octave on the keyboard a given key is in. The octave number 0 is assigned to absolute key numbers 54 through 65. Lower keys are assigned negative octave numbers and higher keys are assigned positive octave numbers. The logic flow description that follows will refer to all 4 key identifying numbers.

FIG. 3 is a block diagram of the structure of the software showing the major objects. Each object has its own memory for storing its variables or attributes. Each object provides a set of services or methods (subroutines) which are utilized by other objects. A particular service for a given object is invoked by sending a message to that object. This is tantamount to calling a given subroutine within that object. This concept of message sending is described in numerous text books on software engineering and is well known in the art. The lines with arrows in FIG. 3 represent the collaborations between the objects. The lines point from the caller to the receiver.

Each object forms a part of the software; the objects work together to achieve the desired result. Below, each of the objects will be described independent of the other objects. Those services which are key to the present invention will include flow diagrams.

Figure 4:
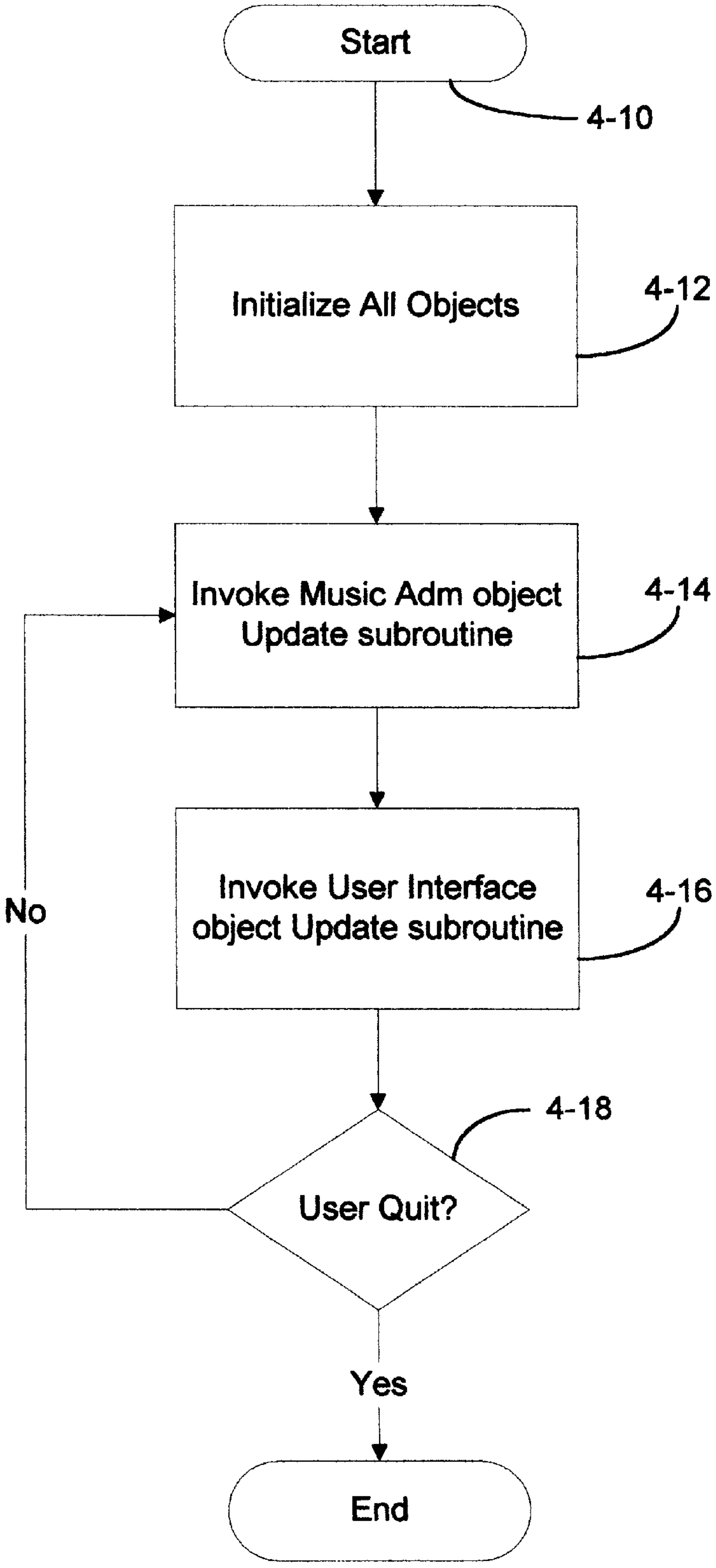
FIG. 4 is a high level logic flow diagram of the system.

The Main block 3-1 is the main or outermost software loop. The Main block 3-1 repeatedly invokes services of other objects. FIG. 4 depicts the logic flow for the Main object 3-1. It starts in step 4-10 and then invokes the initialization service of every object in step 4-12. Steps 4-14 and 4-16 then repeatedly invoke the update services of a Music Administrator object 3-3 and a User Interface object 3-2. The objects 3-3 and 3-2 in turn invoke the services of other objects in response to key (music) inputs 1-13 and user interface inputs. The user interface object 3-2 in step 4-18 determines whether or not a user wants to terminate the program.

Thus, the Main Object 3-1 calls the objects 3-3 and 3-2 to direct the overall action of the system and the lower level action of the dependent objects will now be developed.

Tables 1 and 2

Among other duties, the User Interface object 3-2 calls up a song key object 3-8. The object 3-8 contains the one current song key and provides services for determining the chord fundamental for each key in the chord progression section. The song key is stored in the attribute songkey and is initialized to C (See Table 2 for a list of song keys). The attribute circleStart (Table 1) holds the starting point (fundamental for relative key number 0) in the circle of 5ths or 4ths. The Get Key and Set Key services return and set the songkey attribute, respectively. The service 'SetMode()' sets the mode attribute. The service SetCircle Start() sets the circle Start attribute.

When mode=normal, the 'Get-Chord Fundamental for relative key number Y' determines the chord fundamental note from Table 2. The relative key number Y is added to the current song key. If this sum is greater than 11, then 11 is subtracted from the sum. The sum becomes the index into Table 2 where the chord fundamental note is located and returned.

The chord fundamentals are stored in Table 2 in such a way as to put the scale chords on the white keys (index values of 0, 2, 4, 5, 7, 9, and 11) and the non-scale chords on the black keys (index values 1, 3, 6, 8, and 10). This is also the preferred method for storing the fundamental for the minor song keys. Optionally the fundamental for the minor keys can be stored using the offset shown in Table 2's chord indication row, to allow either the major or its respective relative minor scale to be used to result in the same chord assignments. This is because a single given song key actually defines both a customary scale, and a customary scale equivalent, as shown in Table 2. Each major song key defines a "relative" minor scale equivalent, and each "relative" minor song key defines a major scale equivalent. This means that a chord for a given song key can be assigned which can represent a specific relative position in either its customary scale or its customary scale equivalent, when utilizing the offset shown in Table 2's chord indication row. A single song key, as described herein, can be conveyed to a user using the major song key name, relative minor song key name, or both, and a variety of different relative position indicator combinations can be provided. When using both, the song key shall still be considered a single song key, and a chord can be said to represent a specific relative position in the major song key's customary scale or customary scale equivalent. Optionally non-traditional song key names may be substituted for traditional song key names. Some examples of such non-traditional name substitutes are song keys 1-12, red song key, green song key, or blue song key, etc. Regardless of any substitute names and/or plurality of additional song key names (traditional or non-traditional) which may be conveyed to a user during song key selection, a selected song key corresponding to any given input controller will still define one customary scale and one customary scale equivalent which matches that defined by its customarily-named song key equivalent, said customarily-named song key equivalent will be readily apparent during performance due to the fact that customary song keys have developed over a period of centuries and are well known.

Regardless of how a chord is assigned to be performed from a fixed physical position as described herein, it can be said to represent a relative position in either the song key's customary scale, or in the song key's customary scale equivalent. Any number of the various indicators shown in Table 2 and described herein can be provided to a user, and in any combination and/or combinations. All indications such as relative position, scale or non-scale, song key name, etc. can be provided to a user by displaying them on an interface, such as a computer interface, LED, etc. or by providing them on or corresponding to the input controller itself, such as through printing, etching, molding, color-coding, design, etc. Said indicators may also be provided to a user which are intended to be attached or placed on or corresponding to any input controller, such as those which may comprise a printed indicator sheet or sheets, decals, LEDs, lighting systems, etc. They may be provided through the use of instructions or examples for the creation of said indicators, and/or through any description or illustration in a manual, etc. Those of ordinary skill in the art will recognize that all of the indicators described herein, can be provided to a user in a variety of combinations and ways.

It should be noted that the indicators which are actually provided to a user which are shown in Table 2, can be changed or varied to provide non-customary indicators, although not preferred. These non-customary indicators will identify a chord's non-customary relative position, but will not identify a customary relative position as defined by a song key's customary scale and/or customary scale equivalent. For example, the indicators for the popular chords 1-4-5 may be provided to user as 1-2-3, A-B-C, or color-coded, etc. or represented by certain icons or letters found on input controllers such as computer keyboards, and the like. These input controllers may be used to sound the specific chords and/or chord notes needed as described herein. Any indicator will do, so long as it conveys to a user a non-customary relative position. In order to reduce user-confusion, it is currently preferred not to use 6-2-3 as a 1-4-5 indication, when both major and relative minor chords are to be made available simultaneously. As an improvement to the usage of non-customary indicators, a description or explanation can be provided, such as in a manual or through some other means, describing which customary indicator equivalent each non-customary indicator represents, such as red, green, blue is equal to 1-4-5 chords, respectively. Any indicators provided to a user which will allow the user to consistently identify a chord's relative position during a performance will work, although the preferred method is to provide customary indicators which will allow a user to actually identify a chord's customary relative position as defined by a song key's customary scale and/or customary scale equivalent as described herein for purposes of learning, dramatic confusion reduction, and for communication with other musicians.

The methods of the present invention can also be used for other forms of music such as those using other customary scales, such as Indian scales, Chinese scales, etc., by carrying out all processing described herein relative to those other customary scales.

Sending the message 'Get chord fundamental for relative key number Y' to the song key object calls a function or subroutine within the song key object that takes the relative key number as a parameter and returns the chord fundamental. When mode=circle5 or circle4, the relative key number Y is added to circieStart and the fundamental is found in Table 2 in circle of 5th and circle of 4th rows respectively. The service 'GetSongKeyLable()' returns the key label for use by the user interface.

The service 'GetIndicationForKey(relativeKeyNumber)' is provided as an added feature to the preferred 'fixed location' method which assigns the first chord of the song key to the first key, the 2nd chord of the song key to the 2nd key etc. As an added feature, instead of reassigning the keys, the chords may be indicated on a computer monitor or above the appropriate keys using an alphanumeric display or other indication system. This indicates to a user where the first chord of the song key is, where the 2nd chord is etc. The service 'GetIndicationForKey(relativeKeyNumber)' returns the alpha-numeric indication that would be displayed. The indicators are in Table 2 in the row labeled 'Chord Indications'. The song key object locates the correct indicator by subtracting the song key from the relative key number. If the difference is less than 0, then 12 is added. This number becomes the table index where the chord indication is found. For example, if the song key is E MAJOR, the service GetIndicationForKey(4) returns indication '1' since 4 (relative key)−4 (song key)=0 (table index). GetIndicationForKey(11) returns '5' since 11 (relative key)−4 (song Key)=7 (table index) and GetIndicationForKey(3) returns '7' since 3(relative key)−4 (song key)+12=11 (table index). If the indication system is used, then the user interface object requests the chord indications for each of the 11 keys each time the song key changed. The chord indication and the key labels can be used together to indicate the chord name as well (D, F#, etc.)

TABLE 1

| SongKey Object Attributes and Services |
|---|
| attributes: |
| 1. songKey |
| 2. mode |
| 3. circleStart |

TABLE 1-continued

| SongKey Object Attributes and Services |
|---|
| Services:<br>1. SetSongKey(newSongKey);<br>2. GetSongKey(); songKey<br>3. GetChordFundamental(relativeKeyNumber): fundamental<br>4. GetSongKeyLabel(); textLabel<br>5. GetIndicationForKey(relativeKeyNumber); indication<br>6. SetMode(newMode);<br>7. setCircleStart(newStart) |

plus the offset for the Alt note in step 5-4. If the sum of the fundamental note and the offset for the Alt note is greater than 65, then the Alt note is set to the sum of the fundamental note plus the offset of the Alt note minus 12 in step 5-5. Subtracting 12 yields the same note one octave lower.

Similarly, the C1 and C2 notes are generated in steps 5-6 through 5-11. For example, if this service is called requesting to set the current chord to type D Major (X=0, Y=62), then the current chord type will be equal to 0, the fundamental note will be 62 (D), the Alt note will be 57 (A, 62+7−12), the C1 note will be 54 (F#, 62+4−12) and the C2 note also be 54 (F#, 62+4−12). New chords may also be added simply by extending Table 4, including chords with more than 4 notes. Also, the current chord object can be

TABLE 2

Song key and Chord Fundamental

| Table Index | 0 | 1 | 2 | 3 | 4 | 5 | 6 | 7 | 8 | 9 | 10 | 11 |
|---|---|---|---|---|---|---|---|---|---|---|---|---|
| Song Key | C | C# | D | D# | E | F | F# | G | G# | A | A# | B |
| Song Key attribute | 0 | 1 | 2 | 3 | 4 | 5 | 6 | 7 | 8 | 9 | 10 | 11 |
| Chord Fundamental | 60 | 61 | 62 | 63 | 64 | 65 | 54 | 55 | 56 | 57 | 58 | 59 |
| Circle of 5ths | C | G | D | A | E | B | F# | C# | G# | D# | A# | F |
| | (60) | (55) | (62) | (57) | (64) | (59) | (54) | (61) | (56) | (63) | (58) | (65) |
| Circle of 4ths | C | F | Bb | Eb | Ab | Db | Gb | B | E | A | D | G |
| | (60) | (65) | (58) | (63) | (56) | (61) | (54) | (59) | (64) | (57) | (62) | (55) |
| Key Label | C | C# | D | D# | E | F | F# | G | G# | A | A# | B |
| Chord indication | ‘1’ | ‘1#’ | ‘2’ | ‘2#’ | ‘3’ | ‘4’ | ‘4#’ | ‘5’ | ‘5#’ | ‘6’ | ‘6#’ | ‘7’ |
| Relative minor | ‘3’ | ‘3#’ | ‘4’ | ‘4#’ | ‘5’ | ‘6’ | ‘6#’ | ‘7’ | ‘7#’ | ‘1’ | ‘1#’ | ‘2’ |

For example, if the current song key is D Major, then the current song key value is 2. If a message is received requesting the chord fundamental note for relative key number 5, then the song key object returns 55, which is the chord fundamental note for the 7th (2+5) entry in Table 2. This means that in the song key of D, an F piano key should play a G chord, but how the returned chord fundamental is used is entirely up to the object receiving the information. The song key object (3-8) does its part by providing the services shown.

Figure 5:
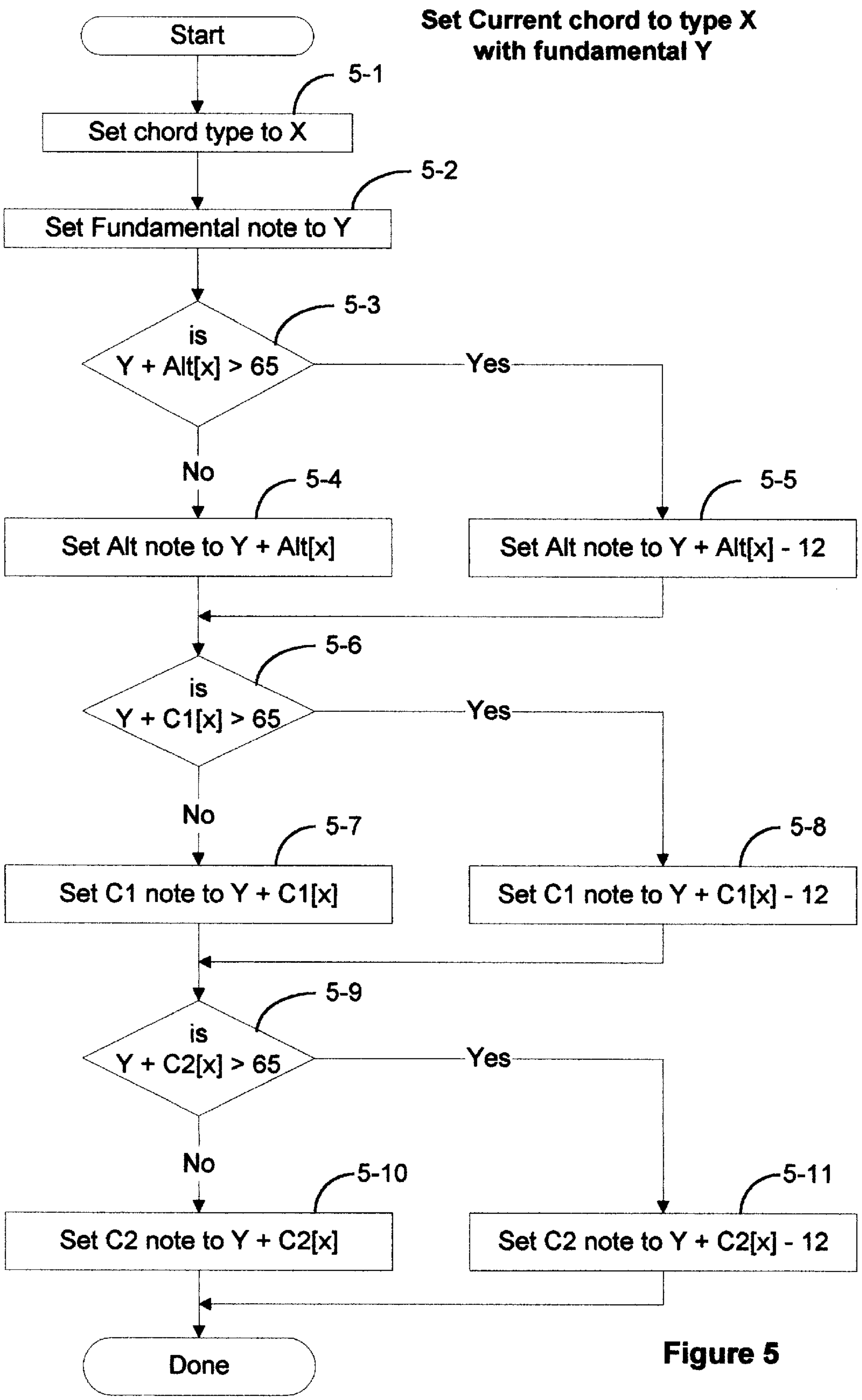
FIG. 5 is a logic flow diagram of chord objects 'Set Chord' service.

FIG. 5 and Tables 3 and 4

There is one current chord object 3-7. Table 3 shows the attributes and services of the chord object which include the current chord type and the four notes of the current chord. The current chord object provides nine services.

The ‘GetChord()’ service returns the current chord type (major, minor, etc.) and chord fundamental note. The ‘CopyNotes()’ service copies the notes of the chord to a destination specified by the caller. Table 4 shows the possible chord types and the chord formulae used in generating chords. The current chord type is represented by the index in Table 4. For example, if the current chord type is =6, then the current chord type is a suspended 2nd chord.

FIG. 5 shows a flow diagram for the service that generates and sets the current chord. Referring to FIG. 5, this service first sets the chord type to the requested type X in step 5-1. The fundamental note Y is then stored in step 5-2. Generally, all the notes of the current chord will be contained in octave number 0 which includes absolute note numbers 54 through 65 (FIG. 2). Y will always be in this range. The remaining three notes, the Alt note, C1 note, and C2 note of the chord are then generated by adding an offset to the fundamental note. The offset for each of these note is found in Table 4 under the columns labeled Alt, C1 and C2. Four notes are always generated. In the case where a chord has only three notes, the C2 note will be a duplicate of the C1 note.

Referring back to FIG. 5, step 5-3 determines if the sum of the fundamental note and the offset for the Alt note (designated Alt[x]) is less than or equal to 65 (5-3). If so, then the Alt note is set to the sum of the fundamental note configured so that the C1 note is always the 3rd note of the chord, etc. or note may be arranged in any order. A mode may be included where the 5th(ALT) is omitted from any chord simply by adding an attribute such as ‘drop5th’ and adding a service for setting ‘drop5th’ to be true or false and modifying the SetChordTo() service to ignore the ALT in Table 4 when ‘drop5th’ is true.

The service ‘isNoteInChord(noteNumber)’ will scan chordNote[] for noteNumber. If noteNumber is found it will return True (1). If it is not found, it will return False (0).

The remaining services return a specific chord note (fundamental, alternate, etc.) or the chord label.

TABLE 3

| Chord Object Attributes and Services |
|---|
| Attributes:<br>1. chordType<br>2. chordNote [4]<br>Services:<br>1. SetChordTo(ChordType, Fundamental);<br>2. GetChordType(); chordType<br>3. CopyChordNotes(destination);<br>4. GetFundamental(); chordNote[0]<br>5. GetAlt(); chordNote[1]<br>6. GetC1(); chordNote[2]<br>7. GetC2(); chordNote[3]<br>8. GetChordLabel(); textLabel<br>9. isNoteInChord(noteNumber); True/False |

TABLE 4

Chord Note Generation

| Index | Type | Fund | Alt | C1 | C2 | Label |
|---|---|---|---|---|---|---|
| 0 | Major | 0 | 7 | 4 | 4 | “ “ |
| 1 | Major seven | 0 | 7 | 4 | 11 | “M7” |

TABLE 4-continued

Chord Note Generation

| Index | Type | Fund | Alt | C1 | C2 | Label |
|---|---|---|---|---|---|---|
| 2 | minor | 0 | 7 | 3 | 3 | "m" |
| 3 | minor seven | 0 | 7 | 3 | 10 | "m7" |
| 4 | seven | 0 | 7 | 4 | 10 | "7" |
| 5 | six | 0 | 7 | 4 | 9 | "6" |
| 6 | suspended 2nd | 0 | 7 | 2 | 2 | "sus2" |
| 7 | suspended 4th | 0 | 7 | 5 | 5 | "sus4" |
| 8 | Major 7 diminished 5th | 0 | 6 | 4 | 11 | "M7(−5)" |
| 9 | minor six | 0 | 7 | 3 | 9 | "m6" |
| 10 | minor 7 diminished 5th | 0 | 6 | 3 | 10 | "m7(−5)" |
| 11 | minor Major 7 | 0 | 7 | 3 | 11 | "m(M7)" |
| 12 | seven diminished 5 | 0 | 6 | 4 | 10 | "7(−5)" |
| 13 | seven augmented 5 | 0 | 8 | 4 | 10 | "7(+5)" |
| 14 | augmented | 0 | 8 | 4 | 4 | "aug" |
| 15 | diminished | 0 | 6 | 3 | 3 | "dim" |
| 16 | diminished 7 | 0 | 6 | 3 | 9 | "dim7" |

Figure 6A:
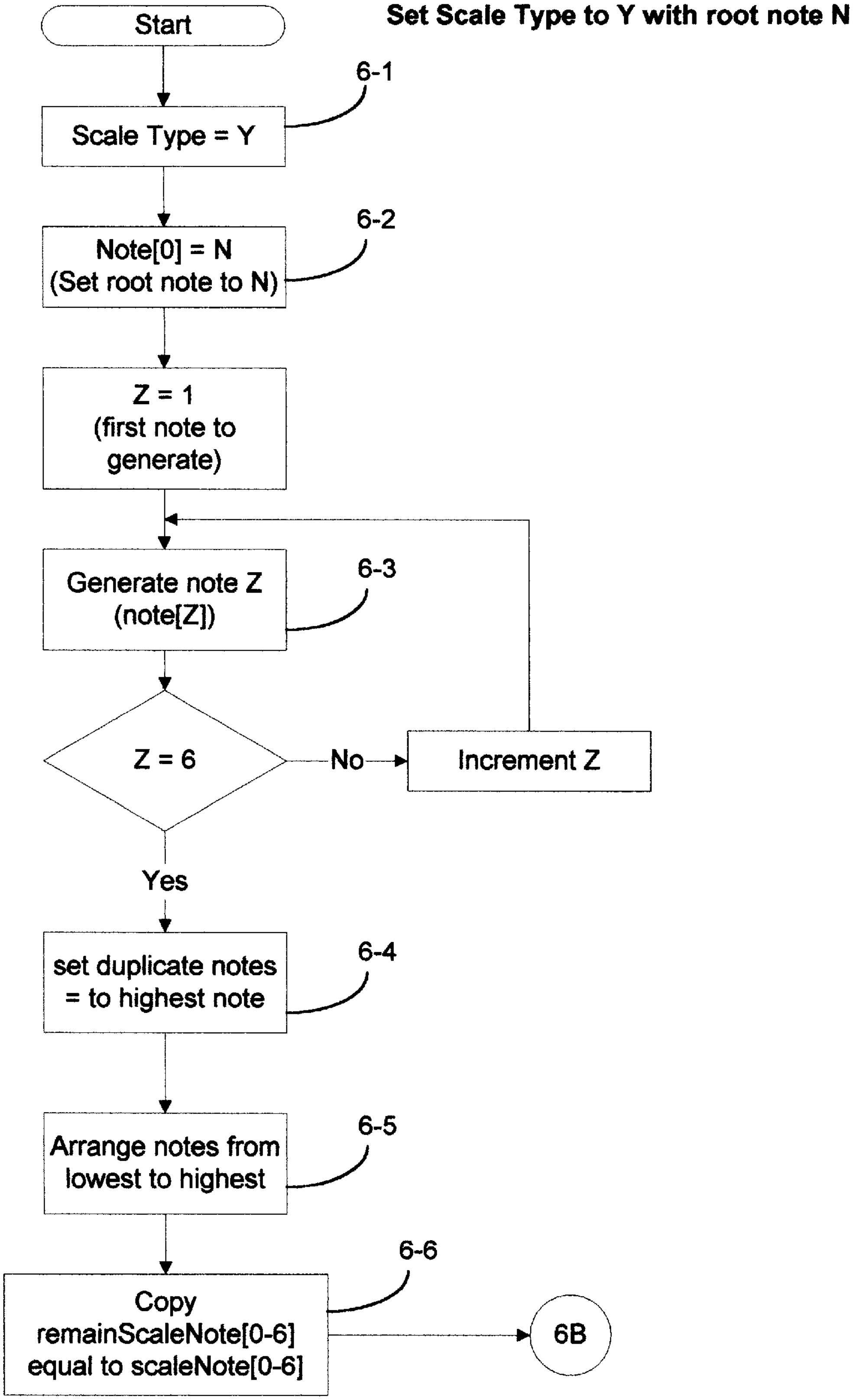
FIGS. 6A and 6B together are a logic flow diagram of scale objects 'Set scale' service.
Figure 6B:
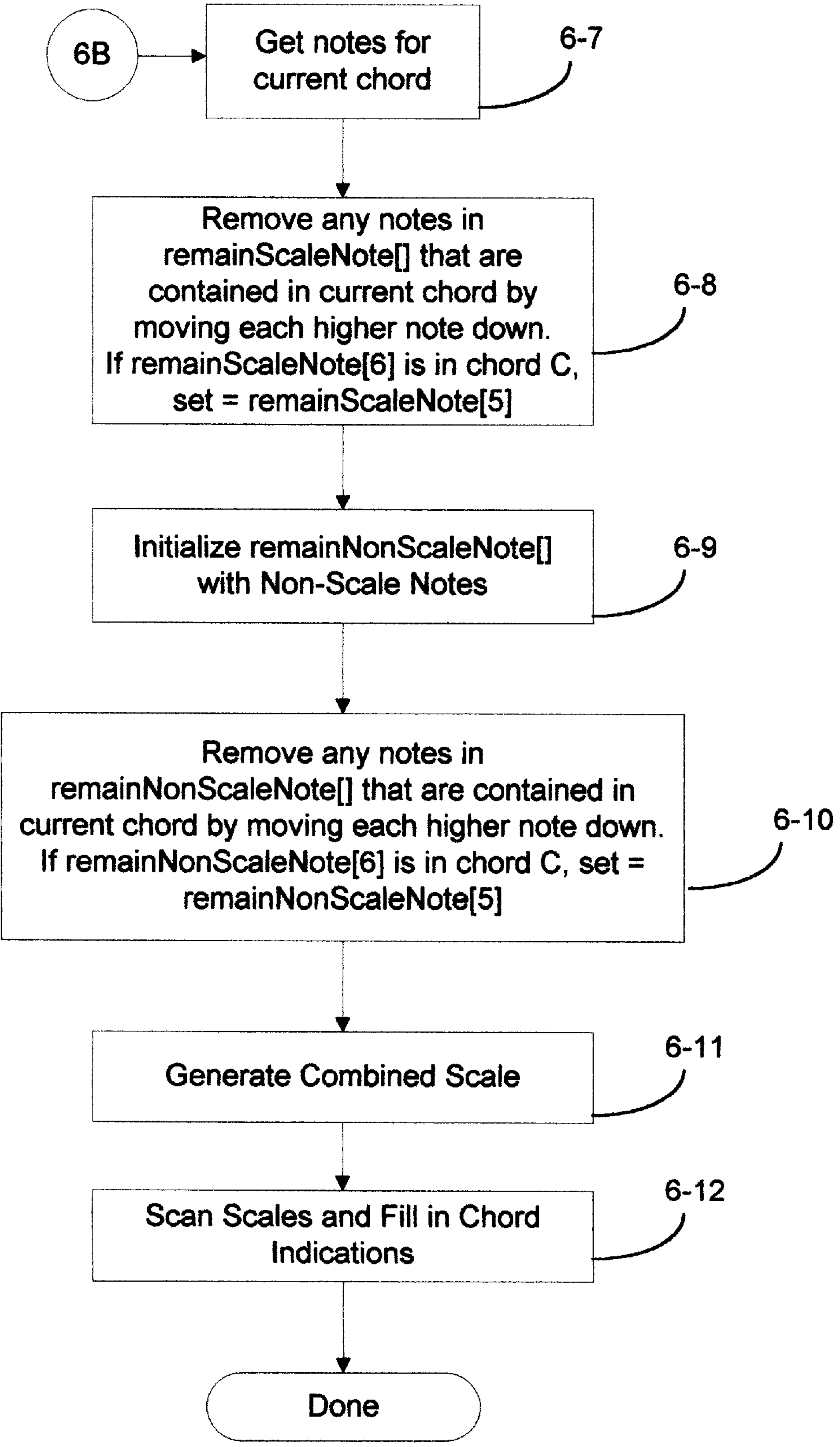

FIGS. 6*a* and 6*b* and Tables 5, 6a, 6b, and 7

As shown in FIG. 3, there is one Current Scale object 3-9. This object is responsible for generating the notes of the current scale. It also generates the notes of the current scale with the notes common to the current chord removed. It also provides the remaining notes that are not contained in the current scale or the current chord.

Referring to Table 5, the attributes of the current scale include the scale type (Major, pentatonic, eta), the root note and all other notes in three scales. The scaleNote[7] attribute contains the normal notes of the current scale. The remainScaleNote[7] attributes contains the normal notes of the current scale less the notes contained in the current chord. The remainNonScaleNote[7] attribute contains all remaining notes (of the 12 note chromatic scale) that are not in the current scale or the current chord. The combinedScaleNote[11] attribute combines the normal notes of the current scale (scaleNote[]) with all notes of the current chord that are not in the current scale (if any).

Each note attribute ( . . . Note[]) contains two fields, a note number and a note indication (text label). The note number field is simply the value (MIDI note number) of the note to be sounded. The note indication field is provided in the event that an alpha numeric, LED (light emitting diode) or other indication system is available. It may provide a useful indication on a computer monitor as well. This 'indication' system indicates to a user where certain notes of the scale appear on the keyboard. The indications provided for each note include the note name, (A, B, C#, etc.), and note position in the scale (indicated by the numbers 1 through 7). Also, certain notes have additional indications. The root note is indicated with the letter 'R', the fundamental of the current chord is indicated by the letter 'F', the alternate of the current chord is indicated by the letter 'A', and the C1 and C2 notes of the current chord by the letters 'C1' and 'C2', respectively. All non-scale notes (notes not contained in scaleNote[]) have a blank ('') scale position indication. Unless otherwise stated, references to the note attributes refer to the note number field.

The object provides twelve main services. FIGS. 6*a* and 6*b* show a flow diagram for the service that sets the scale type. This service is invoked by sending the message 'Set scale type to Y with root note N' to the scale object. First, the scale type is saved in step 6-1. Next, the root or first note of the scale, designated note[0], is set to N in step 6-2. The remaining notes of the scale are generated in step 6-3 by adding an offset for each note to the root note. The offsets are shown for each scale type in Table 6a. As with the current chord object, all the scale notes will be in octave 0 (FIG. 2). As each note is generated in step 6-3, if the sum of the root note and the offset is greater than 65, then 12, or one octave, is subtracted, forcing the note to be between 54 and 65. As shown in Table 6a, some scales have duplicate offsets. This is because not all scales have 7 different notes. These duplicates are added so that when five-note scales are performed, the user is still able to maintain a sense of where each octave begins. By subtracting 12 from some notes to keep them in octave 0, it is possible that the duplicated notes will not be the highest note of the resulting scale. Note that the value of 'Z' (step 6-3) becomes the position (in the scale) indication for each note, except that duplicate notes will have duplicate position indications.

Step 6-4 then forces the duplicate notes (if any) to be the highest resulting note of the current scale. It is also possible that the generated notes may not be in order from lowest to highest.

Step 6-5, in generating the current scale, rearranges the notes from lowest to highest. As an example, Table 7 shows the values of each attribute of the current scale after each step 6-1 through 6-5 shown in FIG. 6 when the scale is set to C Major Pentatonic. Next, the remaining scales notes are generated in step 6-6. This is done by first copying the normal scale notes to remainScaleNote[] array. Next, the notes of the current chord are fetched from the current chord object in step 6-7.

Then, step 6-8 removes those notes in the scale that are duplicated in the chord. This is done by shifting the scale notes down, replacing the chord note. For example, if remainScaleNote[2] is found in the current chord, then remainScaleNote[2] is set to remainScaleNote[3], remainScaleNote[3] is set to remainScaleNote[4], etc. (remainScaleNote[6] is unchanged). This process is repeated for each note in remainScaleNote[] until all the chord notes have been removed. If remainScaleNote[6] is in the current chord, it will be set equal to remainScaleNote[5]. Thus, the remainScaleNote[] array contains the notes of the scale less the notes of the current chord, arranged from highest to lowest (with possible duplicate notes as the higher notes).

Finally, the remaining non-scale notes (remainNonScaleNote[]) are generated. This is done in a manner similar to the remaining scale notes. First, remainNonScaleNote[] array is filled with all the non-scale notes as determined in step 6-9 from Table 6b in the same manner as the scale notes were determined from Table 6a. The chord notes (if any) are then removed in step 6-10 in the same manner as for remainScaleNotes[]. The combineScaleNote[] attribute is generated in step 6-11. This is done by taking the scaleNote[] attribute and adding any note in the current chord (fundamental, alternate, C1, or C2) that is not already in scaleNote[] (if any). The added notes are inserted in a manner that preserves scale order (lowest to highest).

The additional indications (Fundamental, Alternate, C1 and C2) are then filled in step 6-12. The GetScaleType() service returns the scale type. The service GetScaleNote(n) returns the nth note of the normal scale. Similarly, services GetRemainScaleNote(n) and GetRemainNonScaleNote(n) return the nth note of the remaining scale notes and the remaining non-scale notes respectively. The services, 'GetScaleNoteIndication' and 'GetCombinedNoteIndication', return the indication field of the scaleNote[] and combinedScaleNote[] attribute respectively. The service 'GetScaleLabel() returns the scale label (such as 'C MAJOR' or 'f minor').

The service 'GetScaleThirdBelow(noteNumber)' returns the scale note that is the third scale note below noteNumber. The scale is scanned from scaleNote[0] through scaleNote [6] until noteNumber is found. If it is not found, then combinedScaleNote[] is scanned. If it is still not found, the original note Number is returned (it should always be found as all notes of interest will be either a scale note or a chord note). When found, the note two positions before (where noteNumber was found) is returned as scaleThird. The 2nd position before a given position is determined in a circular fashion, i.e., the position before the first position (scaleNote [0] or combinedScaleNote[0] is the last position (scaleNote [6] or combinedScaleNote[10]. Also, positions with a duplicate of the next lower position are not counted. I.e., if scaleNote[6] is a duplicate of scaleNote[5] and scaleNote[5] is not a duplicate of scaleNote[4], then the position before scaleNote[0] is scaleNote[5]. If scaleThird is higher than noteNumber, it is lowered by one octave (=scaleThird−12) before it is returned. The service 'GetBlockNote(nthNote, noteNumber)' returns the nthNote chord note in the combined scale that is less (lower) than noteNumber. If there is no chord note less than noteNumber, 0 is returned.

The services 'isNoteInScale(noteNumber)' and 'isNoteInCombinedScale(noteNumber)' will scan the scale Note[] and combinedScaleNote[] arrays respectively for noteNumber. If noteNunber is found it will return True (1). If it is not found, it will return False (0).

A configuration object 3-5 collaborates with the scale object 3-9 by calling the SetScaleTo service each time a new chord/scale is required. This object 3-9 collaborates with a current chord object 3-7 to determine the notes in the current chord (CopyNotes service). The PianoKey objects 3-6 collaborate with this object by calling the appropriate GetNote service (normal, remaining scale, or remaining non-scale) to get the note(s) to be sounded. If an indication system is used, the user interface object 3-2 calls the appropriate indication service ('Get . . . NoteIndication()') and outputs the results to the alphanumeric display, LED display, or computer monitor.

The present invention has eighteen different scale types (index 0–17), as shown in Table 6a. Additional scale types can be added simply by extending Tables 6a and 6b.

The present invention may also derive one or a combination of 2nds, 4ths, 5ths, 6ths, etc. and raise or lower these derived notes by one or more octaves to produce scalic harmonies.

TABLE 5

Scale Object Attributes and Services

Attributes:

1. scaleType
2. rootNote
3. scaleNote[7]
4. remainScaleNote[7]
5. remainNonScaleNote[7]
6. combinedScaleNote[11]

Services:

1. SetScaleTo(scaleType, rootNote);
2. GetScaleType(); scaleType
3. GetScaleNote(noteNumber); scaleNote[noteNumber]
4. GetRemainScaleNote(noteNumber); remainScaleNote[noteNumber]
5. GetRemainNonScaleNote(noteNumber); remainNonScaleNote[noteNumber]
6. GetScaleThirdBelow(noteNumber); scaleThird
7. GetBlockNote(nthNote, noteNumber); combinedScaleNote[derivedValue]
8. GetScaleLabel(); textLabel
9. GetScaleNoteIndication(noteNumber); indication
10. GetCombinedScaleNoteIndication(noteNumber); indication
11. isNoteInScale(noteNumber); True/False
12. isNoteInCombinedScale(noteNumber); True/False TABLE 6a Normal Scale Note Generation

| Index | Scale type and label | 2nd note offset | 3rd note offset | 4th note offset | 5th note offset | 6th note offset | 7th note offset |
|---|---|---|---|---|---|---|---|
| 0 | minor | 2 | 3 | 5 | 7 | 8 | 10 |
| 1 | MAJOR | 2 | 4 | 5 | 7 | 9 | 11 |
| 2 | MAJ. PENT. | 2 | 4 | 7 | 9 | 9 | 9 |
| 3 | min.pent. | 3 | 5 | 7 | 10 | 10 | 10 |
| 4 | LYDIAN | 2 | 4 | 6 | 7 | 9 | 11 |
| 5 | DORIAN | 2 | 3 | 5 | 7 | 9 | 10 |
| 6 | AEOLIAN | 2 | 3 | 5 | 7 | 8 | 10 |
| 7 | MIXOLYDIAN | 2 | 4 | 5 | 7 | 9 | 10 |
| 8 | MAJ.PENT+4 | 2 | 4 | 5 | 7 | 9 | 9 |
| 9 | LOCRIAN | 1 | 3 | 5 | 6 | 8 | 10 |
| 10 | mel.minor | 2 | 3 | 5 | 7 | 9 | 11 |
| 11 | WHOLE TONE | 2 | 4 | 6 | 8 | 10 | 10 |
| 12 | DIM.WHOLE | 1 | 3 | 4 | 6 | 8 | 10 |
| 13 | HALF/WHOLE | 1 | 3 | 4 | 7 | 9 | 10 |
| 14 | WHOLE/HALF | 2 | 3 | 5 | 8 | 9 | 11 |
| 15 | BLUES | 3 | 5 | 6 | 7 | 10 | 10 |
| 16 | harm.minor | 2 | 3 | 5 | 7 | 8 | 11 |
| 17 | PHRYGIAN | 1 | 3 | 5 | 7 | 8 | 10 |

TABLE 6b

Non-Scale Note Generation

| Index | Scale type and label | 1st note offset | 2nd note offset | 3rd note offset | 4th note offset | 5th note offset | 6th note offset | 7th note offset |
|---|---|---|---|---|---|---|---|---|
| 0 | minor | 1 | 4 | 6 | 9 | 11 | 11 | 11 |
| 1 | MAJOR | 1 | 3 | 6 | 8 | 10 | 10 | 10 |
| 2 | MAJ. PENT. | 1 | 3 | 5 | 6 | 8 | 10 | 11 |
| 3 | min.pent. | 1 | 2 | 4 | 6 | 8 | 9 | 11 |
| 4 | LYDIAN | 1 | 3 | 5 | 8 | 10 | 10 | 10 |
| 5 | DORIAN | 1 | 4 | 6 | 8 | 11 | 11 | 11 |
| 6 | AEOLIAN | 1 | 4 | 6 | 9 | 11 | 11 | 11 |
| 7 | MIXOLYDIAN | 1 | 3 | 6 | 8 | 11 | 11 | 11 |
| 8 | MAJ.PENT+4 | 1 | 3 | 6 | 8 | 10 | 11 | 11 |
| 9 | LOCRIAN | 2 | 4 | 7 | 9 | 11 | 11 | 11 |
| 10 | mel.minor | 1 | 4 | 6 | 8 | 10 | 10 | 10 |
| 11 | WHOLE TONE | 1 | 3 | 5 | 7 | 9 | 11 | 11 |
| 12 | DIM.WHOLE | 2 | 5 | 7 | 9 | 11 | 11 | 11 |
| 13 | HALF/WHOLE | 2 | 5 | 6 | 8 | 11 | 11 | 11 |
| 14 | WHOLE/HALF | 1 | 4 | 6 | 7 | 10 | 10 | 10 |
| 15 | BLUES | 1 | 2 | 4 | 8 | 9 | 11 | 11 |
| 16 | harm.minor | 1 | 4 | 6 | 9 | 10 | 10 | 10 |
| 17 | PHRYGIAN | 2 | 4 | 6 | 9 | 11 | 11 | 11 |

TABLE 7

Example Scale Note Generation
Example: Set current scale to type 2 (Major Pentatonic) with root note 60 (C)

| After (see FIG. 6) | Scale Type | note[0] (root) | note[1] | note[2] | note[3] | note[4] | note[5] | note[6] |
|---|---|---|---|---|---|---|---|---|
| 6-1 | 2 | — | — | — | — | — | — | — |
| 6-2 | 2 | 60(C) | — | — | — | — | — | — |
| 6-3 (Z = 1) | 2 | 60(C) | 62(D) | — | — | — | — | — |
| 6-3 (Z = 2) | 2 | 60(C) | 62(D) | 64(E) | — | — | — | — |
| 6-3 (Z = 3) | 2 | 60(C) | 62(D) | 64(E) | 55(G) | — | — | — |
| 6-3 (Z = 4) | 2 | 60(C) | 62(D) | 64(E) | 55(G) | 57(A) | — | — |
| 6-3 (Z = 5) | 2 | 60(C) | 62(D) | 64(E) | 55(G) | 57(A) | 57(A) | — |
| 6-3 (Z = 6) | 2 | 60(C) | 62(D) | 64(E) | 55(G) | 57(A) | 57(A) | 57(A) |
| 6-4 | 2 | 60(C) | 62(D) | 64(E) | 55(G) | 57(A) | 64(E) | 64(E) |
| 6-5 | 2 | 55(G) | 57(A) | 60(C) | 62(D) | 64(E) | 64(E) | 64(E) |

FIGS. *7a*, *7b* and *7c* and Table 8

The present invention further includes three or more Chord Inversion objects 3-10. InversionA is for use by the Chord Progression type of PianoKey objects 3-6. InversionB is for the black melody type piano keys that play single notes 3-6 and inversionC is for the black melody type piano key that plays the whole chord 3-6. These objects simultaneously provide different inversions of the current chord object 3-7. These objects have the "intelligence" to invert chords. Table 8 shows the services and attributes that these objects provide. The single attribute inversionType, holds the inversion to perform and may be 0, 1, 2, 3, or 4.

TABLE 8

Chord Inversion Object Attributes and Services

Attributes:

1. inversionType

Services:

1. SetInversion(newInversionType);
2. GetInversion(note[]);

TABLE 8-continued

Chord Inversion Object Attributes and Services

3. GetRightHandChord(note[], Number);
4. GetRightHandChordWithHighNote(note[],HighNote);
5. GetFundamental(); Fundamental
6. GetAlternate(); Alternate
7. GetC1(); C1
8. GetC2(); C2

The SetInversion() service sets the attribute inversionType. It is usually called by the user interface 3-2 in response to keyboard input by a user or by a user pressing a foot switch that changes the current inversion.

For services 2, 3, and 4 of Table 8, note[], the destination for the chord, is passed as a parameter to the service by the caller.

Figure 7A:
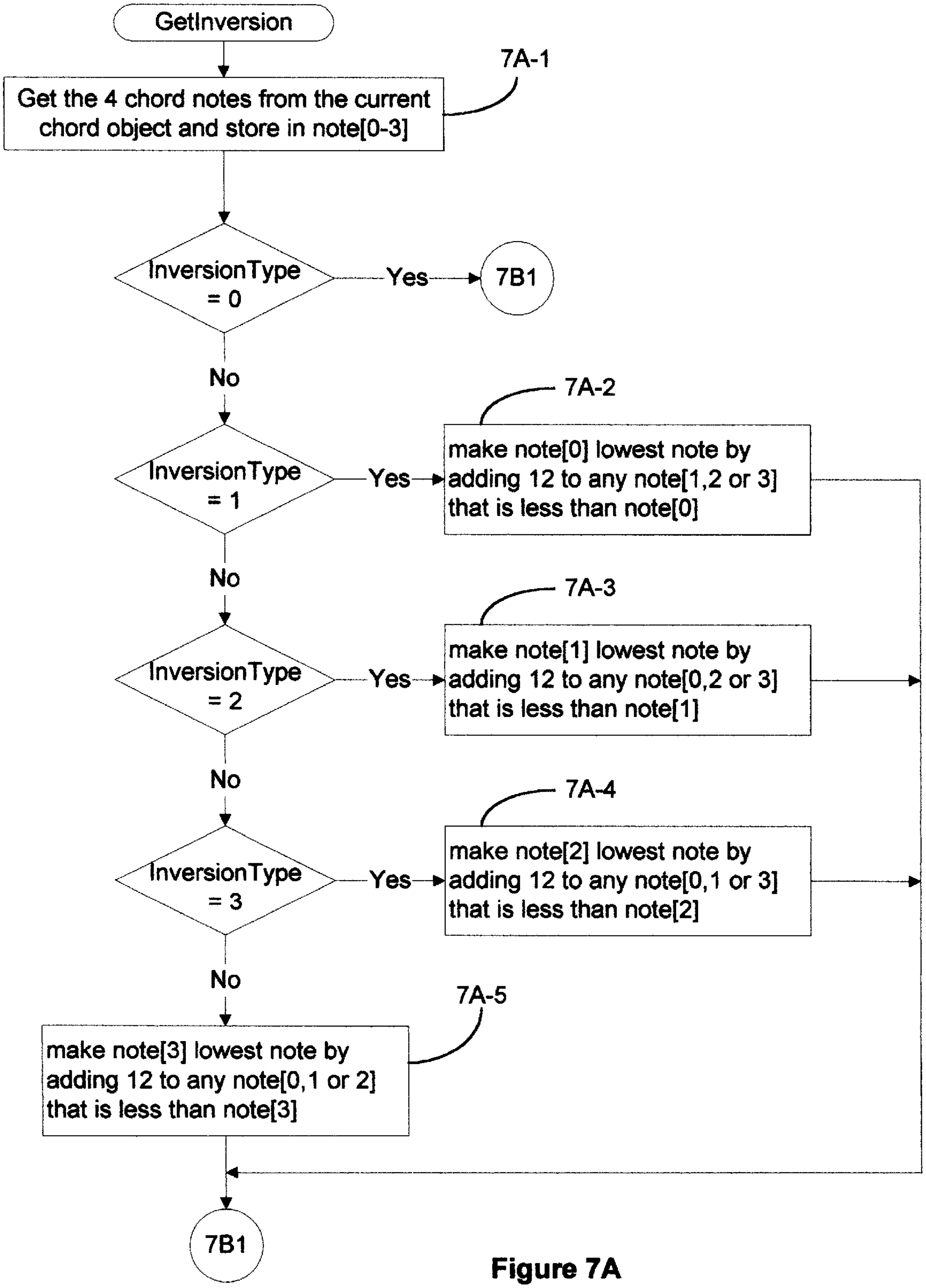
FIGS. 7A–D together are a logic flow diagram of chord inversion objects.
Figure 7B:
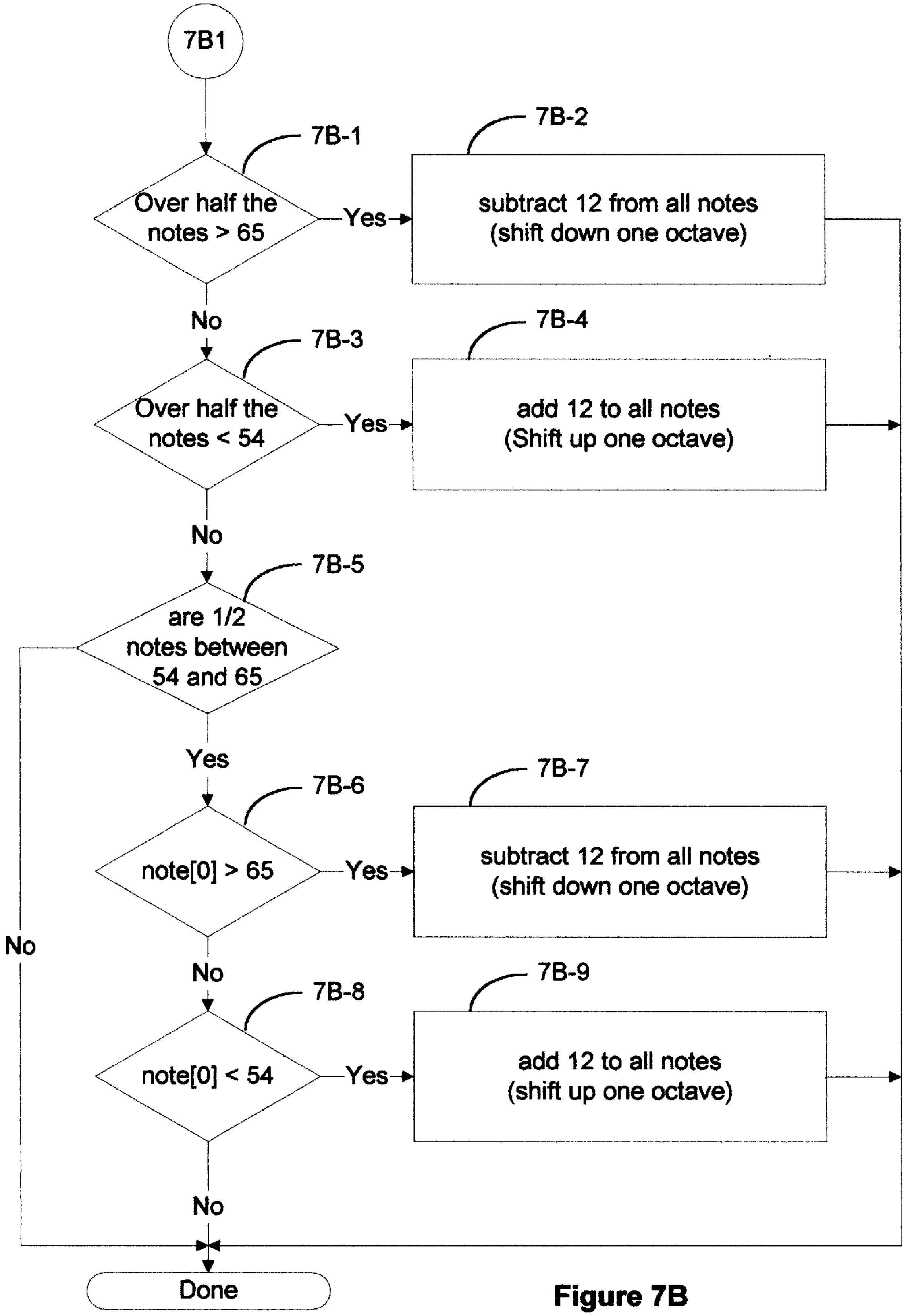

FIGS. 7A, and 7B show a flow diagram for the GetInversion() service. The GetInversion() service first (7A-1) gets all four notes of the current chord from the current chord object (3-7) and stores these in the destination (note[0] through note [3]). At this point, the chord is in inversion 0 where it is known that the fundamental of the chord is in note

[0], the alternate is in note [1], the C1 note is in note [2] and C2 is in note [3] and that all of these notes are within one octave (referred to as 'popular voicing)'. If inversionType is 1, then 7A-2 of FIG. 7A will set the fundamental to be the lowest note of the chord. This is done by adding one octave (12) to every other note of the chord that is lower than the fundamental (note[0]). If inversionType is 2, then 7A-3 of FIG. 7A will set the alternate to be the lowest note of the chord. This is done by adding one octave (12) to every other note of the chord that is lower than the alternate (note[1]). If inversionType is 3, then 7A-4 of FIG. 7A will set the C1 note to be the lowest note of the chord. This is done by adding one octave (12) to every other note of the chord that is lower than the C1 note (note[2]). If inversionType is none of the above (then it must be 4) then 7A-5 of FIG. 7A will set the C2 note to be the lowest note of the chord. This is done by adding one octave (12) to every other note of the chord that is lower than the C2 note (note[3]). After the inversion is set then processing continues with FIG. 7B. 7B1 of FIG. 7B checks if over half of the different notes of the chord have a value that is greater than 65. If so, then 7B-2 drops the entire chord one octave by subtracting 12 from every note. If not, 7B-3 checks if over half of the different notes of the chord are less than 54. If so, then 7B-4 raises the entire chord by one octave by adding 12 to every note. If more than half the notes are not outside the range 54–65, then 7B-5 checks to see if exactly half the notes are outside this range. If so, then 7B-6 checks if the fundamental note (note[0]) is greater than 65. If it is, then 7B-7 lowers the entire chord by one octave by subtracting 12 from every note. If the chord fundamental is not greater than 65, then 7B-8 checks to see if it (note[0]) is less than 54. If it is, then 7B-9 raises the entire chord one octave by adding 12 to every note. If preferred, inversions can also be shifted so as to always keep the fundamental note in the 54–65 range.

Figure 7C:
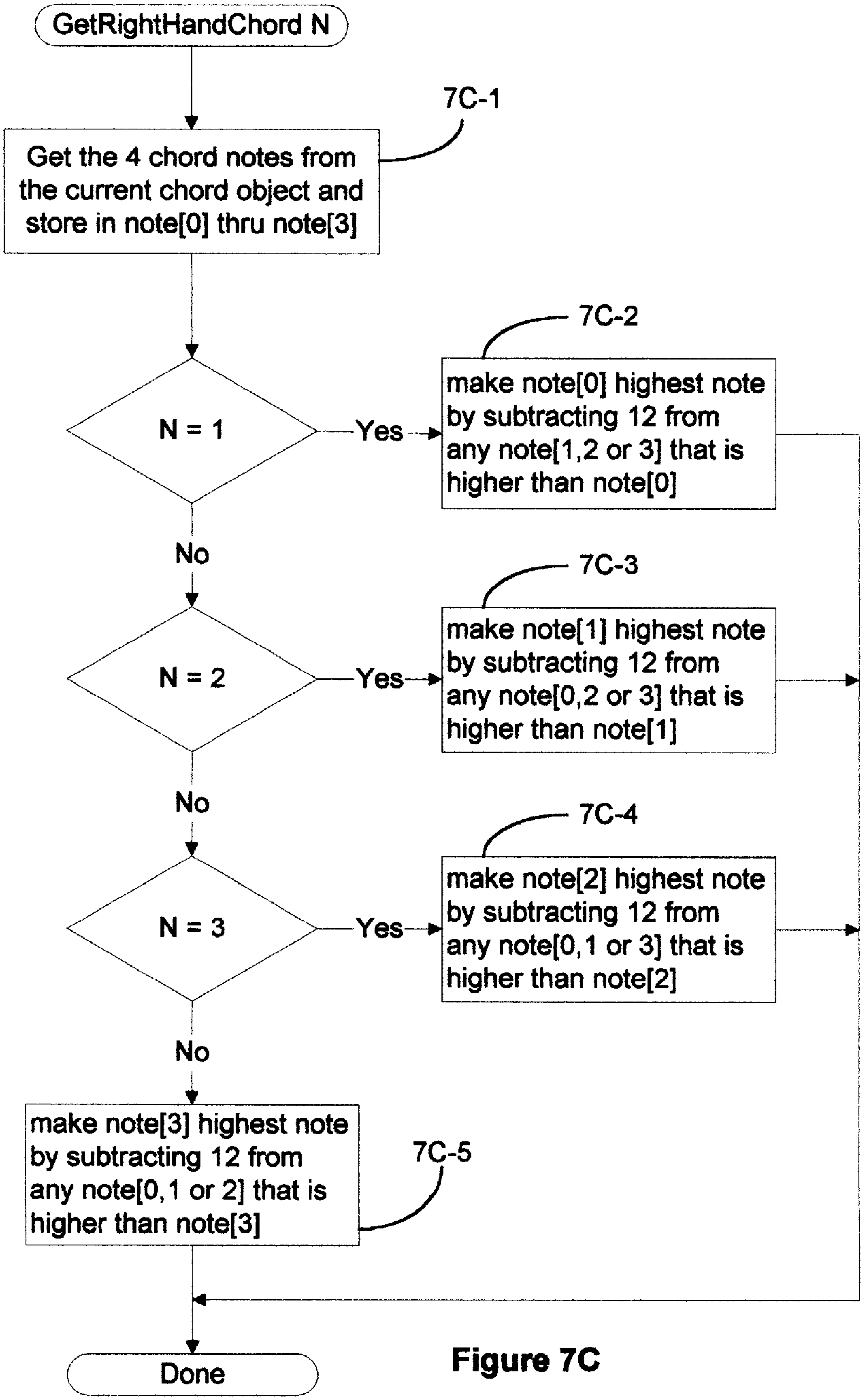

FIG. 7C shows a flow diagram for the service GetRight-Hand Chord(). The right hand chord to get is passed as a parameter (N in FIG. 7C). 7C-1 first gets the current chord from the current chord object. If the right hand chord desired is 1 (N=1), meaning that the fundamental should be the highest note, then 7C-2 subtracts 12 (one octave) from any other note that is higher than the fundamental (note[0]). If the right hand chord desired is 2, meaning that the alternate should be the highest note, then 7C-3 subtracts 12 (one octave) from any other note that is higher than the alternate (note[1]). If the right hand chord desired is 3, meaning that the C1 note should be the highest note, then 7C-4 subtracts 12 (one octave) from any other note that is higher than the C1 note (note[2]). If the right hand chord desired is not 1, 2 or 3, then it is assumed to be 4, meaning that the C2 note should be the highest note and then 7C-5 subtracts 12 (one octave) from any other note that is higher than the C2 note (note[3]).

Figure 7D:
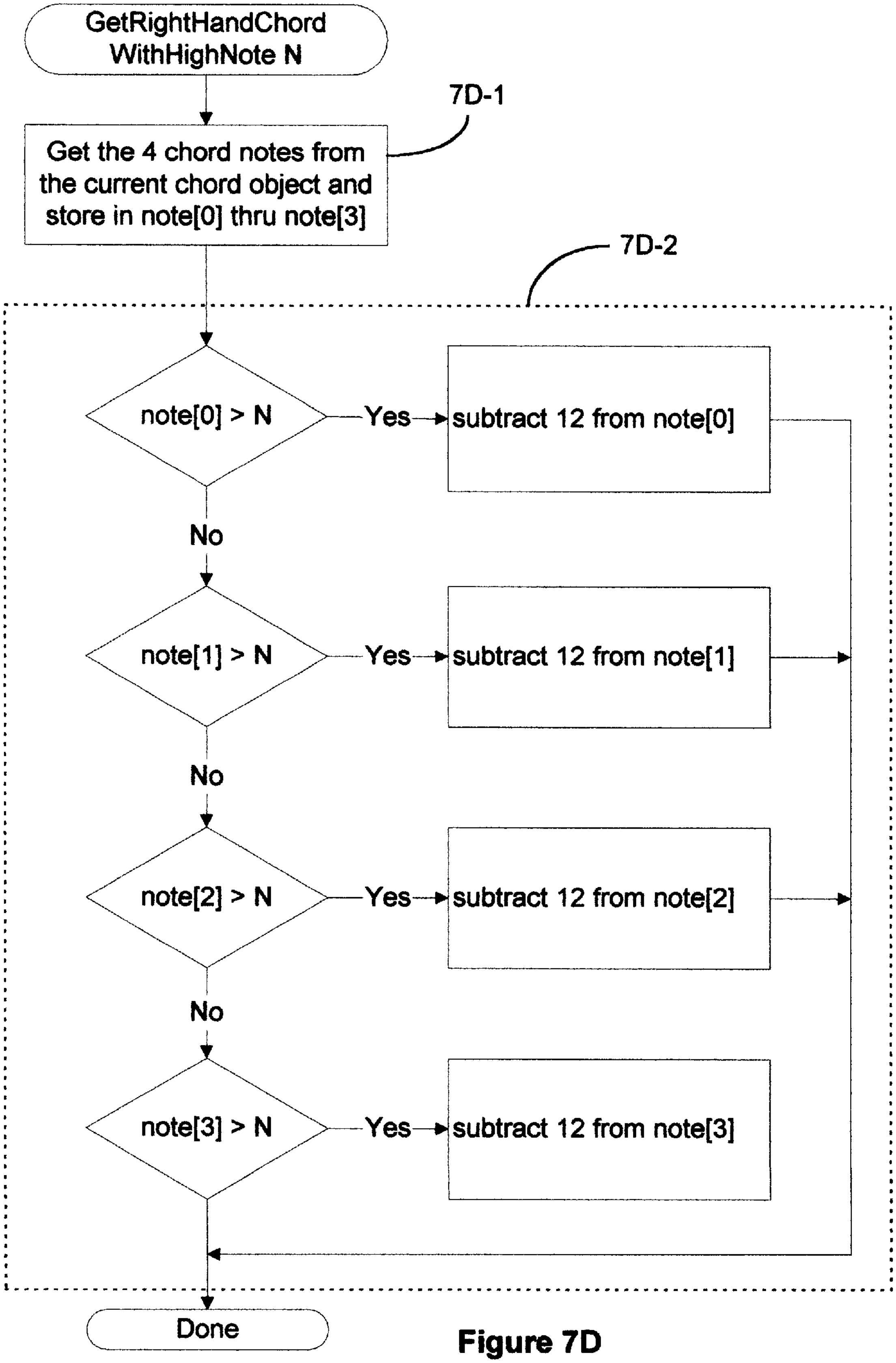

FIG. 7D shows a flow diagram for the service GetRightHandChordWithHighNote(). This service is called by the white melody keys when the scale note they are to play is a chord note the mode calls for a right hand chord. It is desirable to play the scale note as the highest note, regardless of whether it is the fundamental, alternate, etc. This service returns the right hand chord with the specified note as the highest. First, the 4 notes of the chord are fetched from the current chord object (7D-1). The flow diagram of FIG. 7D indicated by 7D-2 checks each note of the chord and lowers it one octave (by subtracting 12) if it is higher than the specified note. This will result in a chord that is the current chord with the desired note as the highest.

Services 5, 6, 7 and 8 of table 8 each return a single note as specified by the service name (fundamental, alternate, etc.). These services first perform the same sequence as in FIG. 7A (7A-1 through 7A-5). This puts the current chord in the inversion specified by the attribute inversionType. These services then return a single note and they differ only in the note they return. GetFundamental() returns the fundamental (note [0]). GetAlternate() returns the alternate (note [1]). Get C1() returns the C1 note (note[2]) and GetC2 returns the C2 note (note [3]).

Table 10

A Main Configuration Memory 3-5 contains one or more sets or banks of chord assignments and scale assignments for each chord progression key. It responds to messages from the user interface 3-2 telling it to assign a chord or scale to a particular key. The Memory 3-5 responds to messages from the piano key objects 3-6 requesting the current chord or scale assignment for a particular key, or to switch to a different assignment set or bank. The response to these messages may result in the configuration memory 3-5 sending messages to other objects, thereby changing the present configuration. The configuration object provides memory storage of settings that may be saved and recalled from a named disk file. These setup configurations may also be stored in memory, such as for providing factory setups, or for allowing real-time switching from a user-selectable input or user interface. They may also be stored on an internal or external storage device such as a CD, etc. The number of storage banks or settings is arbitrary. A user may have several different configurations saved. It is provided as a convenience to a user. The present invention preferably uses the following configuration:

There are two song keys stored in songKey[2]. There are two chord banks, one for each song key called chordTypeBank1[60] and chordTypeBank2[60]. Each chord bank hold sixty chords, one for each chord progression key. There are two scale banks, one for each song key, called scaleBank1[60][2] and scaleBank2[60][2]. Each scale bank holds 2 scales (root and type) for each of the sixty chord progression keys. The currentChordFundamental attribute holds the current chord fundamental. The attribute currentChordKeyNum holds the number of the current chord progression key and selects one of sixty chords in the selected chord bank or scales in the selected scale bank. The attribute songKeyBank identifies which one of the two song keys is selected (songKey[songKeyBank]), which chord bank is selected (chordTypeBank1[60] or chordTypeBank2 [60]) and which scale bank is selected (scaleBank1[60][2] or scaleBank2[60][2]). The attribute scaleBank[60] identifies which one of the two scales is selected in the selected scale bank (scaleBank1or2[currentChordKeyNum] [scaleBank [currentChordKey Num]]).

The following discusstion assumes that songKeyBank is set to 0. The service 'SetSongKeyBank(newSongKeyBank)' sets the current song key bank (songKeyBank=newSongKeyBank). 'SetScaleBank(newScaleBank)' service sets the scale bank for the current chord (scaleBank [currentChordKeyNum]=newScaleBank). 'AssignSongKey (newSongKey)' service sets the current song key (songKey [songKeyBank]=newSongKey).

The service 'AssignChord(newChordType, keyNum)' assigns a new chord (chordTypeBank1[keyNum]=newChordType). The service 'AssignScale(newScaleType, newScaleRoot, keyNum)' assigns a new scale (scaleBank1 [keyNum][scaleBank[currentChordKeyNum]]=newScaleType and newScaleRoot).

The service SetCurrentChord(keyNum, chordFundamental)

1. sets currentChordFundamental=chordFundamental;

2. sets currentChordKeyNum=keyNum; and 3. sets the current chord to chordbank1 [currentChordKeyNum] and fundamental currentChordFundamental The service SetCurrentScale(keyNum) sets the current scale to the type and root stored at scaleBank1 [currentChordKeyNum][scaleBank [currentChordKeyNum]].

The service 'Save(destinationFileName)' saves the configuration (all attributes) to a disk file. The service 'Recall (sourceFileName)' reads all attributes from a disk file.

The chord progression key objects 3-6 (described later) use the SetCurrentChord() and SetCurrentScale() services to set the current chord and scale as the keys are pressed. The control key objects use the SetSongKeyBank() and SetScaleBank() services to switch key and scale banks respectively as a user plays. The user interface 3-2 uses the other services to change (assign), save and recall the configuration. The present invention also contemplates assigning a song key to each key by extending the size of songKey[2] to sixty (songKey[60]) and modifying the SetCurrentChord() service to set the song key every time it is called. This allows chord progression keys on one octave to play in one song key and the chord progression keys in another octave to play in another song key. The song keys which correspond to the various octaves or sets of inputs can be selected or set by a user either one at a time, or simultaneously in groups.

TABLE 10

| Configuration Objects Attributes and Services |
|---|
| Attributes: |
| 1. songKeyBank |
| 2. scaleBank[60] |
| 3. currentChordKeyNum |
| 4. currentChordFundamental |
| 5. songKey[2] |
| 6. chordTypeBank1[60] |
| 7. chordTypeBank2[60] |
| 8. scaleBank1[60][2] |
| 9. scaleBank2[60][2] |
| Services: |
| 1. SetSongKeyBank(newSongKeyBank); |
| 2. SetScaleBank(newScaleBank); |
| 3. AssignSongKey(newSongKey); |
| 4. AssignChord(newChordType, keyNum); |
| 5. AssignScale(newScaleType, newScaleRoot, keyNum); |
| 6. SetCurrentChord(keyNum, chordFundamental); |
| 7. SetCurrentScale(keyNum); |
| 8. Save(destinationFileName); |
| 9. Recall(sourceFileName); |

Figure 8:
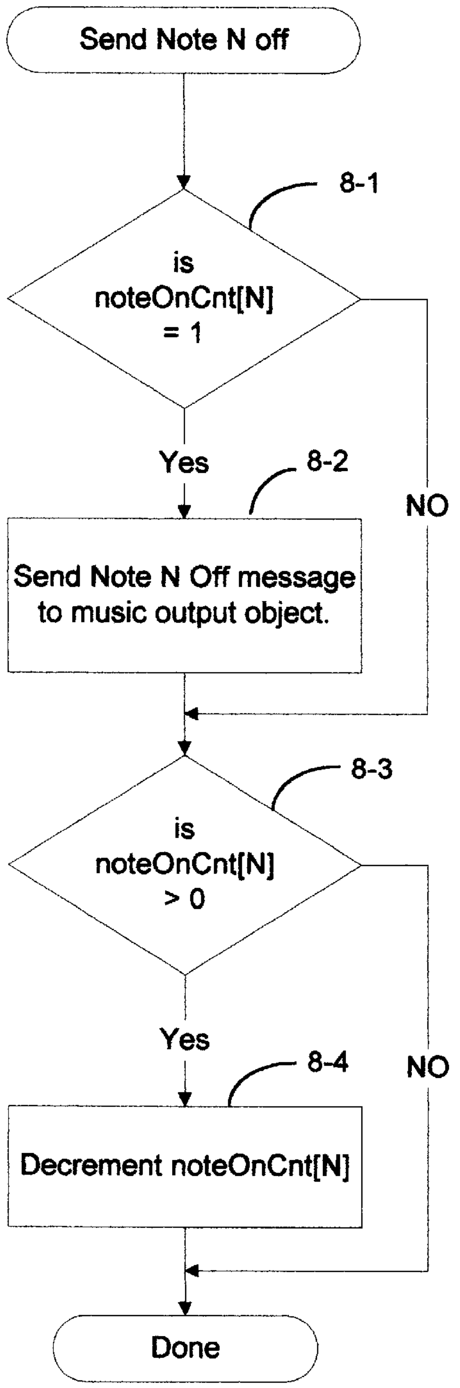
FIG. 8 is a logic flow diagram of channel output objects 'Send note off' service.

FIGS. 8 and 9 and Table 11

Each Output Channel object 3-11 (FIG. 3) keeps track of which notes are on or off for an output channel and resolves turning notes on or off when more than one key may be setting the same note(s) on or off. Table 11 shows the Output Channel objects attributes and services. The attributes include (1) the channel number and (2) a count of the number of times each note has been sent on. At start up, all notes are assumed to be off. Service (1) sets the output channel number. This is usually done just once as part of the initialization. In the description that follows, n refers to the note number to be sent on or off.

Figure 9A:
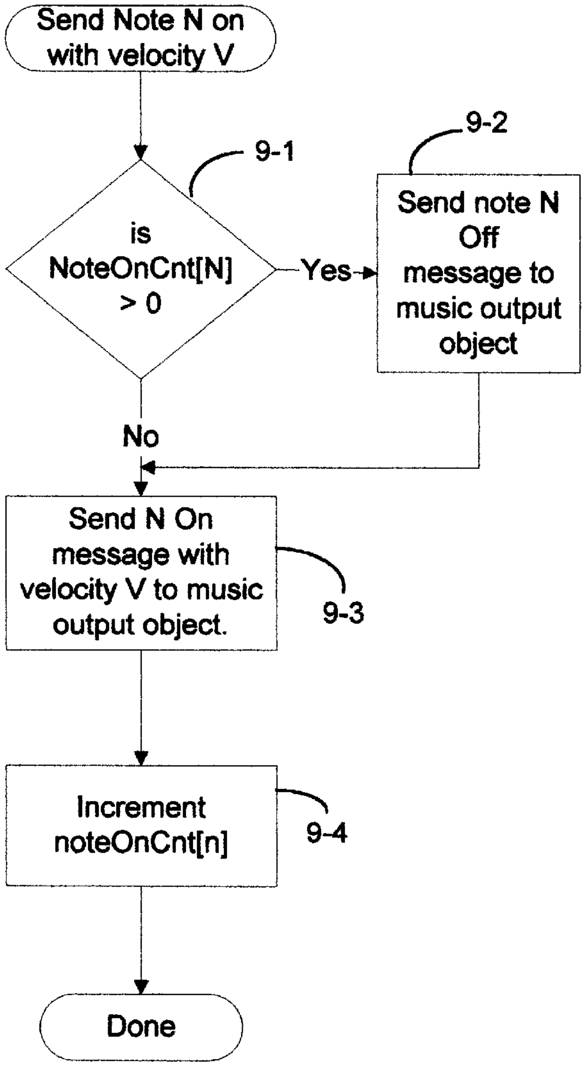
FIG. 9A is a logic flow diagram of channel output objects 'Send note on' service.

FIG. 9*a* shows a flow diagram for service 2, which sends a note on message to the music output object 3-12. The note to be sent (turned on) is first checked if it is already on in step 9-1, indicated by noteOnCnt[n]>0. If on, then the note will first be sent (turned) off in step 9-2 followed immediately by sending it on in step 9-3. The last action increments the count of the number of times the note has been sent on in step 9-4.

Figure 9B:
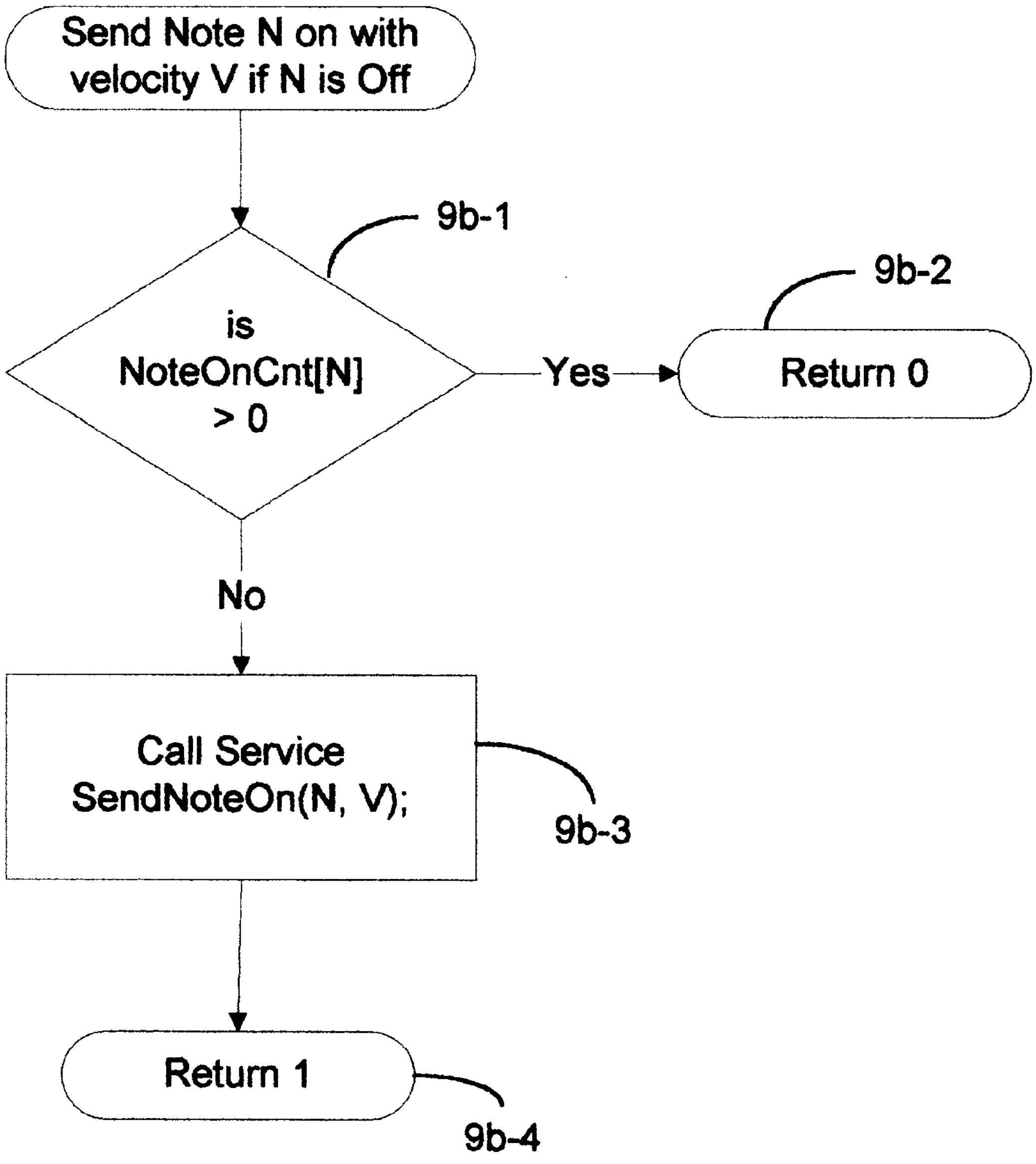
FIG. 9B is a logic flow diagram of channel output objects 'Send note on if off' service.

FIG. 9*b* shows a flow diagram for service 3 which sends a note on message only if that note is off. This service is provided for the situation where keys want to send a note on if it is off but do not want to re-send the note if already on. This service first checks if the note is on in step 9*b*-1 and if it is, returns 0 in step 9*b*-2 indicating the note was not sent. If the note is not on, then the Send note on service is called in step 9*b*-3 and a 1 is returned by step 9*b*-4, indicating that the note was sent on and that the calling object must therefore eventually call the Send Note Off service.

FIG. 8 shows the flow diagram for the sendNoteOff service. This service first checks if the noteOnCnt[n] is equal to one in step 8-1. If it is, then the only remaining object to send the note on is the one sending it off, then a note off message is sent by step 8-2 to the music output object 3-12. Next, if the noteOnCnt[n] is greater than 0, it is decremented.

All objects which call the SendNoteOn service are required (by contract so to speak) to eventually call the SendNoteOff service. Thus, if two or more objects call the SendNoteOn service for the same note before any of them call the SendNoteOff service for that note, then the note will be sent on (sounded) or re-sent on (re-sounded) every time the SendNoteOn service is called, but will not be sent off until the SendNoteOff service is called by the last remaining object that called the SendNoteOn service.

The remaining service in Table 11 is SendProgramChange. The present invention sends notes on/off and program changes, etc., using the MIDI interface. The nature of the message content preferably conforms to the MIDI specification, although other interfaces may just as easily be employed. The Output Channel object 3-11 isolates the rest of the software from the 'message content' of turning notes on or off, or other control messages such as program change. The Output Channel object 3-11 takes care of converting the high level functionality of playing (sending) notes, etc. to the lower level bytes required to achieve the desired result.

TABLE 11

| Output Channel Objects Attributes and Services |
|---|
| Attributes: |
| 1. channelNumber |
| 2. noteOnCnt[128] |
| Services: |
| 1. SetChannelNumber(channelNumber); |
| 2. SendNoteOn(noteNumber, velocity); |
| 3. SendNoteOnIfOff(noteNumber, velocity); noteSentFlag |
| 4. SendNoteOff(noteNumber); |
| 5. SendProgramChange(PgmChangeNum); |

Figure 10A:
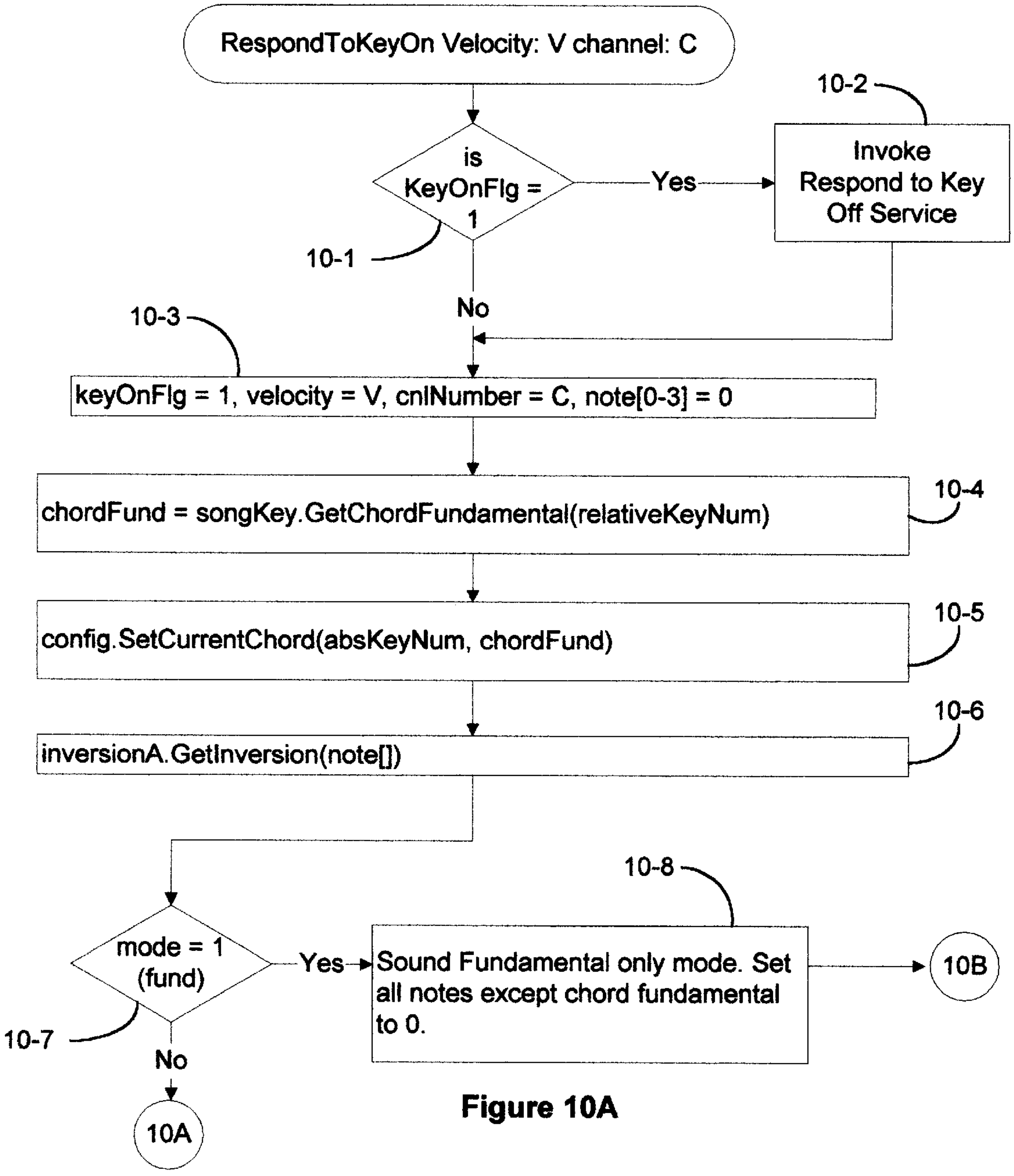
FIG. 10 is a logic flow diagram of PianoKey::Chord Progression Key objects 'Respond to key on' service.

FIGS. 10*a,* 10*b* and 11 and Table 12

There are four kinds of PianoKey objects 3-6: (1) ChordProgressionKey, (2) WhiteMelodyKey, (3) BlackMelodyKey, and (4) ControlKey. These objects are responsible for responding to and handling the playing of musical (piano) key inputs. These types specialize in handling the main types of key inputs which include the chord progression keys, the white melody keys, and control keys (certain black chord progression keys). There are two sets of 128 PianoKey objects for each input channel. One set, refered to as chordKeys is for those keys designated (by user preference) as chord progression keys and the other set, refered to as melodyKeys are for those keys not designated as chord keys. The melodyKeys with relative key numbers (FIG. 2) of 0, 2, 4, 5, 7, 9 and 11 will always be the WhiteMelodyKey type while melodyKeys with relative key numbers of 1, 3, 6, 8 and 10 will always be the BlackMelodyKey type.

The first three types of keys usually result in one or more notes being played and sent out to one or more output channels. The control keys are special keys that usually result in configuration or mode changes as will be described later. The PianoKey objects receive piano key inputs from the music administrator object 3-3 and configuration input from the user interface object 3-2. They collaborate with the song key object 3-8, the current chord object 3-7, the current scale object 3-9, the chord inversion objects 3-10 and the configuration object 3-5, in preparing their response, which is sent to one or more of the many instances of the CnlOutput objects 3-11.

The output of the ControlKey objects may be sent to many other objects, setting their configuration or mode.

The ChordProgressionKey type of PianoKey 3-6 is responsible for handling the piano key inputs that are designated as chord progression keys (the instantiation is the designation of key type, making designation easy and flexible).

Table 12 shows the ChordProgressionKeys attributes and services. The attribute mode, a class attribute that is common to all instances of the ChordProgressionKey objects, stores the present mode of operation. With minor modification, a separate attribute mode may be used to store the present mode of operation of each individual key input, allowing all of the individual notes of a chord to be played independently and simultaneously when establishing a chord progression. The mode may be normal (0), Fundamental only (1), Alternate only (2) or silent chord (3), or expanded further. The class attribute correctionMode controls how the service CorrectKey behaves and may be set to either Normal=0 or SoloChord=1, SoloScale=2, or SoloCombined=3. The class attribute octaveShiftSetting is set to the number of octaves to shift the output. Positive values shift up, negative shift down. The absKeyNum is used for outputting patch triggers to patchOut instance of output object. The relativeKeyNum is used to determine the chord to play. The cnlNumber attribute stores the destination channel for the next key off response. The keyOnFlag indicates if the object has responded to a key on since the last key off. The velocity attribute holds the velocity with which the key was pressed. The chordNote[4] attributes holds the (up to) four notes of the chord last output. The attribute octaveShiftApplied is set to octaveShiftSetting when notes are turned on for use when correcting notes (this allows the octaveShiftSetting to change while a note is on).

TABLE 12

| PianoKey::ChordProgressionKey Attributes and Services |
|---|
| Class Attributes: |
| 1. mode |
| 2. correctionMode |
| 3. octaveShiftSetting |
| Instance Attributes: |
| 1. absoluteKeyNumber |
| 2. relativeKeyNumber |

TABLE 12-continued

| PianoKey::ChordProgressionKey Attributes and Services |
|---|
| 3. cnlNumber |
| 4. keyOnFlag |
| 5. velocity |
| 6. chordNote[4] |
| 7. octaveShiftApplied |
| Services: |
| 1. RespondToKeyOn(sourceChannel, velocity); |
| 2. RespondToKeyOff(sourceChannel); |
| 3. RespondToProgramChange(sourceChannel); |
| 4. SetMode(newMode); |
| 5. CorrectKey(); |
| 6. SetCorrectionMode(newCorrectionMode); |
| 7. SetOctaveShift(numberOctaves); |

Figure 10B:
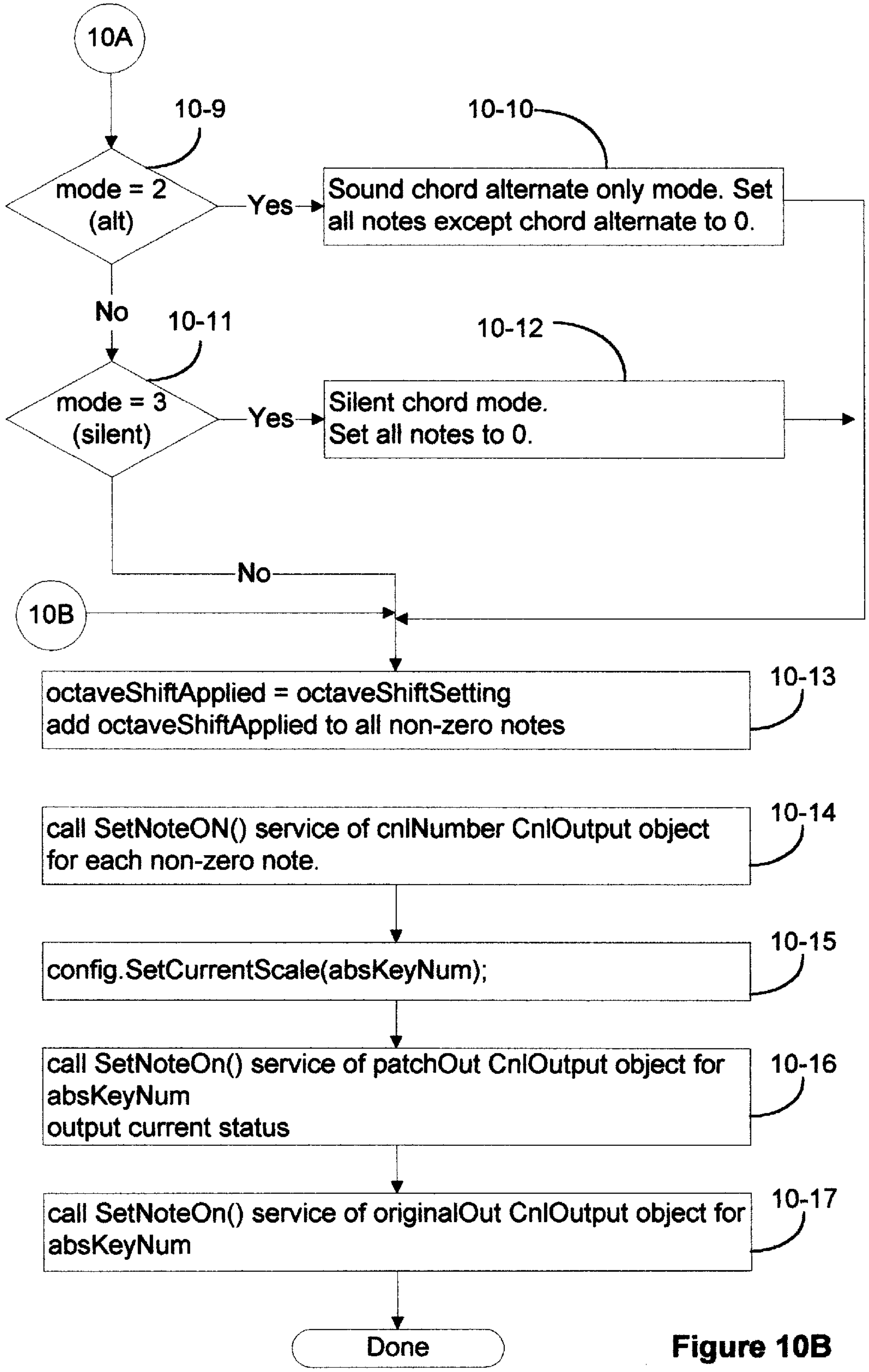

FIGS. 10*a* and 10*b* depict a flow diagram for the service 'RespondToKeyOn()', which is called in response to a chord progression key being pressed. If the KeyOnFlg is 1 in step 10-1, indicating that the key is already pressed, then the service 'RespondToKeyOff()' is called by step 10-2. Then, some of the attributes are initialized in step 10-3.

Then, the chord fundamental for the relative key number is fetched from the song key object in step 10-4. The main configuration memory 3-5 is then requested to set the current chord object 3-7 based on the presently assigned chord for the absKeyNum attribute in step 10-5. The notes of the current chord are then fetched in step 10-6 from the chord inversion object A 3-10 (which gets the notes from the current chord object 3-7. If mode attribute=1 (10-7) then all notes of the chord except the fundamental are discarded (set to 0) in step 10-8. If the mode attribute=2 in step 10-9, then all notes of the chord except the alternate are discarded by step 10-10. If the mode attribute=3 in step 10-11, then all notes are discarded in step 10-12. The Octave shift setting (octaveShiftSetting) is stored in octaveShiftApplied and then added to each note to turn on in step 10-13. All notes that are non zero are then output to channel cnlNumber in step 10-14. The main configuration object 3-5 is then requested to set the current scale object 3-9 per current assignment for absoluteKeyNumber attribute 10-15. A patch trigger=to the absKeyNum is sent to patchOut channel in step 10-16. In addition, the current status is also sent out on patchOut channel (see table 17 for description of current status). When these patch triggers/current status are recorded and played back into the music software, it will result in the RespondToProgramChange() service being called for each patch trigger received. By sending out the current key, chord and scale for each key pressed, it will assure that the music software will be properly configured when another voice is added to the previously recorded material. The absKeyNum attribute is output to originalOut channel (10–17).

Figure 11:
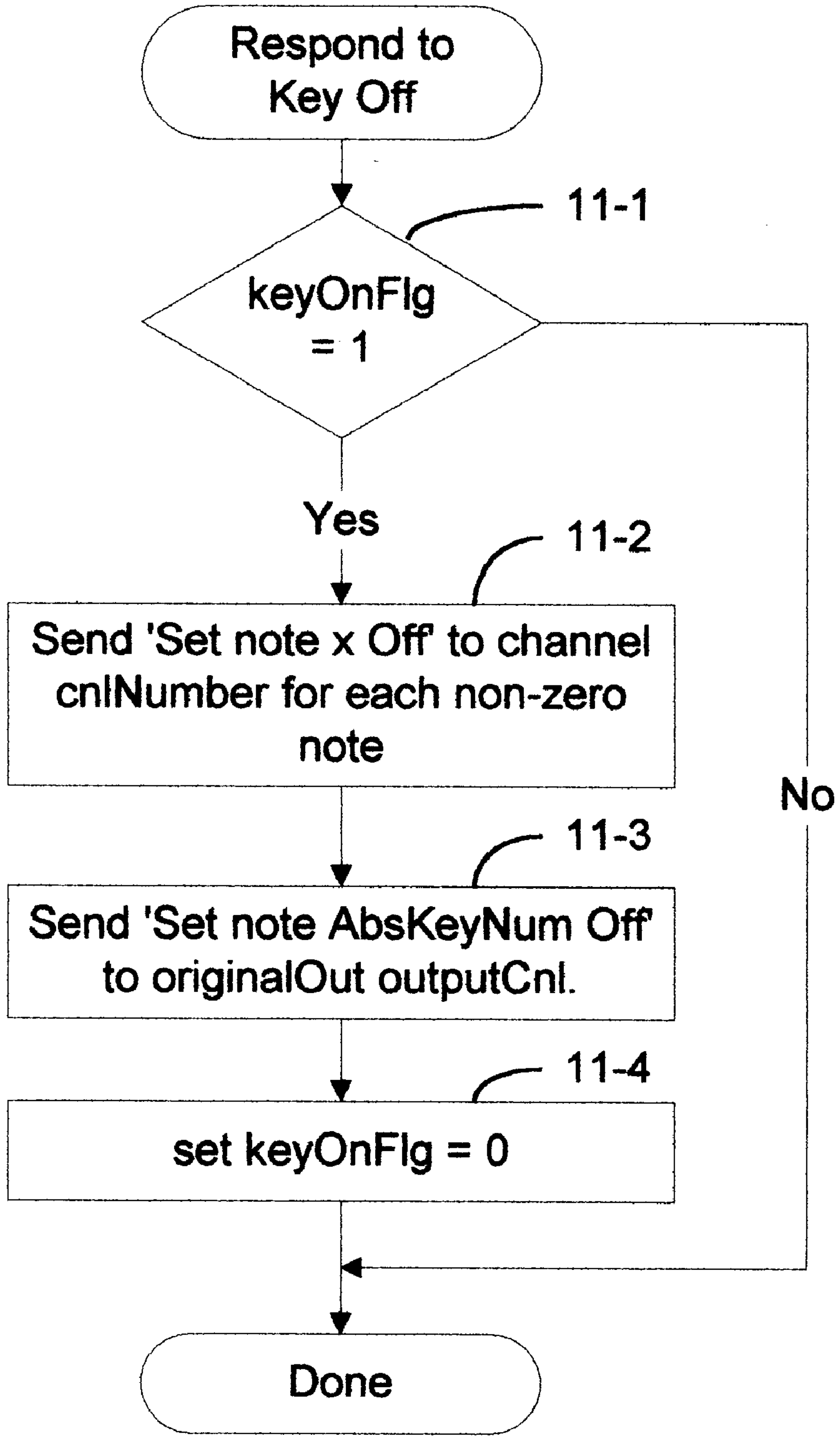
FIG. 11 is a logic flow diagram of PianoKey::Chord Progression Key objects 'Respond to key off' service.

FIG. 11 shows a flow diagram for the service 'RespondToKeyOff()'. This service is called in response to a chord progression key being released. If the key has already been released in step 11-1, indicated by keyOnFlg=0, then the service does nothing. Otherwise, it sends note off messages to channel cnlNumber for each non-zero note, if any, in step 11-2. It then sends a note off message to originalout channel for AbsKeyNum in step 11-3. Finally it sets the keyOnFlg to 0 in step 11-4.

The service 'RespondToProgramChange()' is called in response to a program change (patch trigger) being received. The service responds in exactly the same way as the 'RespondToKeyOn()' service except that no notes are output to any object. It initializes the current chord object and the current scale object. The 'SetMode()' service sets the mode attribute. The 'setCorrectionMode()' service sets the correctionMode attribute.

The service CorrectKey() is called in response to a change in the song key, current chord or scale while the key is on (keyOnFlg=1). This enables the key to correct the notes it has sent out for the new chord or scale. There are two different correction modes (see description for correctionMode attribute above). In the normal correction mode (correctionMode=0), this service behaves exactly as RespondToKeyOn() with one exception. If a new note to be turned on is already on, it will remain on. It therefore does not execute the same identical initialization sequence (FIG. 10*a*) in this mode. It first determines the notes to play (as per RespondToKeyOn() service) and then turns off only those notes that are not already on and then turns on any new notes. The solo correction mode (correctionMode=1) takes this a step further. It turns off only those notes that are not in the new current chord (correctionMode=1), scale (correctionMode=2) or combined chord and scale (correctionMode=3). If a note that is already on exists anywhere in the current chord, scale or combined chord and scale it will remain on. The current chord objects service isNoteInChord() and the current scale objects services isNoteInScale and isNoteInCombinedScale() are used to determine if each note already on should be left on or turned off. The output channel for the original key is determined as for the white melody key as described below).

FIGS. 12*a* through 12*k* and Table 13

The WhiteMelodyKey object is responsible for handling all white melody key events. This involves, depending on mode, getting notes from the current scale object and/or chord inversion object and sending these notes out.

The class attributes for this object include mode, which may be set to one of Normal=0, RightHandChords=1, Scale3rds=2, RHCand3rds=3, RemainScale=4 or RemainNonScale=5. The class attributes numBlkNotes hold the number of block notes to play if mode is set to 4 or 5. The attribute correctionMode controls how the service CorrectKey behaves and may be set to either Normal=0 or SoloChord=1, SoloScale=2, or SoloCombined=3. The class attribute octaveShiftSetting is set to the number of octaves to shift the output. Positive values shift up, negative shift down. Instance variables include absoluteKeyNumber and colorKeyNumber and octave (see FIG. 2). The attribute cnlNumber holds the output channel number the notes were sent out to. keyOnFlag indicates whether the Key in pressed or not. Velocity hold the velocity of the received 'Note On' and note[4] holds the notes that were sounded (if any). The attribute octaveShiftApplied is set per octaveShiftSetting and octave attributes when notes are turned on for use when correcting notes.

TABLE 13

| PianoKey::WhiteMelodyKey Attributes and Services |
| --- |
| Class Attributes: |
| 1. mode |
| 2. numBlkNotes |
| 3. CorrectionMode |
| 4. octaveShiftSetting |
| Instance Attributes: |
| 1. absoluteKeyNumber |
| 2. colorKeyNumber |

TABLE 13-continued

| PianoKey::WhiteMelodyKey Attributes and Services |
| --- |
| 3. octave |
| 4. cnlNumber |
| 5. keyOnFlag |
| 6. velocity |
| 7. note[4] |
| 8. octaveShiftApplied |
| Services: |
| 1. ResondToKeyOn(sourceChannel, velocity); |
| 2. RespondToKeyOff(sourceChannel); |
| 3. CorrectKey(); |
| 4. SetMode(newMode); |
| 5. SetCorrectionMode(newCorrectionMode); |
| 6. SetNumBlkNotes(newNumBlkNotes); |
| 7. SetOctaveShift(numberOctaves); |

FIGS. 12*a* through 12*j* provide a flow diagram of the service 'RespondToKeyOn()'. This service is called in response to a white melody key being pressed. It is responsible for generating the note(s) to be sounded. It is entered with the velocity of the key press and the channel the key was received on.

The RespondToKeynOn service starts by initializing itself in step 12*a*-1. This initialization will be described in more detail below. It then branches to a specific sequence that is dependent on the mode, as shown in flow diagram 12*a*-2. These specific sequences actually generate the notes and will be described in more detail below. It finishes by outputting the generated notes in step 12*a*-3.

Figure 12A:
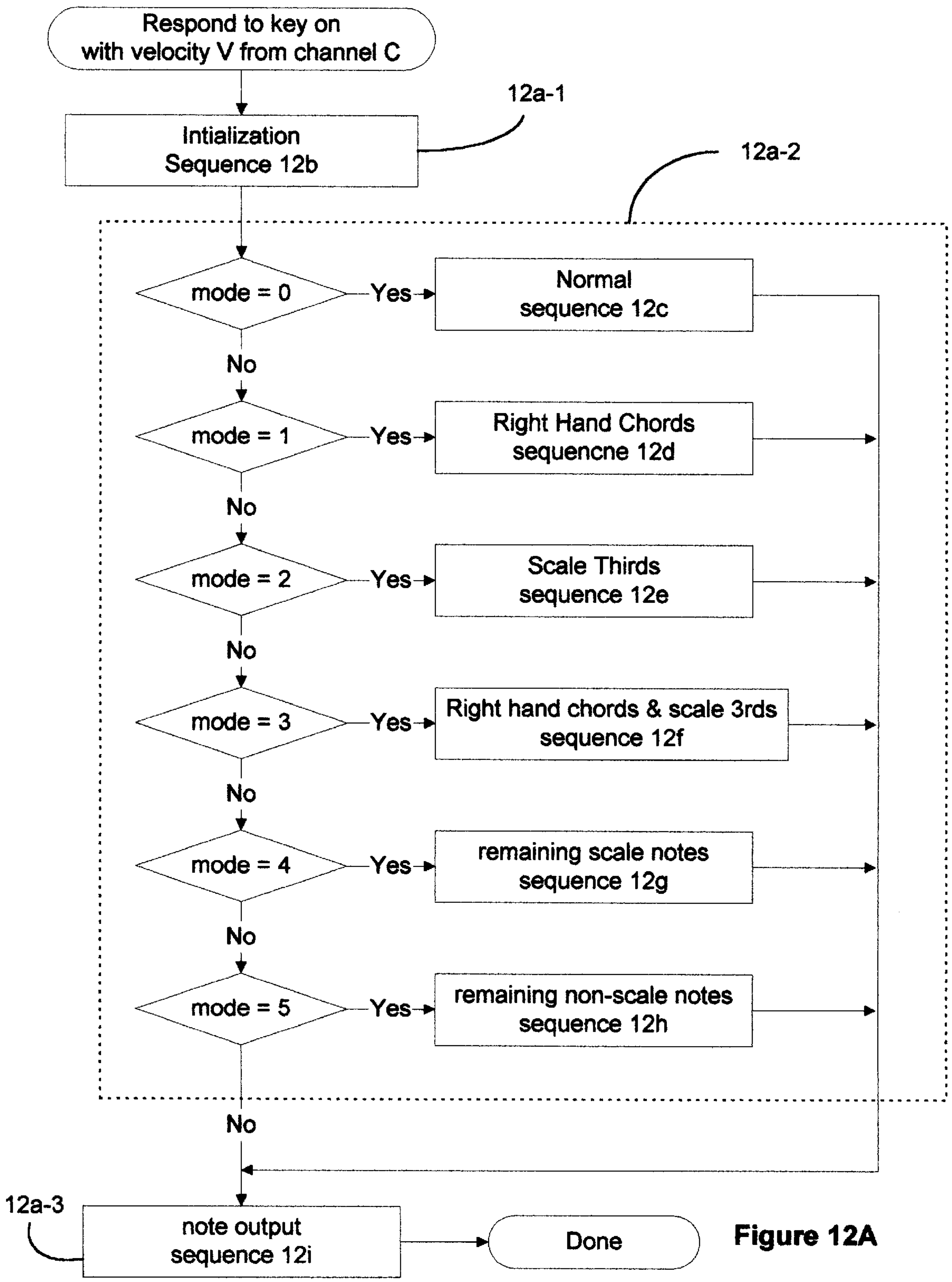
FIGS. 12A, through 12J together are a logic flow diagram of PianoKey::Melody Key objects 'Respond to key on' service.
Figure 12B:
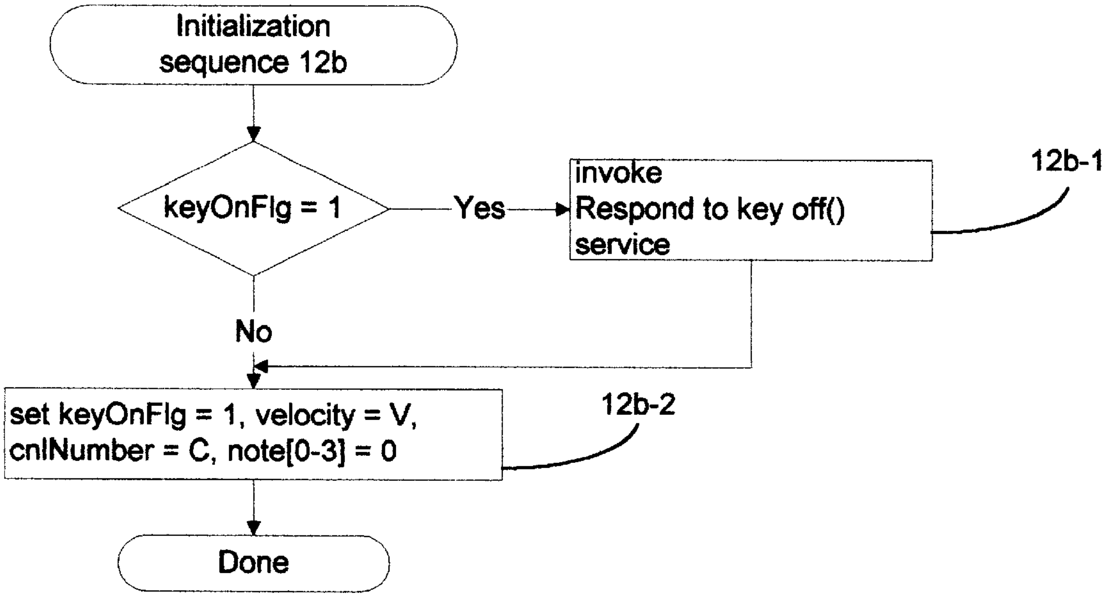
FIG. 12K is a logic flow diagram of PianoKey::Melody Key objects 'Respond to key off' service.

The initialization sequence, shown in FIG. 12*b*, first checks if the key is already pressed. If it is (keyOnFlg=1), the service 'RespondToKeyOff()' service will be called in step 12*b*-1. Then, keyOnFlg is set to 1, indicating the key is pressed, the velocity and cnlNumber attributes are set and the notes are cleared by being set to 0 in step 12*b*-2.

Figure 12I:
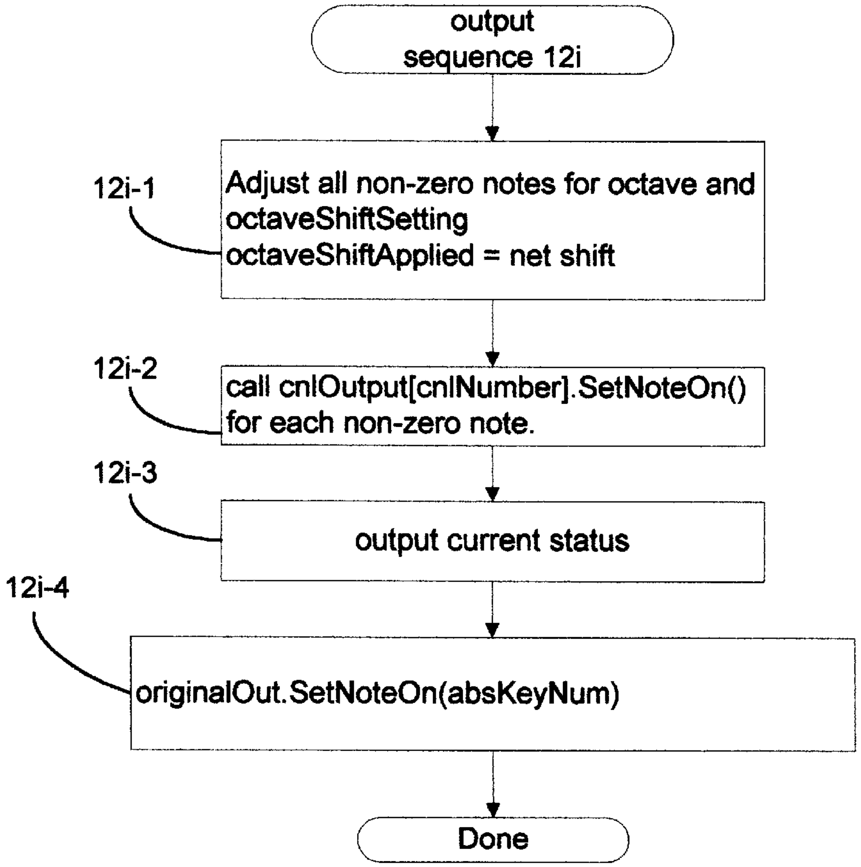
Figure 12C:
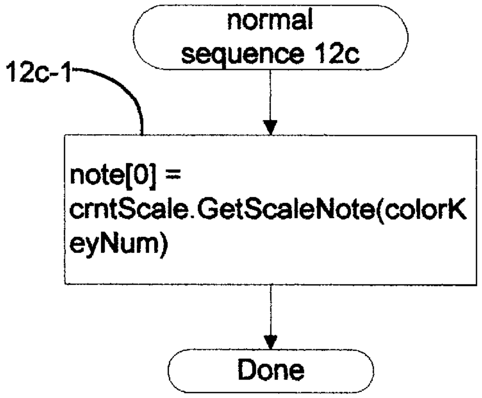

FIG. 12*c* depicts a flow diagram of the normal (mode=0) sequence. This plays a single note (note[0]) that is fetched from the current scale object based on the particular white key pressed (colorKeyNum).

Figure 12D:
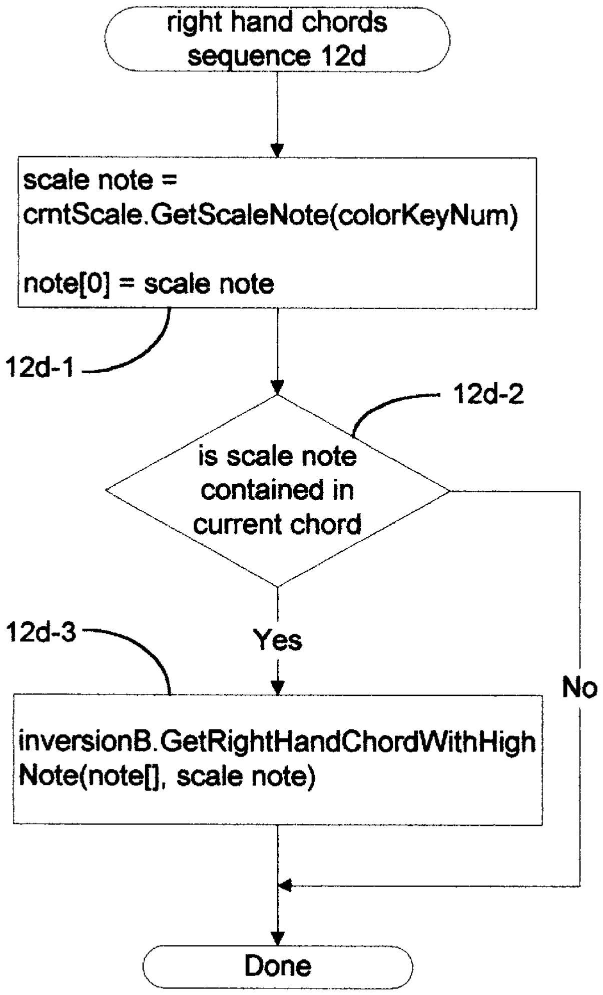

FIG. 12*d* gives a flow diagram of the right hand chord (mode=1) sequence. This sequence first fetches the single normal note as in normal mode in step 12*d*-1. It then checks if this note (note[0]) is contained in the current chord in step 12*d*-2. If it is not, then the sequence is done. If it is, then the right hand chord is fetched from chord inversion B object with the scale note (note[)]) as the highest note in step 12*d*-3.

Figure 12E:
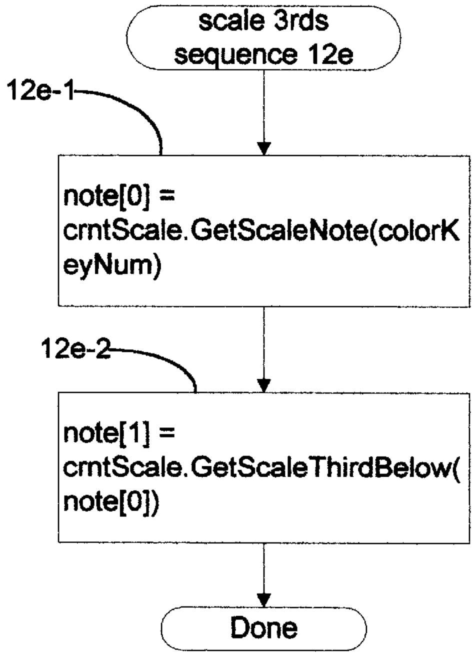

FIG. 12*e* gives a flow diagram of the scale thirds (mode=2) sequence. This sequence sets note[0] to the normal scale note as in normal mode (12*e*-1). It then sets note[1] to be the scale note one third below note[0] by calling the service 'GetScaleThird(colorKeyNum)' of the current scale object.

Figure 12F:
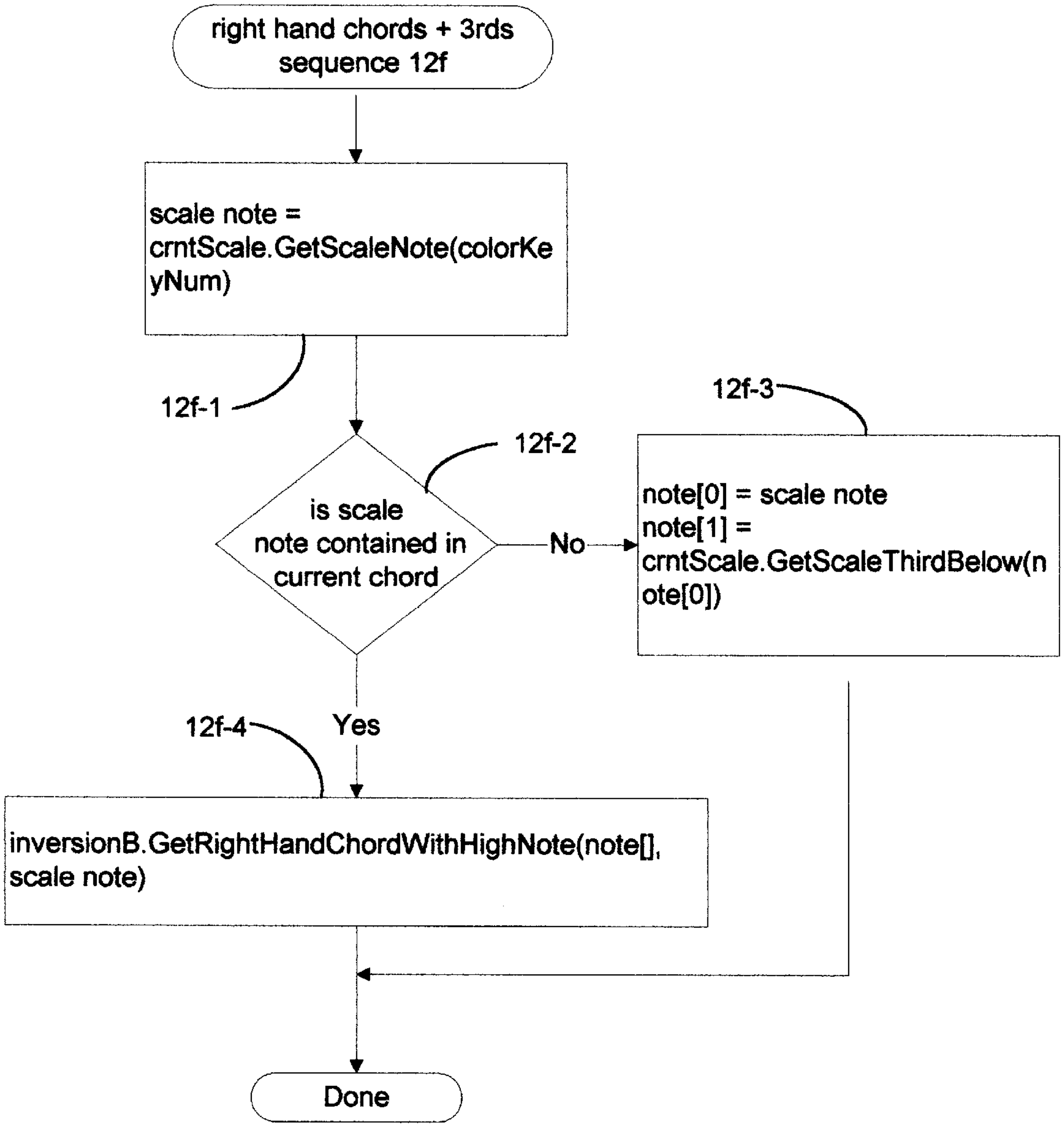

FIG. 12*f* gives a flow diagram of the right hand chords plus scale thirds (mode=3) sequence. This sequence plays a right hand chord exactly as for mode=1 if the normal scale note is in the current chord (12*f*-1, 12*f*-2, and 12*f*-4 are identical to 12*d*-1, 12*d*-2, and 12*d*-3 respectively). It differs in that if the scale note is not in the current chord, a scale third is played as mode 2 in step 12*f*-3.

Figure 12G:
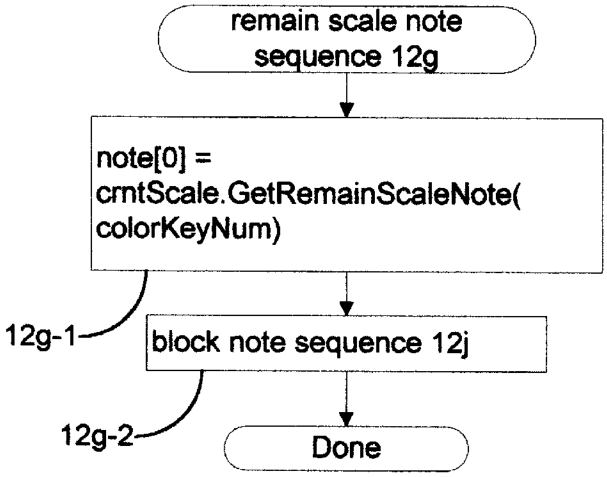

FIG. 12*g* depicts a flow diagram of the remaining scale note (mode=4) sequence. This sequence plays scale notes that are remaining after current chord notes are removed. It sets note[0] to the remaining scale note by calling the service 'GetRemainScaleNote(colorKeyNumber)' of the current scale object instep 12*g*-1. It then adds chord (block) notes based on the numBlkNotes attributes in step 12*g*-2. FIG. 12*j* shows a flow diagram for getting block notes.

Figure 12H:
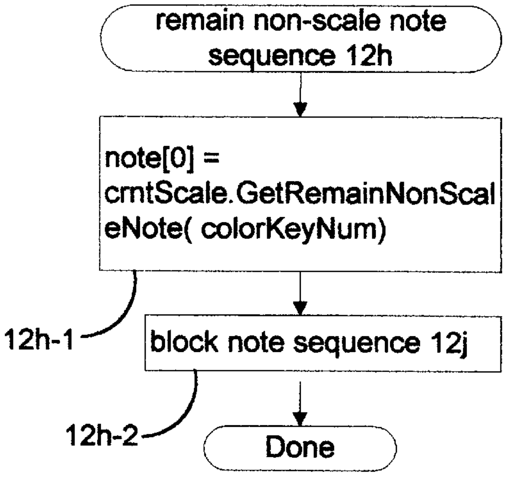
Figure 12J:
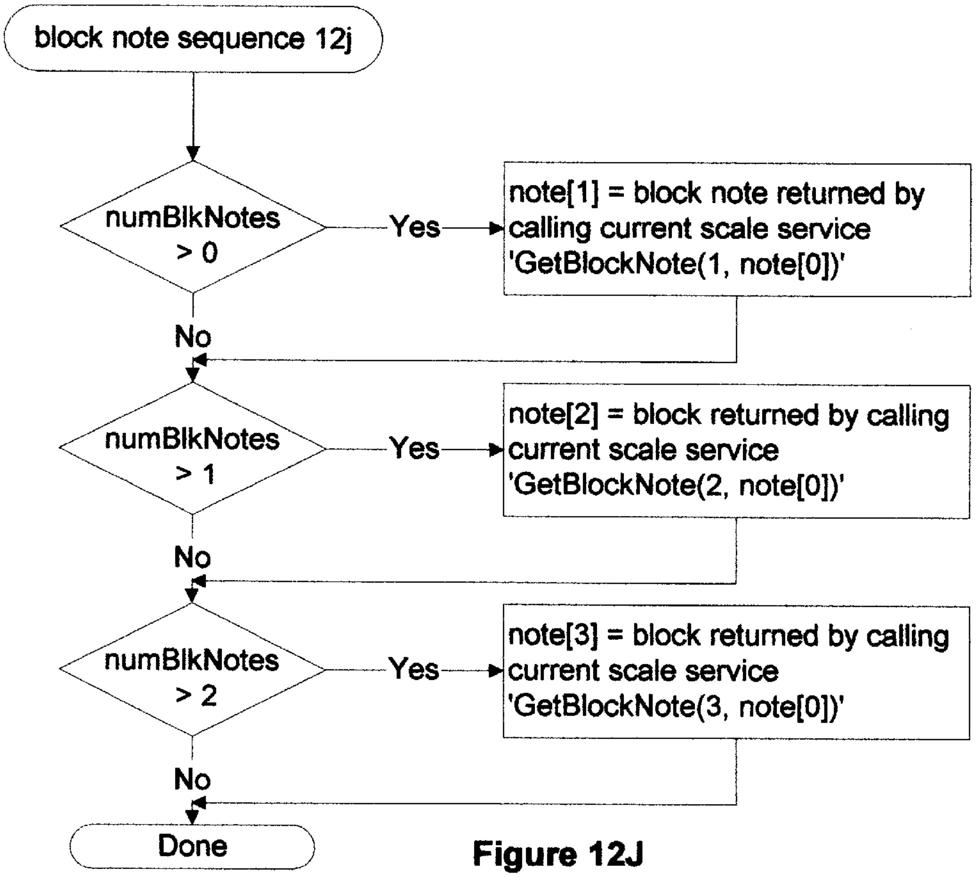

FIG. 12*h* gives a flow diagram of the remaining non-scale notes (mode=5) sequence. This sequence plays notes that are remaining after scale and chord notes are removed. It sets note[0] to the remaining non scale note by calling the service 'GetRemainNonScaleNote(colorKeyNumber)' of the current scale object in step 12*h*-1. It then adds chord (block) notes based on the numBlkNotes attributes in step 12*h*-2.

FIG. 12*j* shows a flow diagram for getting block notes.

FIG. 12*i* shows a flow diagram of the output sequence. This sequence includes adjusting each note for the octave of the key pressed and the shiftOctaveSetting attribute in step 12*i*-1. The net shift is stored in shiftOctaveApplied. Next, each non-zero note is output to the cnlNumber instance of the CnlOutput object in step 12*i*-2. The current status is also sent out to patchOut channel in step 12*i*-3 (see Table 17). Last, the original note (key) is output to the originalOut channel in step 12*i*-4.

Figure 12K:
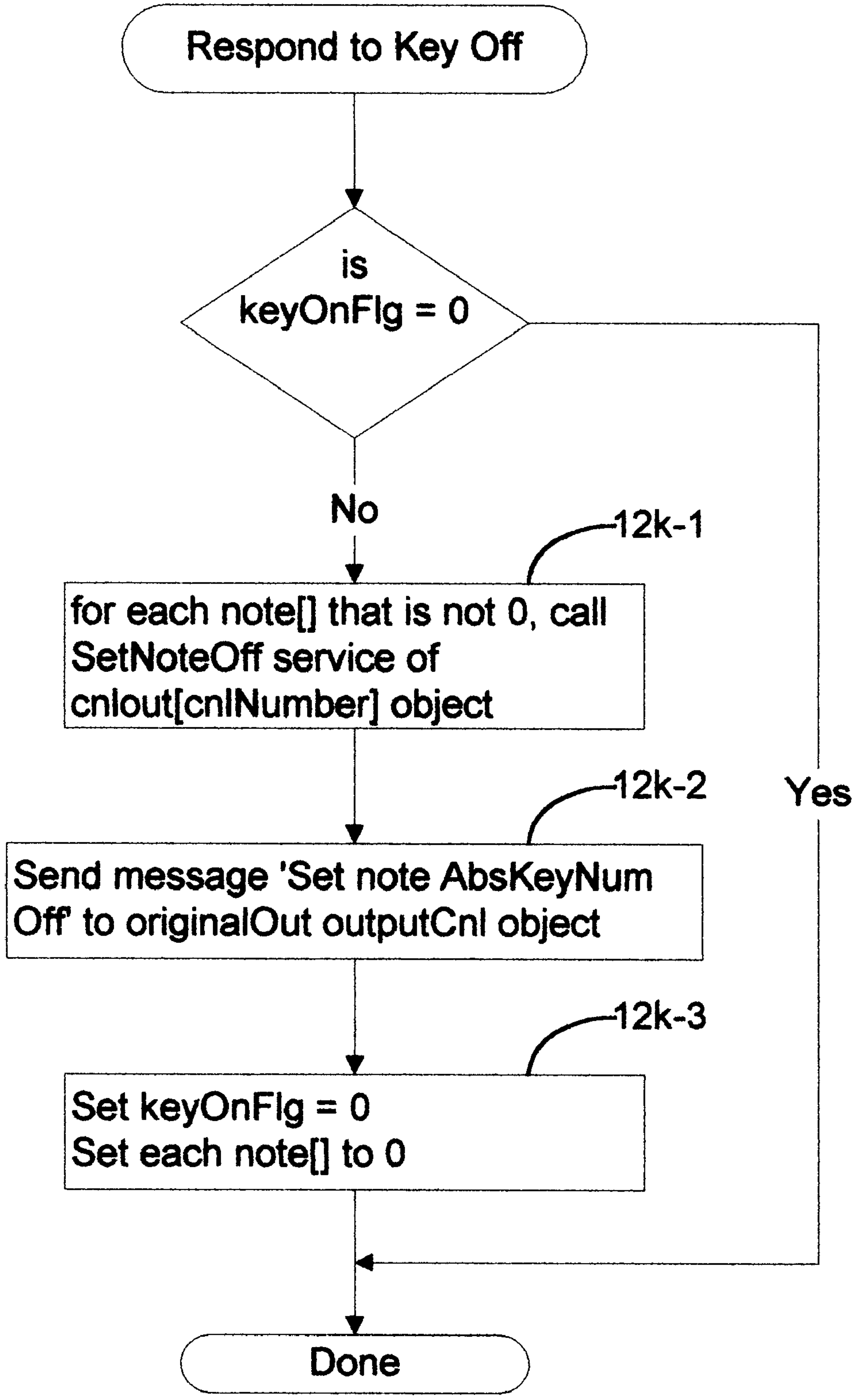

FIG. 12*k* provides a flow diagram for the service 'RespondToKeyOff()'. This service is called in response to a key being released. If the key has already been released (keyOnFlg=0) then this service does nothing. If the key has been pressed (keyOnFlg=1) then a note off is sent to channel cnlNumber for each non-zero note in step 12*k*-1. A note off message is sent for absoluteKeyNumber to originalOut output channel in step 12*k*-2. Then the keyOnFlg is cleared and the notes are cleared in step 12*k*-3.

The service CorrectKey() is called in response to a change in the current chord or scale while the key is on (keyOnFlg=1). This enables the key to correct the notes it has sent out for the new chord or scale. There are four different correction modes (see description for correctionMode attribute above). In the normal correction mode (correctionMode=0), this service behaves exactly as RespondToKeyOn() with one exception. If a new note to be turned on is already on, it will remain on. It therefore does not execute the same identical initialization sequence (FIG. 12*b*) in this mode. It first determines the notes to play (as per RespondToKeynOn() service) and then turns of only those notes that are not already on and then turns on any new notes. The solo correction modes (correctionMode=1, 2, or 3) takes this a step further. It turns off only those notes that are not in the new current chord (correctionMode=1), scale (correctionMode=2) or combined chord and scale (correctionMode=3). If a note that is already on exists anywhere in the current chord, scale or combined chord and scale it will remain on. The current chord objects service is NoteInChord() and the current scale objects services isNoteInScale and is NoteInCombinedScale() are used to determine if each note already on should be left on or turned off.

When in solo mode (correctionMode=1, 2, or 3), the original key (absKeyNum) that will be output to a unique channel, as shown in step 12*i*-4 of FIG. 12*i*. The output channel is determined by adding the correction mode multiplied by 9 to the channel determined in 12*i*-4. For example, if correctionMode is 2 then 18 is added to the channel number determined in step 12*i*-4. This allows the software to determine the correction mode when the original performance is played back.

Step 12*b*-2 of FIG. 12*b* decodes the correctionMode and channel number. The original key channels are local to the software and are not MIDI channels, as MIDI is limited to 16 channels.

The services SetMode(), SetCorrectionMode() and SetNumBlkNotes() set the mode, correctionMode and numBlkNotes attributes respectively using simple assignment (example: mode=newMode).

FIG. 13 and Table 14

The BlackMelodyKey object is responsible for handling all black melody key events. This involves, depending on mode, getting notes from the current scale object and/or chord inversion object and sending the notes out.

The class attributes for this object include mode, which may be set to one of Normal=0, RightHandChords=1 or Scale3rds=2. The attribute correctionMode controls how the service CorrectKey behaves and may be set to either Normal=0 or SoloChord=1, SoloScale=2, or SoloCombined=3. The class attribute octaveShiftSetting is set to the number of octaves to shift the output. Positive values shift up, negative shift down. Instance variables include absoluteKeyNum and colorKeyNum and octave (see FIG. 2). The attribute destChannel holds the destination channel for the key on event. keyOnFlag indicates whether the Key in pressed or not. Velocity holds the velocity the key was pressed with and note[4] holds the notes that were sounded (if any).

TABLE 14

| PianoKey::BlackMelodyKey Attributes and Services |
|---|
| Class Attributes: |
| 1. mode |
| 2. correctionMode |
| 3. octaveShiftSetting |
| Instance Attributes: |
| 1. absoluteKeyNum |
| 2. colorKeyNum |
| 3. octave |
| 4. destChannel |
| 5. keyOnFlag |
| 6. velocity |
| 7. note[4] |
| 8. octaveShiftApplied |
| Services: |
| 1. ResondToKeyOn(sourceChannel, velocity); |
| 2. RespondToKeyOff(sourceChannel); |
| 3. CorrectKey(); |
| 4. SetMode(newMode); |
| 5. SetCorrectionMode(newCorrectionMode); |
| 6. SetOctaveShift(numberOctaves); |

FIG. 13*a* through 13*f* shows a flow diagram for the RespondToKeyOn() service. This service is called in response to the black melody key being pressed. It is responsible for generating the note(s) to be sounded. It is entered with the velocity of the key press and the channel the key was received on. It starts by initializing itself in step 13*a*-1, as described below. Next, it branches to a specific sequence that is dependent on the mode in step 13*a*-2. These specific sequences generate the notes. It finishes by outputting the generated notes in step 13*a*-3.

Figure 13A:
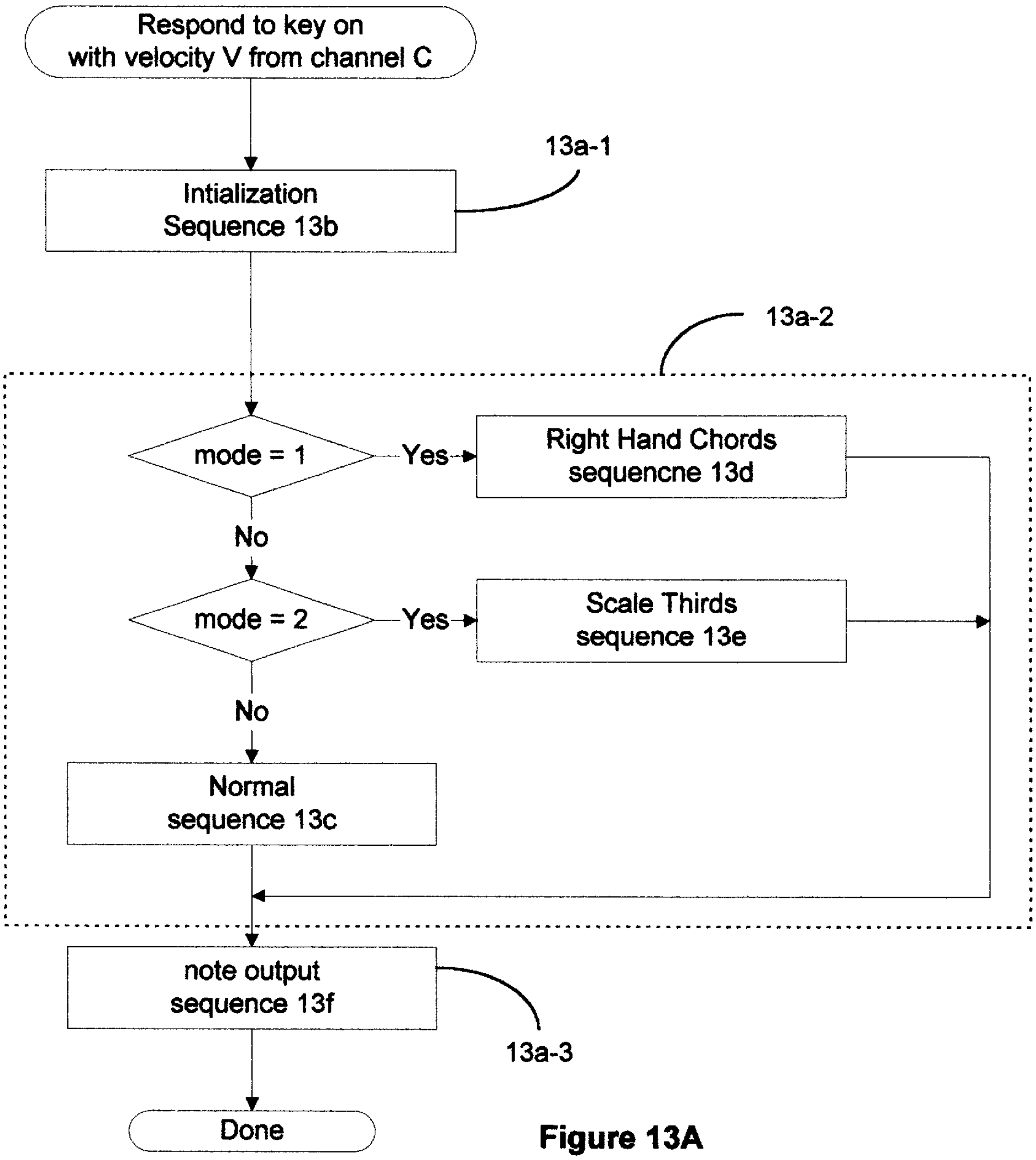
FIGS. 13A through 13F together are a logic flow diagram of the PianoKey::MelodyKey objects 'Respond To Key On' service.
Figure 13B:
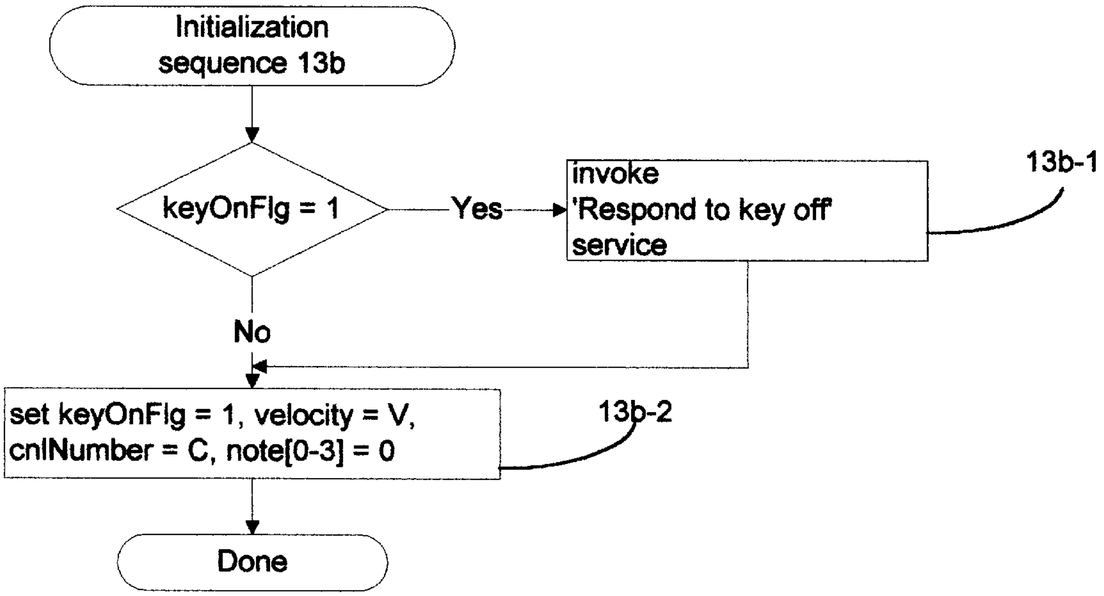

The initialization sequence, shown in FIG. 13*b*, first checks if the key is already pressed. If it is (keyOnFlg=1), the service 'RespondToKeyOff()' service will be called in step 13*b*-1. Then, keyOnFlg is set to 1, indicating the key is pressed, the velocity and destCnl attributes are set and the notes are cleared by being set to 0 in step 13*b*-2.

Figure 13F:
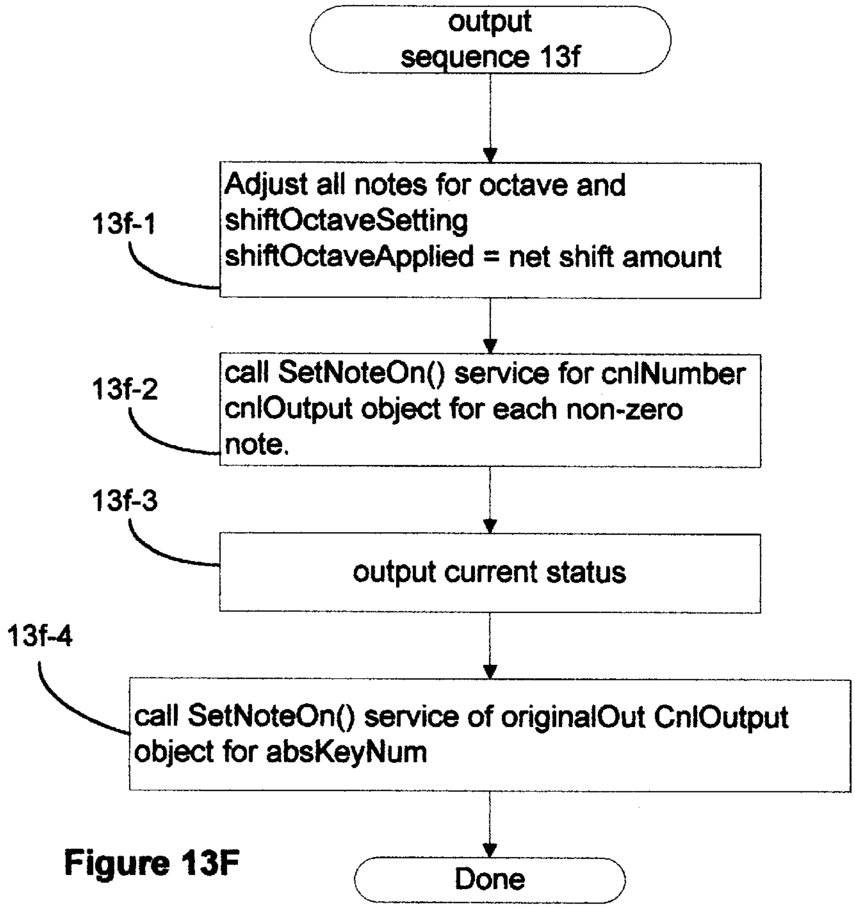
Figure 13C:
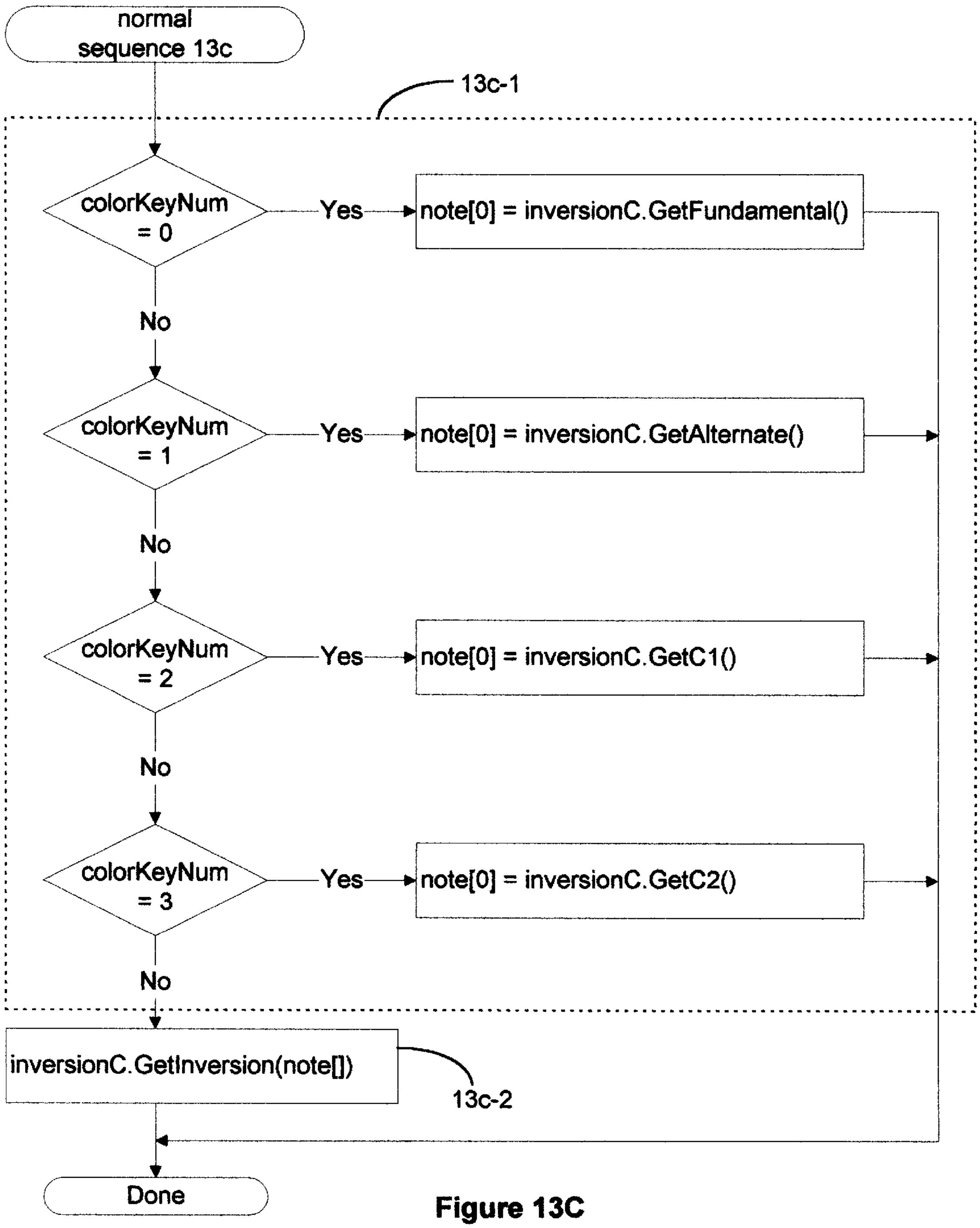

FIG. 13*c* shows a flow diagram of the normal (mode=0) sequence. The note(s) played depends on which black key it is (colorKeyNum). Black (colorKeyNum) keys 0, 1, 2, and 3 get the fundamental, alternate, C1 and C2 note of inversionC, respectively as simply diagrammed in the sequence 13*c*-1 of FIG. 13C. Black (colorKeyNum) key 4 gets the entire chord by calling the GetInversion() service of inversionC (13*c*-2).

Figure 13D:
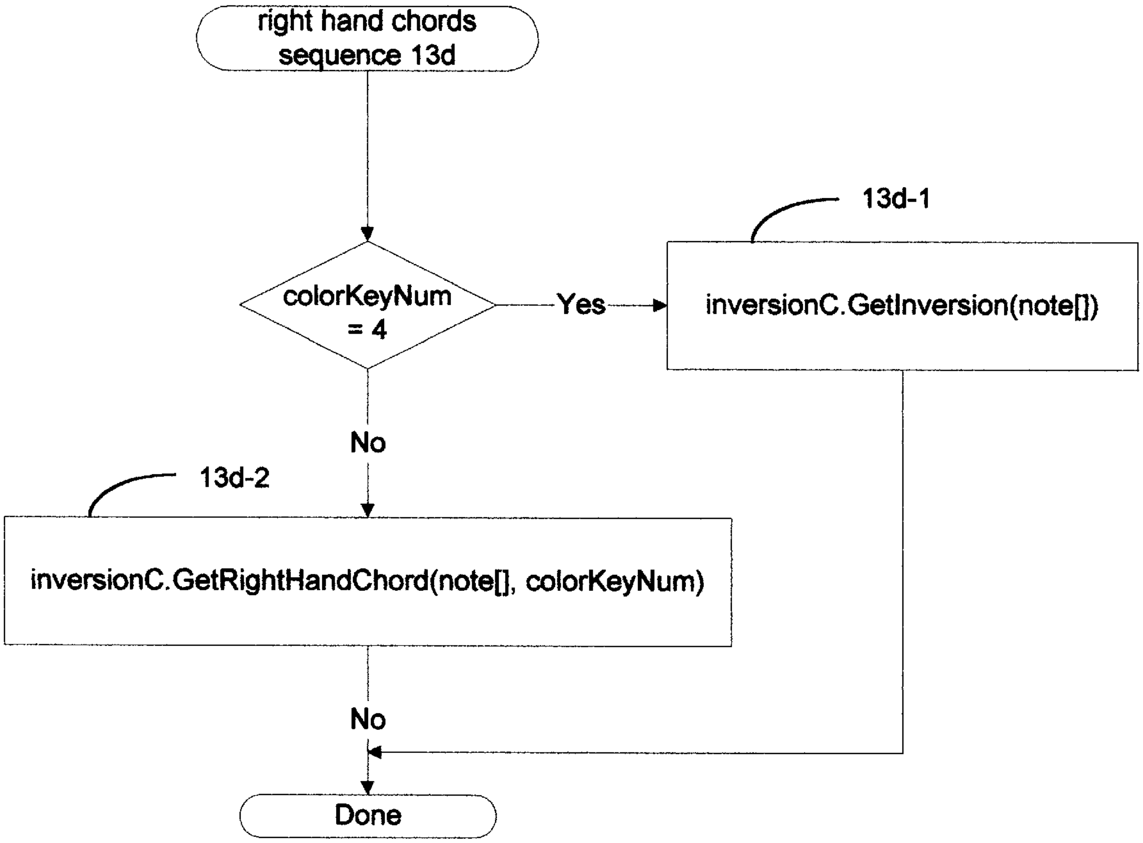

FIG. 13*d* shows a flow diagram of the right hand chords (mode=1) sequence. If the colorKeyNum attribute is 4 (meaning this is the 5th black key in the octave), then the current chord in the current inversion of inversionC is fetched and played in step 13*d*-1. Black keys 0 through 3 will get right hand chords 1 through 4 respectively.

Figure 13E:
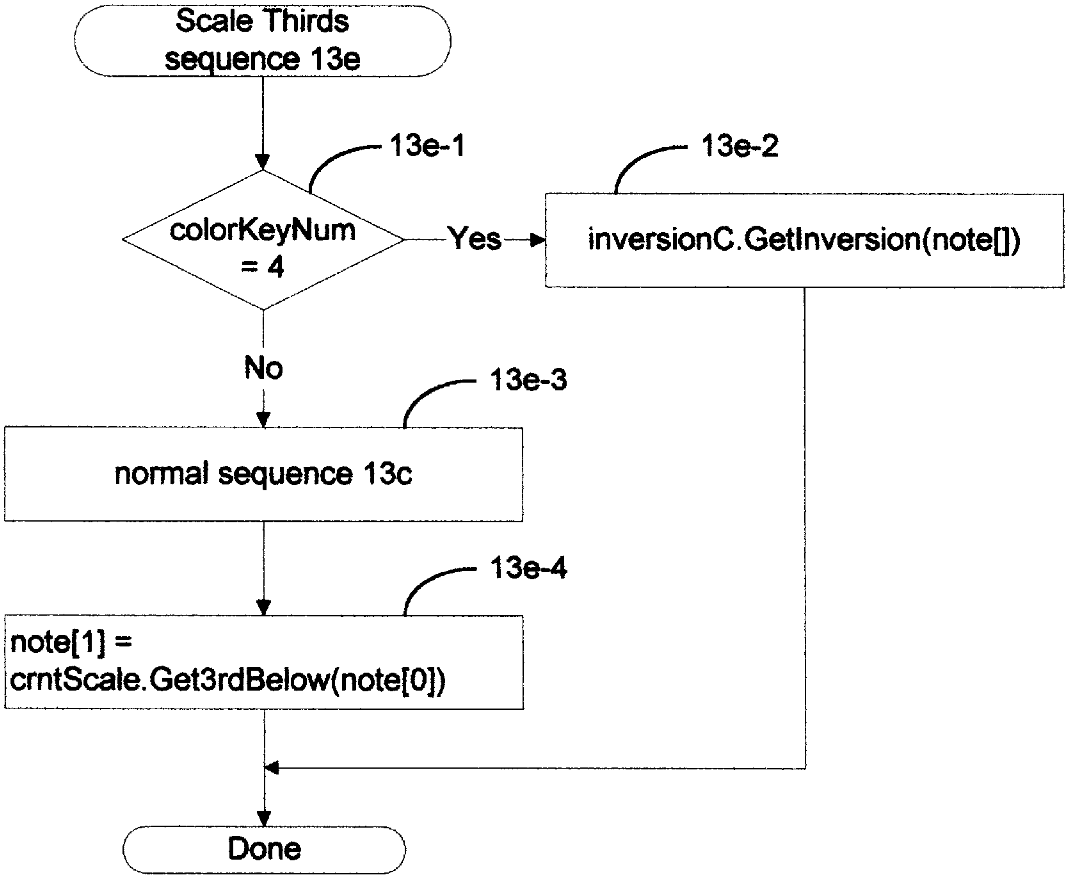

FIG. 13*e* shows a flow diagram of the scale thirds (mode=2) sequence. 13*e*-1 checks if this is the 5th black key (colorKeyNum=4). If it is, the 13*e*-2 will get the entire chord from inversionC object. If it is not the 5th black key, then the normal sequence shown in FIG. 13*c* is executed (13*e*-3). Then the note one scale third below note[0] is fetched from the current scale object (13*e*-4).

FIG. 13*f* shows a flow diagram of the output sequence. This sequence includes adjusting each note for the octave of the key pressed and the octaveShiftSetting attribute in step 13*f*-1. The net shift is stored in octaveShiftApplied. Next, each non-zero note is output to the compOut instance of the CnlOutput object in step 13*f*-2. The current status is also sent out to channel 2 in step 13*f*-3 (see Table 17). Finally, the original note (key) is output to the proper channel in step 13*f*-4.

The service RespondToKeyOff() sends note offs for each note that is on. It is identical the flow diagram shown in FIG. 12*k*.

The service CorrectKeyOn() is called in response to a change in the current chord or scale while the key is on (keyOnFlg=1). This enables the key to correct the notes it has sent out for the new chord or scale. There are four different correction modes (see description for correctionMode attribute above).

In the normal correction mode (correctionMode=0), this service behaves exactly as RespondToKeyOn() with one exception. If a new note to be turned on is already on, it will remain on. It therefore does not execute the same identical initialization sequence (FIG. 13*b*) in this mode. It first determines the notes to play (as per RespondToKeyOn() service) and then turns off only those notes that are not already on and then turns on any new notes. The solo correction modes (correctionMode=1, 2, or 3) takes this a step further. It turns off only those notes that are not in the new current chord (correctionMode=1), scale (correctionMode=2) or combined chord and scale correctionMode=3). If a note that is already on exists any wherein the current chord, scale or combined chord and scale it will remain on. The current chord objects service isNoteInChord() and the current scale objects services isNoteInScale and isNoteInCombinedScale() are used to determine if each note already on should be left on or turned off. The output channel for the original key is determined as for the while melody key as described above. It should be noted that all note correction methods described by the present invention are illustrative only, and can easily be expanded to allow note correction based on any single note, such as chord fundamental or alternate, or any note group. A specific mode may also be called for any of a plurality of input controllers.

The services SetMode() and SetCorrectionMode() set the mode and correctionMode attributes respectively using simple assignment (example: mode=newMode).

Table 15

Since the black chord progression keys play non-scale chords, they are seldom used in music production. These keys become more useful as a control (function) key or toggle switches that allow a user to easily and quickly make mode and configuration changes on the fly. Note that any key can be used as a control key, but the black chord progression keys (non-scale chords) are the obvious choice. The keys chosen to function as control keys are simply instantiated as the desired key type (as are all the other key types). The present invention uses 4 control keys. They are piano keys with absKeyNum of 49, 51, 54 and 56. They have three services, RespondToKeyOn(), RespondToProgramChange and RespondToKeyOff(). Presently, the RespondToKeyOff() service does nothing (having the service provides a consistent interface for all piano key objects, relieving the music administrator object 3-3 from having to treat these keys differently from other keys. The RespondToKeyOn() service behaves as follows. Key 49 calls config.setSongKeyBank(0), key 51 calls config.SongKeyBank(1), key 54 calls config.SetScaleBank (0), and key 56 calls config.SetScaleBank(1). Note that these same functions can be done via a user interface. A program change equal to the absKeyNum attribute is also output as for the chord progression keys (see 10–16). The service RespondToProgramChange() service is identical to the RespondToKeyOn() service. It is provided to allow received program changes (patch triggers) to have the same controlling effect as pressing the control keys.

TABLE 15

| PianoKey::ControlKey Attributes and Services |
| --- |
| Attributes: |
| 1. absKeyNum |
| Services: |
| 1. RespondToKeyOn(sourceChannel, velocity); |
| 2. RespondToKeyOff(sourceChannel) |
| 3. RespondToProgramChange(sourceChannel); |

FIGS. 14*a*, 14*b*, 14*c*, 14*d* and 14*e and Table* 16

There is one instance of the music administrator object called musicAdm 3-3. This is the main driver software for the present invention. It is responsible for getting music input from the music input object 3-4 and calling the appropriate service for the appropriate piano key object 3-6. The piano key services called will almost always be RespondToKeyOn() or RespondToKeyOff(). Some music input may be routed directly to the music output object 3-12. Table 16 shows the music administrators attributes and services. Although the description that follows assumes there are 16 input channels, the description is applicable for any number of input channels. All attributes except melodyKeyFlg[16][128] are user setable per user preference. The attribute mode applies to all input channels and may be either off (0) or on (1). The array melodyKeyFlg [16][128] is an array of flags that indicate which melody keys are on (flag=1) and which are off (flag=0). The array holds 128 keys for each of 16 input channels. The cnlMode [16] attribute holds the mode for each of 16 input channels. This mode may be one of normal, bypass or off If cnlMode [y]=bypass, then input from channel y will bypass any processing and be heard like a regular keyboard. Data which represents bypassed musical data can be provided utilizing a plurality of input controllers on the instrument. Data representing bypassed musical data will include note-identifying information that will identify a note or notes in accordance with that of a regular keyboard (i.e. such as when no chord note, scale note, etc. processing is taking place). Data representing bypassed musical data allows a user to perform notes with the appearance that they are playing regular keyboard notes, and that no musical processing is taking place. The notes to be sounded could play musical notes, trigger drum sounds, etc. Those of ordinary skill in the art will recognize that any number of input controllers on a given instrument may be utilized for bypassed performance. Other input controllers on the instrument may optionally be used for scale note/chord note performance, etc. If cnlMode [x]=off, then input from channel x will be discarded or filtered out. The attribute firstMldyKey[16] identifies the first melody key for each input channel. FirstMldyKey[y]=60 indicates that for channel y, keys 0–59 are to be interpreted as chord progression keys and keys 60–127 are to be interpreted as melody keys. FirstMldyKey[x]=0 indicates that channel x is to contain only melody keys and firstMldyKey[z]=128 indicates that channel z is to contain only chord progression keys. The attribute chordProcCnl [16] and mldyProcCnl[16] identify the process channel for an input channel's chord progression keys and melody keys respectively. This gives a user the ability to map input to different channels, and/or to combine input from 2 or more channels and to split the chord and melody keys to 2 different channels if desired. By default, the process channels are the same as the receive channel.

It should be noted that multiple instruments of the present invention can be connected in a variety of ways and combinations at any point in time during a given performance. For example, an individual instrument which is connected with one or more other instruments may include its own software or program, may share software or a program with at least one other connected instrument, or any and all combinations of these. The instruments of the present invention can be connected utilizing a variety of communication means known in the art. Ways of connecting one or more instruments of the present invention, as well as various forms of communication means utilized to connect the instruments of the present invention, will become apparent to those of ordinary skill in the art.

TABLE 16

| Music Administrator Objects Attributes and Services |
| --- |
| Attributes: |
| 1. mode |
| 2. melodyKeyFlg[16][128] |
| 3. cnlMode[16] |
| 4. firstMldyKey[16] |
| 5. chordProcCnl[16] |
| 6. mldyProcCnl[16] |
| Services: |
| 1. Update(); |
| 2. SetMode(newMode); |
| 3. SetCnlMode(cnlNum, newMode); |
| 4. SetFirstMldyKey(cnlNum, keyNum); |
| 5. SetProcCnl(cnlNum, chordCnl, mldyCnl); |
| 6. CorrectKeys(); |

The service SetMode(x) sets the mode attribute to x The service SetCnlMode(x, y) sets attribute cnlMode[x] to y. SetFirstMldyKey(x, y) sets firstMldyKey[x] to y and the service SetProcCnl(x, y, z) sets attribute chordProcCnl[x] to y and attribute mldyProcCnl[x] to z. The above services are called by the user interface object 3-2.

The Update() service is called by main (or, in some operating systems, by the real time kernel or other process scheduler). This service is the music software's main execution thread. FIGS. 14*a* through 14*d* show a flow diagram of this service. It first checks if there is any music input received in step 14*a*-1 and does nothing if not. If there is input ready, step 14*a*-2 gets the music input from the music input object 3-4. This music input includes the key number (KeyNum in FIGS. 14*a* through 14*d*), the velocity of the key press or release, the channel number (cnl in FIG. 14) and whether the key is on (pressed) or off (released).

If mode attribute is off (mode=0) then the music input is simply echoed directly to the output in step 14*a*-4 with the destination channel being specified by the attribute mldyProcCnl[rcvCnl]. There is no processing of the music if mode is off If mode is on (mode=1), then the receiving channel is checked to see if it is in bypass mode in step 14*a*-5. If it is, then the output is output in step 14*a*-4 without any processing. If not in bypass mode, then step 14*a*-6 checks if the channel is off. If it is off then execution returns to the beginning. If it is on execution proceeds with the flow diagram shown in FIG. 14*b*.

Step 14*b*-2 checks if it is a key on or off message. If it is, then step 14*b*-3 checks if it is a chord progression key (keys <firstMldyKey[cnl]) or a melody key (>=firstMldyKey [cnl]). Processing of chord progression keys proceeds with U3 (FIG. 14*c*) and processing of melody keys proceeds with U4 (FIG. 14*d*). If it is not a key on/off message then step 14*b*-4 checks if it is a program change (or patch trigger). If it is not then it is a pitch bend or other MIDI message and is sent unprocessed to the output object by step 14*b*-7, after which it returns to U1 to process the next music input. If the input is a patch trigger then step 14*b*-5 checks if the patch trigger is for a chord progession key indicated by the program number being <firstMldyKey[cnl]. If it is not, then the patch trigger is sent to the current status object in step 14*b*-8 by calling the RcvStatus(patchTrigger) service (see Table 17) and then calling the CorrectKey() service (14*b*-9), followed by returning to U1.

If the patch trigger is for a chord progression key, then step 14*b*-6 calls the RespondToProgramChange() service of the chordKey of the same number as the patch trigger after changing the channel number to that specified in the attribute chordProcCnl[rcvCnl] where rcvCnl is the channel the program change was received on. Execution then returns to U1 to process the next music input.

Figure 14A:
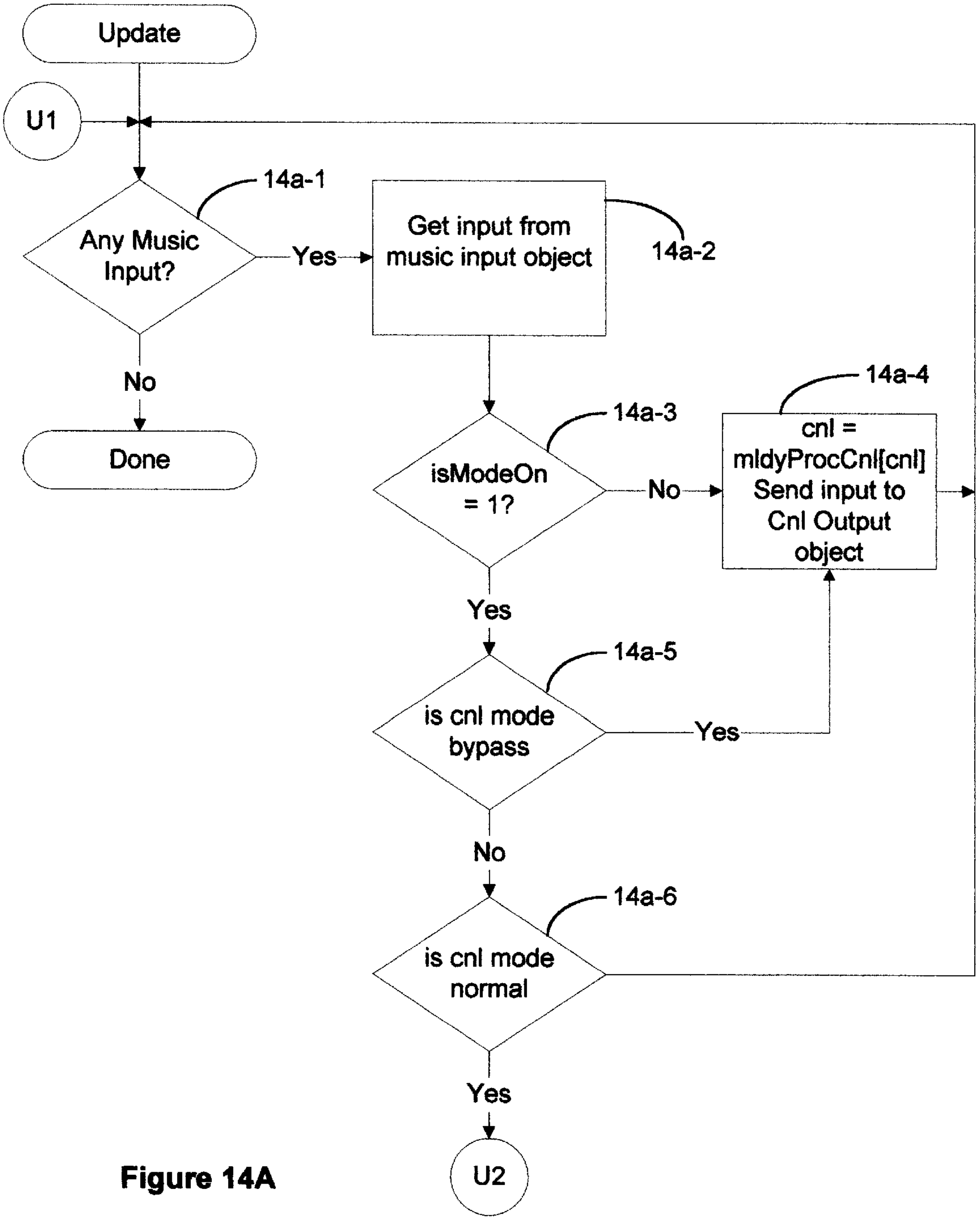
FIGS. 14A through 14D together are a logic flow diagram of Music Administrator objects 'Update' service.
Figure 14B:
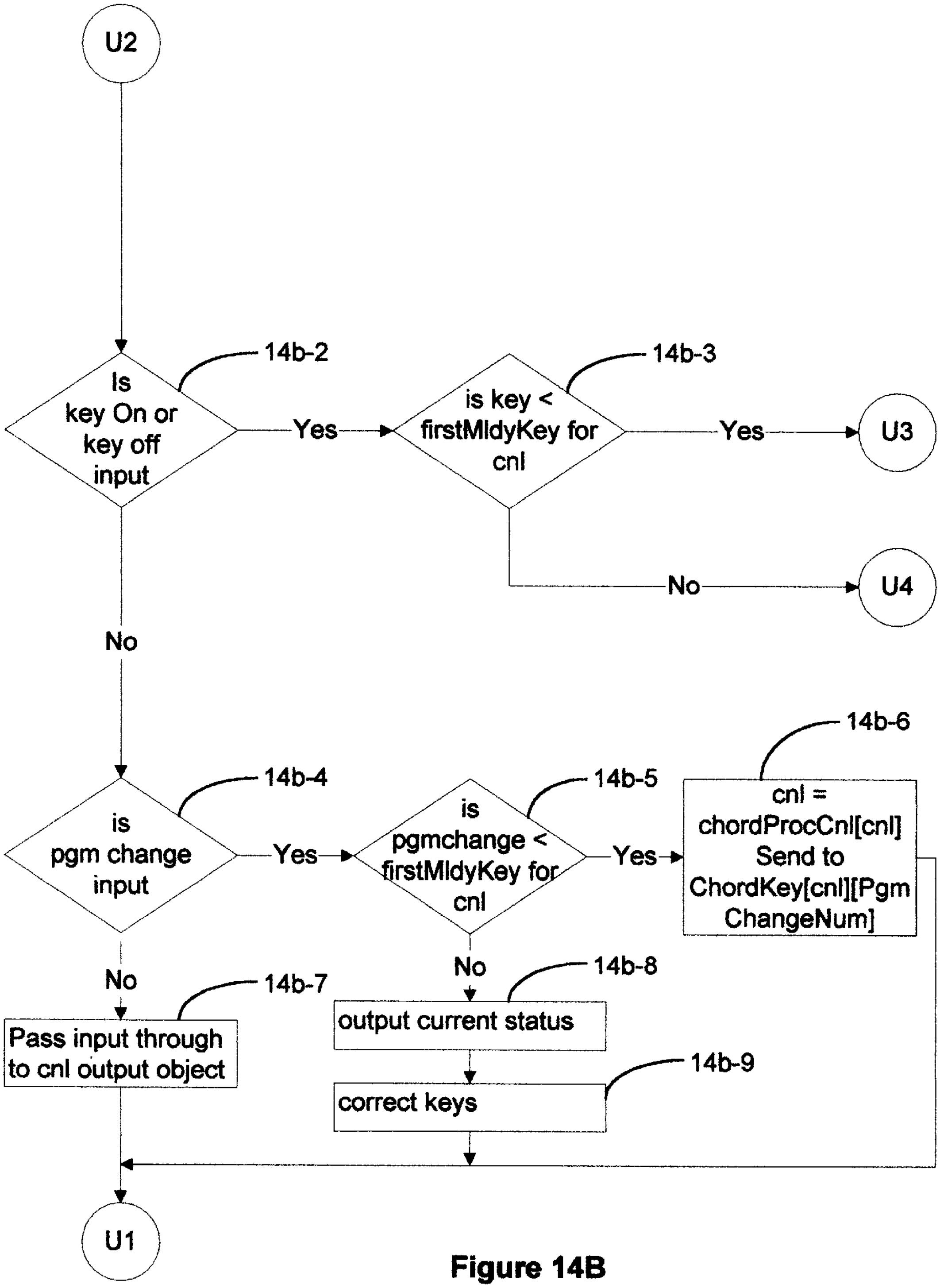
Figure 14C:
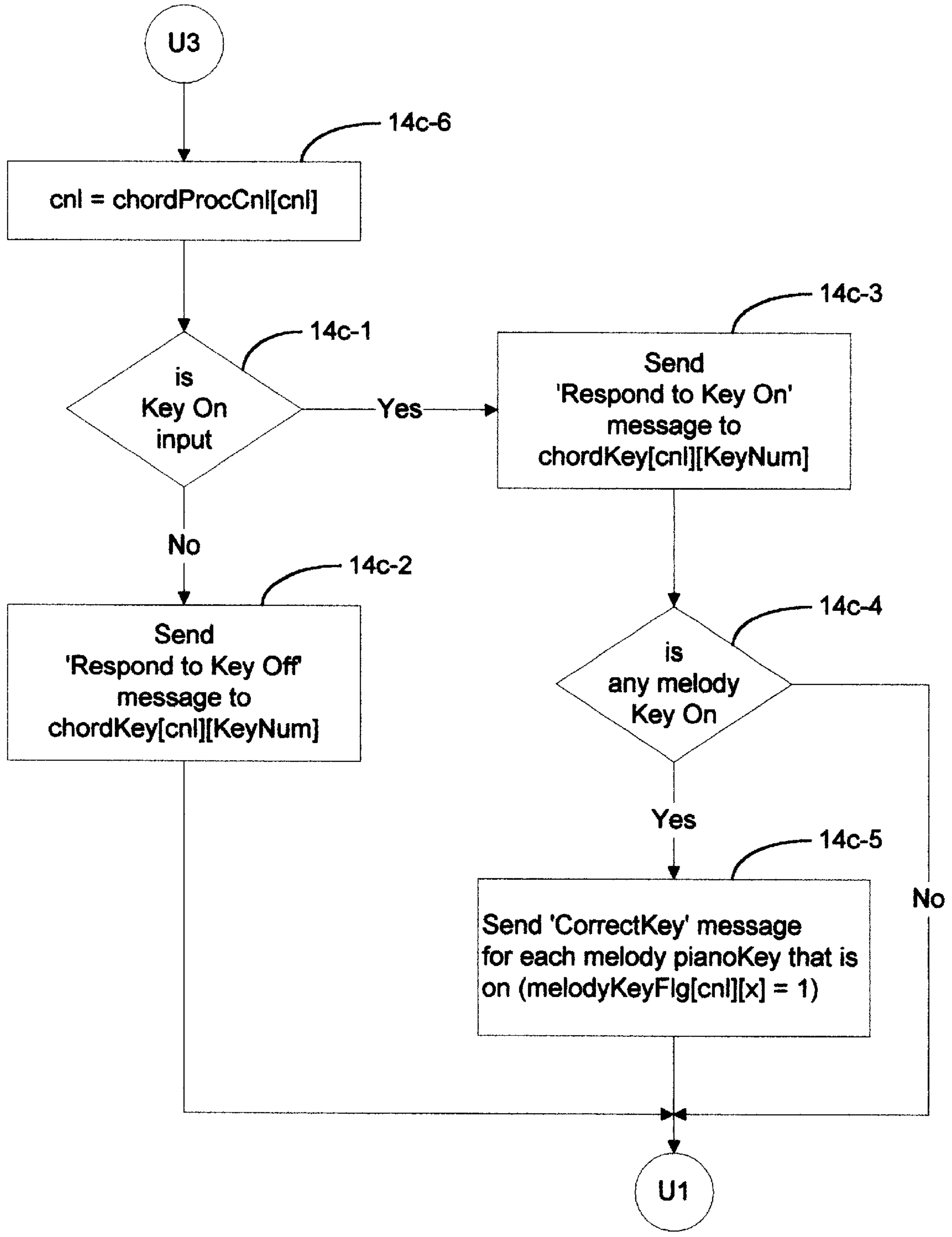
Figure 14D:
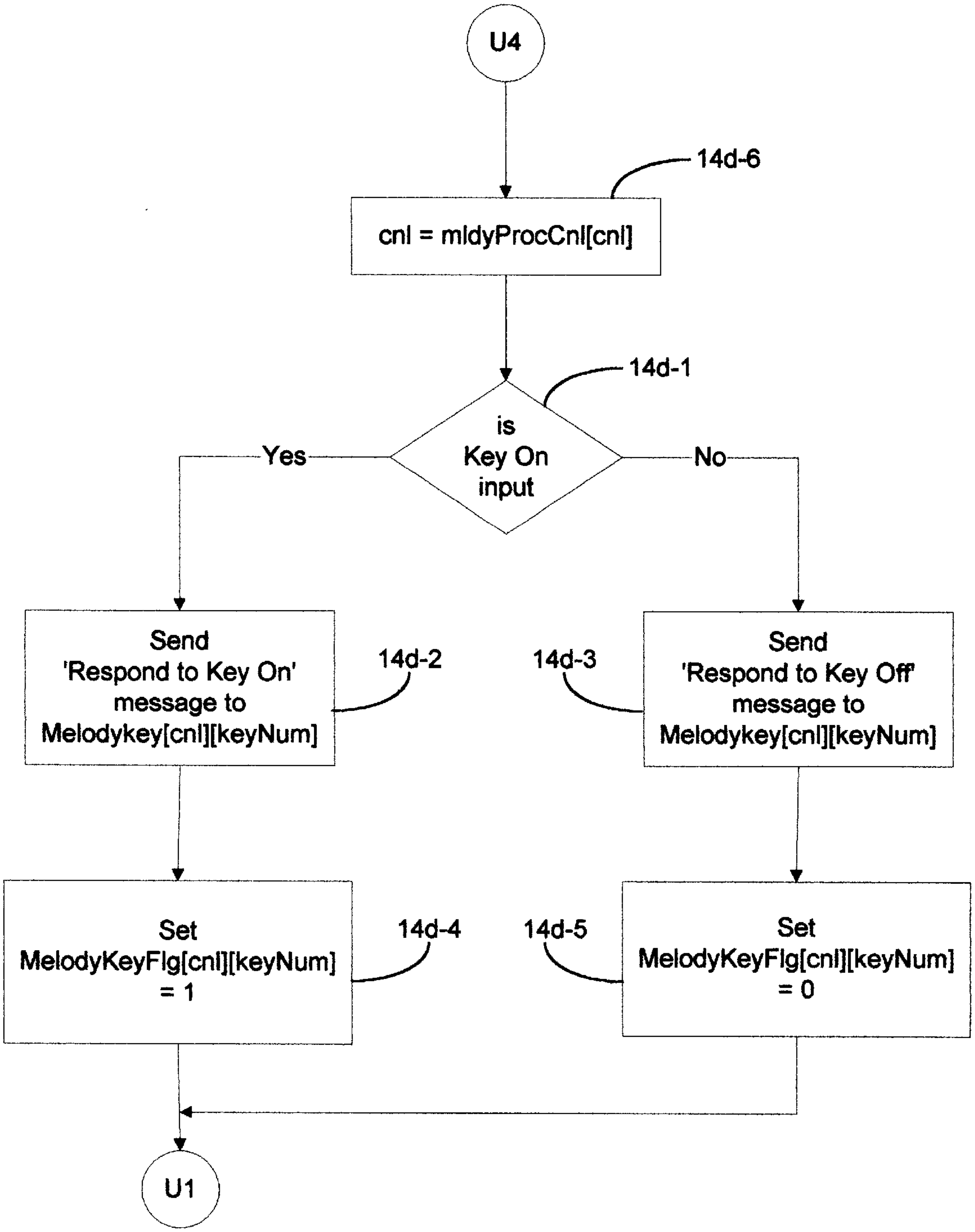

Referring to FIG. 14*c*, step 14*c*-6 changes the channel (cnl in FIG. 14) to that specified by the attribute chordProcCnl [cnl]. Next, step 14*c*-1 checks if the music input is a key on message. If it is not, step 14*c*-2 calls the RespondToKeyOff() service of the key. If it is, step 14*c*-3 calls the RespondToKeyOn() service. After the KeyOn service is called, steps 14*c*-4 and 14*c*-5 call the CorrectKey() service of any melody key that is in the on state, indicated by melodyKeyFlg[cnl][Key number]=1. Processing then proceeds to the next music input.

Referring to FIG. 14*d*, step 14*d*-6 changes the channel (cnl in FIG. 14) to that specified by the attribute mldyProcCnl[cnl]. Next, step 14*d*-1 checks if the melody key input is a Key On message. If it is, then step 14*d*-2 calls the RespondToKeyOn() service of the specified melody key. This is followed by step 14*d*-4 setting the melodyKeyFlg [cnl][key] to 1 indicating that the key is in the on state. If the music input is a key off message, then step 14*d*-3 calls the RespondToKeyOff() service and step 14*d*-5 clears the melodyKeyflg[cnl][key] to 0. Execution then proceeds to U1 to process the next input.

In the description thus far, if a user presses more than one key in the chord progression section, all keys will sound chords, but only the last key pressed will assign (or trigger) the current chord and current scale. It should be apparent that the music administrator object could be modified slightly so that only the lowest key pressed or the last key pressed will sound chords.

The CorrectKeys() service is called by the user interface in reponse to the song key being changed or changes in chord or scale assignments. This service is responsible for calling the CorrectKey() services of the chord progression key(s) that are on followed by calling the CorrectKey() services of the black and white melody keys that are on.

Table 17

Table 17 shows the current status objects attributes and services. This object, not shown in FIG. 3, is responsible for sending and receiving the current status which includes the song key, the current chord (fundamental and type), the current scale (root and type). Current status may also include the current chord inversion, a relative chord position identifier (see Table 2, last two rows), as well as various other identifiers described herein (not shown in Table 17). The current status message sent and received comprises 6 consecutive patch changes in the form 61, 1*aa,* 1*bb,* 1*cc,* 1*dd* and 1*ee,* where 61 is the patch change that identifies the beginning of the current status message (patch changes 0–59 are reserved for the chord progression keys).

aa is the current song key added to 100 to produce 1*aa.* The value of aa is found in the song key attribute row of Table 2 (when minor song keys are added, the value will range from 0 through 23). bb is the current chord fundamental added to 100. The value of bb is also found in the song key attribute row of Table 2, where the number represents the note in the row above it. cc is the current chord type added to 100. The value of cc is found in the Index column of Table 4. dd is the root note of the current scale added to 100. The value of dd is found the same as bb. ee is the current scale type added to 100. The possible values of ee are found in the Index column of Table 6a.

The attributes are used only by the service RcvStatus() which receives the current status message one patch change at a time. The attribute state identifies the state or value of the received status byte (patch change). When state is 0, RcvStatus() does nothing unless statusByte is 61 in which case is set state to 1. The state attribute is set to 1 any time a 61 is received. When state is 1, 100 is subtracted from statusByte and checked if a valid song key. If it is then it is stored in rcvdSongKey and state is set to 2. If not a valid song key, state is set to 0. Similarly, rcvdChordFund (state=2), rcvdChordType (state=3), rcvdScaleRoot (state=4) and rcvdScaleType (state=5) are sequentially set to the status byte after 100 is subtracted and value tested for validity. The state is always set to 0 upon reception of invalid value. After rcvdScaleType is set, the current song key, chord and scale are set according to the received values and state is set to 0 in preparation for the next current status message.

The service SendCurrentStatus() prepares the current status message by sending patch change 61 to channel 2, fetching the song key, current chord and current scale values, adding 100 to each value and outputting each to channel 2.

It should also be noted that the current status message may be utilized to generate a "musical metronome". Traditional metronomes click on each beat to provide rhythmic guidance during a given performance. A "musical metronome", however, will allow a user to get a feel for chord changes in a given performance. When the first current status message is read during playback, the current chord fundamental is determined, and a note on is provided for the fundamental. When a new fundamental is read in a subsequent status message, the present fundamental note is turned off, and the new fundamental note is turned on, and so on. The final fundamental note off is sent when a user terminates the performance.

TABLE 17

| Current Status Objects Attributes and Services |
| --- |
| Attributes: |
| 1. state |
| 2. rcvdSongKey |
| 3. rcvdChordFund |
| 4. rcvdChordType |
| 5. rcvdScaleRoot |
| 6. rcvdScaleType |
| Services: |
| 1. SendCurrentStatus(); |
| 2. RcvStatus(statusByte); |

An alternative to the current status message described is to simplify it by identifying only which chord, scale, and song key bank (of the configuration object) is selected, rather than identifying the specific chord, scale, and song key. In this case, 61 could be scale bank 1, 62 scale bank 2, 63 chord group bank 1, 64 chord group bank 2, 65 song key bank 1, 66 song key bank 2, etc. The RcvStatus() service would, after reception of each patch trigger, would call the appropriate service of the configuration object, such as SetScaleBank(1 or 2). However, if the configuration has changed since the received current status message was sent, the resulting chord, scale, and song key may be not what a user expected. It should be noted that all current status messages as well as patch triggers described herein may be output during performance from both the chord section's input controllers, as well as from the melody section's input controllers. The current status message and/or patch trigger is stored. Playing any key in the melody section will output the current status message and/or trigger allowing a chord progression to be established during a melody key performance. This is useful when a user is recording a performance, but has not yet established a chord progression utilizing the chord progression keys.

Table 18

There is one music input object musicIn 3-4. Table 18 shows its attributes and services. This is the interface to the music input hardware. The low level software interface is usually provided by the hardware manufacturer as a 'device driver'. This object is responsible for providing a consistent interface to the hardware "device drivers" of many different vendors. It has five main attributes. keyRcvdFlag is set to 1 when a key pressed or released event (or other input) has been received. The array rcvdKeyBuffer[] is an input buffer that stores many received events in the order they were received. This array along with the attributes bufferHead and bufferTail enable this object to implement a standard first in first out (FIFO) buffer. The attribute ChannelMap[64] is a table of channel translations. ChannelMap[n]=y will cause data received on channel n to be treated as if received on channel y. This allows data from two or more different sources to combined on a single channel if desired.

The services include isKeyInputRcvd() which returns true (1) if an event has been received and is waiting to be read and processed. GetMusicInputo returns the next event received in the order it was received. The InterruptHandler() service is called in response to a hardware interrupt triggered by the received event. The MapChannelTo(inputCnl, outputCnl) service will set ChannelMap[inputCnl] to outputCnl. The use and implementation of the music input object is straight forward common. Normally, all input is received from a single source or cable. For most MIDI systems, this limits the input to 16 channels. The music input object 3-4 can accommodate inputs from more than one source (hardware device/cable). For the second, third and fourth source inputs (if present), the music input object adds 16, 32 and 48 respectfully to the actual MIDI channel number. This extends the input capability to 64 channels.

TABLE 18

| Music Input Objects Attributes and Services |
|---|
| Attributes: |
| 1. keyRcvdFlag |
| 2. rcvdKeyBuffer[n] |
| 3. channelMap[64] |
| 4. bufferHead |
| 5. bufferTail |
| Services: |
| 1. isKeyInputRcvd(); keyRcvdFlag |
| 2. GetMusicInput(); rcvdKeyBuffer[bufferTail] |
| 3. InterruptHandler() |
| 4. MapChannelTo(inputCnl, outputCnl); |

Table 19

There is one music output object musicOut 3-12. Table 19 shows its attributes and services. This is the interface to the music output hardware (which is usually the same as the input hardware). The low level software interface is usually provided by the hardware manufacturer as a 'device driver'. This object is responsible for providing a consistent interface to the hardware 'device drivers' of many different vendors.

The musicOut object has three main attributes. The array outputKeyBuffer[] is an output buffer that stores many notes and other music messages to be output This array along with the attributes bufferHead and bufferTail enable this object to implement a standard first in first out (FIFO) buffer or output queue.

The service OutputMusic() queues music output. The InterruptHandler() service is called in response to a hardware interrupt triggered by the output hardware being ready for more output. It outputs music in the order is was stored in the output queue. The use and implementation of the music output object is straight forward and common. As with the music input object 3-4, the music output object 3-12 can accommodate outputing to more than one physical destination (hardware device/cable). Output specified for channels 1–16, 17–32, 33–48 and 49–64 are directed to the first, second, third and fourth destination devices respectfully.

TABLE 19

| Music Output Objects Attributes and Services |
|---|
| Attributes: |
| 1. outputKeyBuffer[n] |
| 2. bufferHead |
| 3. bufferTail |
| Services: |
| 1. OutputMusic(outputByte); |
| 2. InterruptHandler(); |

Figure 15:
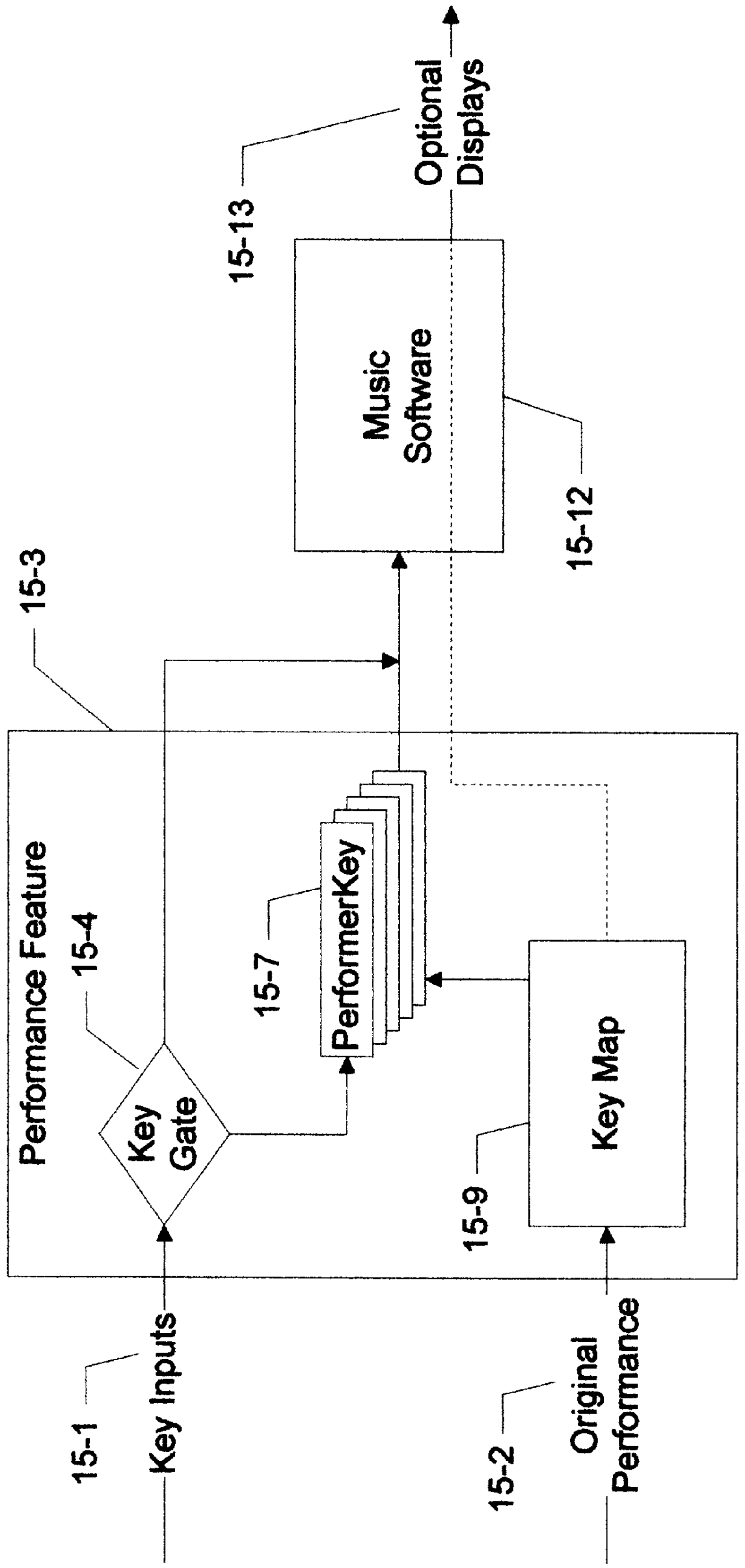
FIG. 15 is a general overview of one embodiment of the re-performance function of the present invention.

FIG. 15 and Tables 21 and 22.

FIG. 15 shows a general overview of replaying a previously recorded or stored performance from a single octave even if the original performance represents a composition originally played from several octaves. The method uses indicators or "indications" to allow a user to discern which input controllers to play in a given performance. The use of indicators for visually assisted musical performances is well known in the art, and generally involves a controller which contains the processing unit, which may comprise a conventional microprocessor. The controller retrieves indicator information in a predetermined order from a source. The processing unit determines a location on the musical instrument corresponding to said indicator information. The determined location is indicated to a user where the user should physically engage the instrument in order to initiate the intended musical performance. Indicators can be LEDs, lamps, alphanumeric displays, etc. Indicators can be positioned on or near the input controllers utilized for performance. They can also be positioned in some other manner, so long as a user can discern which indicator corresponds to which performance input controller. Indicators may also be displayed on a computer monitor or other display, such as by using depictions of performance input controllers and their respective indications, etc. The indication system described herein, may be incorporated into the instrument of the present invention, or may comprise a stand-alone unit which is provided to complete the musical instrument of the present invention. Those of ordinary skill in the art will recognize that the indicators, as described herein, can be provided in a variety of ways.

A musical indicator system of the type that can be used to execute the performance feature shown in FIG. 15, as well as for providing various indicators described herein is described in U.S. Pat. No. 5,266,735, incorporated herein by reference.

The performance method involves two software objects, the Performance Feature 15-3 and PerformerKey 15-7. Although the Performance Feature 15-3 is actually part of the music software 15-12, for purposes of illustration it is shown separate. What the Performance Feature 15-3 does is intercept live key inputs 15-1 and previously recorded original performance key inputs 15-2 and translate these into the original performance which is then presented to the music software 15-12 to be processed as an original performance. Thus the previously recorded or stored original performance is played back under the control of the live Key Inputs 15-1 in a given performance. For purposes of clarification, a "given performance" is defined herein to be any song, musical segment, composition, specific part or parts in the previously said, etc. currently being performed by a user. The performance function of the present invention, allows a user to effect a given performance from a chosen number of input controllers. As one example, a song may be performed using four input controllers, or twelve input controllers. The given performance as described herein will be readily identifiable and apparent to a user, regardless of the number of input controllers used to effect the performance. The harmony modes described herein may also be used in a given performance, and may be set differently for each skill level, if preferred. Additional indications including those described herein, may also be utilized. It should also be noted that the words "recorded" and "stored" are used interchangeably herein to describe the present invention.

Referring again to FIG. 15, the live key inputs 15-1 correspond to the key inputs 1-13 of FIG. 1A. The previously recorded original performance input 15-2 is from the sequencer 1-22 in FIG. 1A. The input may also be from a variety of other sources, including interchangeable storage devices such as CDs or the like. This is useful for providing a user with pre-stored data, such as that which may represent a collection of popular songs, for example. FIG. 15, 15-2 is referred to as an 'original performance' because it is a sequence of actual keys pressed and presented to the music software and not the processed output from the music software. When the Performance Feature 15-3 utilizes original performance input 15-2 to be presented to the music software for processing, the original performance will be re-processed by the music software 15-12. The music software 15-12 is the same as 1-10 in FIG. 1A and the optional displays 1-18 of FIG. 1A corresponds to 15-13 of FIG. 15.

The PerformerKey object 15-7 will be discussed before the Performance Feature object 15-3. Table 22 shows the four attributes of the PerformerKey object 15-7. Attribute isEngaged is set to TRUE when the object is engaged and is set to FALSE when the object is disengaged. The defaultKey attribute holds the default key (MIDI note) value for the object and armedKey[11] is an array of 11 keys that each PerformerKey object 15-7 may be armed with. The attribute velocity holds the velocity parameter received with the last Engage(velocity) service. Each instance of PerformerKey object 15-7 is initialized with isEngaged=FALSE, default key=−1, velocity=0 and each armedKey[] set to −1. The value −1 indicates the attribute is null or empty. The service SetDfltKey(keyNum) will set the defaultKey attribute to keyNum where keyNum is a MIDI note number in the range 0 to 127. The service Engage(v) will set attributes isEngaged to TRUE and velocity to v and will send a MIDI note on message with velocity v for each key (MIDI note number) in the attribute armedKey[] to the music software object 15-12. If there are no keys in the armedkey[] attribute, then a note on message with velocity v is sent for the defaultKey attribute if set. The service Disengage() will set isEngaged to FALSE and will send a note off message for each key in armedkey[] to the music software object 15-12. If there are no keys in the armedKey[] attribute, then a note off message is sent for the defaultKey attribute if set. By having a default key, a user will always hear something when a key is pressed, even if it is not part of the previously recorded original performance. The service Arm(keyNum) will first place keyNum in the armedKey[] array (if not already). If this is the first key in the armedKey[] array then an indicator corresponding to the key is illuminated indicating to a user that this key is armed with an original performance event that needs to be played. Then, if isEngaged is TRUE, a note on message for keyNum will be sent (with velocity) to the music software object 15-12. If isEngaged is TRUE and keyNum is the first key to be placed in armedkey[] attribute, then a note off message for the default key will also be sent to the music software object 15-12. The service DisArm (service) will remove keyNum from armedkey[] array. If isEngaged is TRUE, then a note off message for keyNum will be sent to the music software object 15-12. If isEngaged is TRUE and keyNum was the only key in the armedKey[] array then a note on message with velocity for the defaultKey attribute (if set) will be sent to the music software object 15-12. When the last key is removed from the armedKey[] array, then the indicator corresponding to the physical key is turned off. The net effect of the above behavior is that in response to a live key being received (and Engaging a PerformerKey object) a previously recorded key (having armed the PerformerKey object) will be played (presented to the music software object 15-12) and the live keys that are armed will be indicated to the user.

Table 21 lists The Performance Feature 15-3 attributes and services. The attribute performerOctave identifies the 1$^{st}$ key of the octave where a user wishes to perform a previously recorded performance. PerformerKey[12] is an array of 12 instances of the PerformerKey objects 15-7 as described above, one instance for each key in one octave. The last attribute is the key map 15-9. This maps or identifies which PerformerKey[] instance should be armed with a given original performance key. The present invention maps all C keys (relative key 0, see FIG. 2) to the 1$^{st}$ PerformerKey instance, all C sharps to the 2$^{nd}$ instance etc.

The mapping scenario described herein in one embodiment of the present invention, is done by dividing an original performance key by 12 and letting the remainder (modulus) identify the instance of PerformerKey[] 15-7 that should be armed with that original performance key. This enables the original performance to be performed from a reduced number of keys. The service SetPerformanceOctave (firstNoteNum) establishes which octave will play the original performance by setting performerOctave attribute to firstNoteNum and then setting the default key of each PerformerKey[] instance 15-7 to be the actual keys of the octave. This is done by calling the SetDfltKey(n) service of each PerformerKey[] instance 15-7. The service RcvLiveKey(keyEvent) responds to live key inputs and acts like a key gate 15-4. The keyEvent contains the status, note number, channel and velocity information. Note numbers that are not in the performer octave are passed directly to the music software object 15-12. Note On messages that are in the performer octave result in calling the Engage(v) service of PerformerKey[r] 15-7 where v is the velocity and r is the relative key number of the received note on. Similarly note off messages that are in the performer octave result in calling the Disengage() service of PerformerKey[r] 15-7 where r is the relative key number of the received note on. The service RcvOriginalPerformance(keyEvent) receives previously recorded key events and current status messages. The current status messages and all non note on/off messages are passed directly to the music software object 15-12 (see table 17 for description of current status). Note on message for note number x will result in calling the Arm(x) service of PerformerKey[y] where y is obtained from the key map attribute 15-9 (in the present invention, y=x % 12 where % is the modulus or "remainder from division" operator). For example, note number 24 calls Arm(24) of PerformerKey [0], while note number 30 calls Arm(30) of PerformerKey [6]. Similarly, note off message for note number x will result in calling the DisArm(x) service of PerformerKey[y] where y is determined the same as for note on messages. When a performerKey 15-7 is armed with a previously recorded note on/off event, then playing the appropriate live key will result in that previously recorded note on/off event being replayed.

A chord section performance is effected using essentially the same technique as described previously. The Chord Performance Feature uses all of the same elements shown in FIG. 15, as well as in its associated figures and tables. Therefore, the Chord Performance Feature will be described using these same elements. The Chord Performance Feature also maps all C keys to the 1$^{st}$ ChordPerformerKey instance, all C sharps to the 2$^{nd}$ instance etc., as before. This allows all chords originally performed as 1-4-5, etc. to be played back respectively from a 1-4-5 . . . input controller. Everything else also works the same, except for the following;

Depressing keys in the chord section during a given chord section performance, will not cause chord and scale changes in the melody section. Only current status is utilized to accomplish this. All of the PerformerKey objects are armed in each instance with a designated BlackMelodyKey (colorKeyNum)=4 (i.e. absoluteKeyNumber 58, 70, etc., see FIG. 2). This is due to the fact that these absoluteKeyNumbers will always output the current chord. The original performance notes, however, will be used to determine which PerformerKey to arm and to provide with an indicator. For example, using the previously described mapping formula, note number 24 calls Arm(58) of PerformerKey[0], while note number 30 calls Arm(58) of PerformerKey[6]. Note off message for note number x will result in calling the DisArm(58) service of PerformerKey[y]. The service DisArm(service) will remove keyNum from armedKey[] array. If isEngaged is TRUE, then keyNum is left in armedKey[] array, and is not turned off Its corresponding indicator is also left on. When the Disengage() service is called, a note off message is sent for keyNum, keyNum is removed from armedKey[] array, and the indicator corresponding to the physical key is turned off. It should be noted that some embodiments of the present invention do not allow individual chord key assignments. The chords in the chord progression section are normally loaded as banks. These embodiments may use the Performance Feature as described initially, without using the designated BlackMelodyKey as keyNum. If this method is used, the attribute defaultKey may be updated dynamically by replacing any previous note value in defaultKey with the note value of each key being added to armedkey[] array. This will allow a user to play the last chord performed, even if an indication is not currently being displayed for the input controller.

The previously described performance scenario is illustrative only. The number of ChordKey object instances and PerformerKey object instances can each be varied, and a variety of mapping scenarios can be utilized. A user may effect a given performance from any number of input controllers, although four to twelve is currently preferred. It should also be noted that the methods described herein, may also be used to perform music as it was originally played or stored. In this event, original performance key inputs 15-2 are not translated into the original performance presented to the music software 15-12. Instead, only the indicators are needed for each key, as described previously, indicating to a user the performance as originally played. This will not provide the advantage of multiple skill levels as described herein, but it will still provide distinct advantages over prior art.

Those of ordinary skill in the art will recognize that previously stored processed performance input, may also be routed and assigned on-the-fly to produce processed output. The indicators described herein, can be provided using the original performance input, or the indicators can be generated based on the processed performance input. A variety of combinations are possible, and may be utilized with the various techniques described herein. The previously said methods will, however, lack the flexibility of the method described herein. Also, the number of performance processors can easily be expanded to at least sixteen (one for each of the 16 MIDI channels). This allows multiple users to perform simultaneously, each playing their own given performance part. The given performance part selected by each user may be different, allowing multiple users to cumulatively effect an entire song. At least one user in the group may perform in bypassed mode, as described herein, allowing drum play, traditional keyboard play, etc.

In one embodiment of the performance methods described herein, a CD or other storage device may be utilized for to effect a performance. Some or all of the performance information described herein, can be stored on an information track of the CD or storage device. A sound recording may also be included on the CD or storage device. This will allow a user to effect a given performance, such as of a song's melody line, along with and in sync to the sound recording. To accomplish this, MTC (MIDI Time Code) or some other form of sync, as described previously, can be recorded on one of the CD's tracks. The software then reads the sync signal during CD playback, and locks to it. The software must be locked to the MTC or other sync signals provided by the CD. This will allow data representative of chord changes and/or scale changes stored in the sequencer, to be in sync with those of the CD's sound recording track during lockup and playback. This may require the creation of a sequencer tempo map, known in the art, so that additional music data can be recorded into the sequencer during a given performance. The performance information stored on the CD can be time-indexed and stored in such a way as to be in sync (during lockup and playback), with the performance information stored in the sequencer. It may also be stored according to preference. Optionally, the CD may contain only a sync signal, along with the sound recording. The sync signal is then read by the software, and all music processing will take place completely within the software as described herein. The data representative of chord changes and/or scale changes stored in the sequencer, will still need to be in sync and musically-correct (during lockup and playback), with the chord changes in the CD's sound recording.

The setup configuration data described herein can also be stored on the CD or selected storage device. It is then read by the software on playback, to cause real-time selection of a setup configuration before the sound recording and given performance begins. Various needed performance data for each song can be recorded as a data dump on an information track of the CD. The data dump is then read by the software before re-performance begins. This allows all needed performance data for each song on the CD, to be loaded into memory and indexed. A song selection signal is then stored at the beginning of each song on the CD, on an information track. The song selection signal is then read by the software before a given performance of each song commences. This allows all corresponding data needed for each song, to be accessed from memory for proper performance. Each CD is then self-contained. All of the appropriate data needed for performance of each song on the CD, is included.

It should be noted that data representative of an original performance track as described herein, can also be recorded on a CD which includes a sound recording. The CD may also have a recorded information track containing data representative of chord and scale changes, known in the art. The original performance information may be merged with the data representative of chord and scale changes, and recorded on one of the CD's tracks. Optionally, the various information may be recorded using more than one CD track. The chord and scale change data are recorded on the CD in such a way as to be in sync, and musically correct, with the chord and scale changes contained in the sound recording on the CD. Original performance information can then be recorded on an information track of the CD, so as to be in sync with the data representative of chord changes and scale changes. It is also recorded in sync with the sound recording on the CD. This allows a given performance as described herein to be achieved on such known systems, without the need for the recorded synchronization track described herein to be present on the CD.

TABLE 21

| Performance Feature Attributes and Services |
| --- |
| Attributes: |
| 1. performerOctave |
| 2. PerformerKey[12] |
| 3. Key Map |

TABLE 21-continued

| Performance Feature Attributes and Services |
| --- |
| Services: |
| 1. SetPerformerOctave(firstNoteNum); |
| 2. RcvLiveKey(keyEvent); |
| 3. RcvOriginalPerformance(keyEvent); |

TABLE 22

| PerformerKey Attributes and Services |
| --- |
| Attributes: |
| 1. isEngaged |
| 2. defaultKey |
| 3. velocity |
| 4. armedKeys[11] |
| Services: |
| 1. Engage(velocity); |
| 2. Disengage(); |
| 3. Arm(keyNum); |
| 4. DisArm(keyNum); |
| 5. SetDefaultKey(keyNum); |

FIGS. 16A through 16F

Figure 16A:
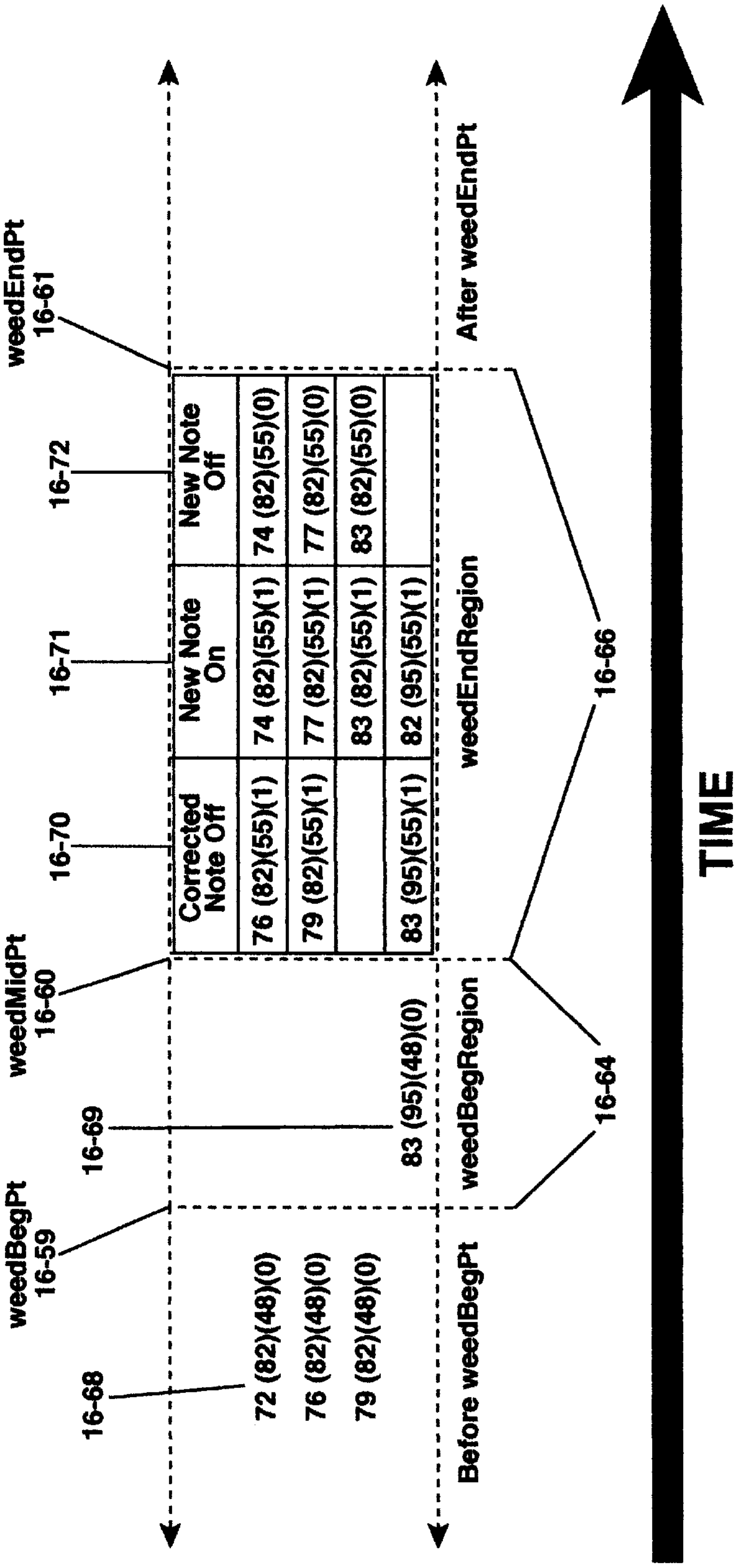
FIG. 16A is a general overview depicting one example of the weedout function of the present invention.

FIG. 16A shows a general overview of one embodiment of the weedout function of the present invention. The selected embodiments of auto-correction described herein by the present invention, can allow one or more notes to play through a chord and/or scale change occurrence, while one or more other notes are turned off and/or turned on. The weedout function of the present invention can be used to modify one or more possibly undesirable notes, which correspond to real-time events representative of chord and/or scale changes. The chord and/or scale changes as described herein by the present invention, can be initiated in a variety of ways. When utilizing auto-correction, a specific real-time event representative of at least a chord and/or scale change will become apparent to a user during a given performance, as one or more notes are automatically corrected. Various embodiments of the weedout function described herein, can be performed automatically and/or on-the-fly, such as during or after a performance is recorded or stored. The weedout function can also be performed at a user's discretion, such as through a selection from a user interface, etc. It is usually performed either on a range of chord or scale changes, or only on specific chord or scale changes. As previously described herein, the service CorrectKey() is called in response to a change in the current chord or scale while the key is on (keyOnFlg=1). This enables the key to correct the notes it has sent out for the new chord or scale. The notes shown in FIG. 16A (without parenthesis), represent processed performance notes of a recorded or stored performance. In this example, a chord and scale change have occurred at 16-60. Various corrected note off events are then generated and stored at 16-70, which correspond to the corrected note on events shown by 16-68 and 16-69. Various new note on events are then generated and stored at 16-71, and various new note off events which correspond to the new note on events, have been provided and stored at 16-72, with each group being stored in the order shown. When utilizing this embodiment of the weedout function, three additional bytes (shown in parenthesis) are encoded into each processed note on event, and into each processed note off event generated by each key (absoluteKeyNumber). If a chord performance and melody performance are to be recorded or stored together, it is currently preferred to encode only processed note on/off events generated by the melodyKeys. Processed note on/off events generated by the chordkeys are ignored during the weedout process. The first byte shown is equal to absoluteKeyNumber (called absoluteWeedKey). The second byte is equal to the current chordkey being played (called chordKeyWeed). This chordKey value (0–127) is stored as chordKeyWeed when a chordkey is pressed (chordKeyWeed default at startup is a Major "1" chord, i.e. 48, assuming melody section also uses default of 48). The chordKeyWeed value is updated each time a new chordKey is pressed, and the chordKeyWeed value is encoded into each processed note on/off event produced by the melodyKeys (chordKeys optional), including input on multiple channels. Optionally, the chordKeyWeed value may also be encoded into all original performance events (absoluteKeyNumber) as well, for utilization in other embodiments of the present invention. On embodiments utilizing multiple key presses, a different chordkey value can be sent for each key press combination. This allows each key combination to have its own chordKeyWeed value. When the CorrectKey() service is called for a key, the chordKeyWeed value is encoded into each corrected note off event 16-70 (FIG. 16A), and into each new note on event 16-71 sent out, if any. The third byte is used to identify an event as either a non-corrected event (notCor=0), or a corrected event (isCor=1). The corrected event identifier isCor (=1), is encoded into any corrected note off event(s) 16-70 and/or new note on event(s) 16-71, sent out as a result of calling the service CorrectKey(). Otherwise a non-corrected event identifier notCor (=0) is encoded into each processed note on/off event sent out. It should be noted that these three additional bytes are encoded only in data internal to the software. They are not included in data streams output to a sound source.

Figure 16C:
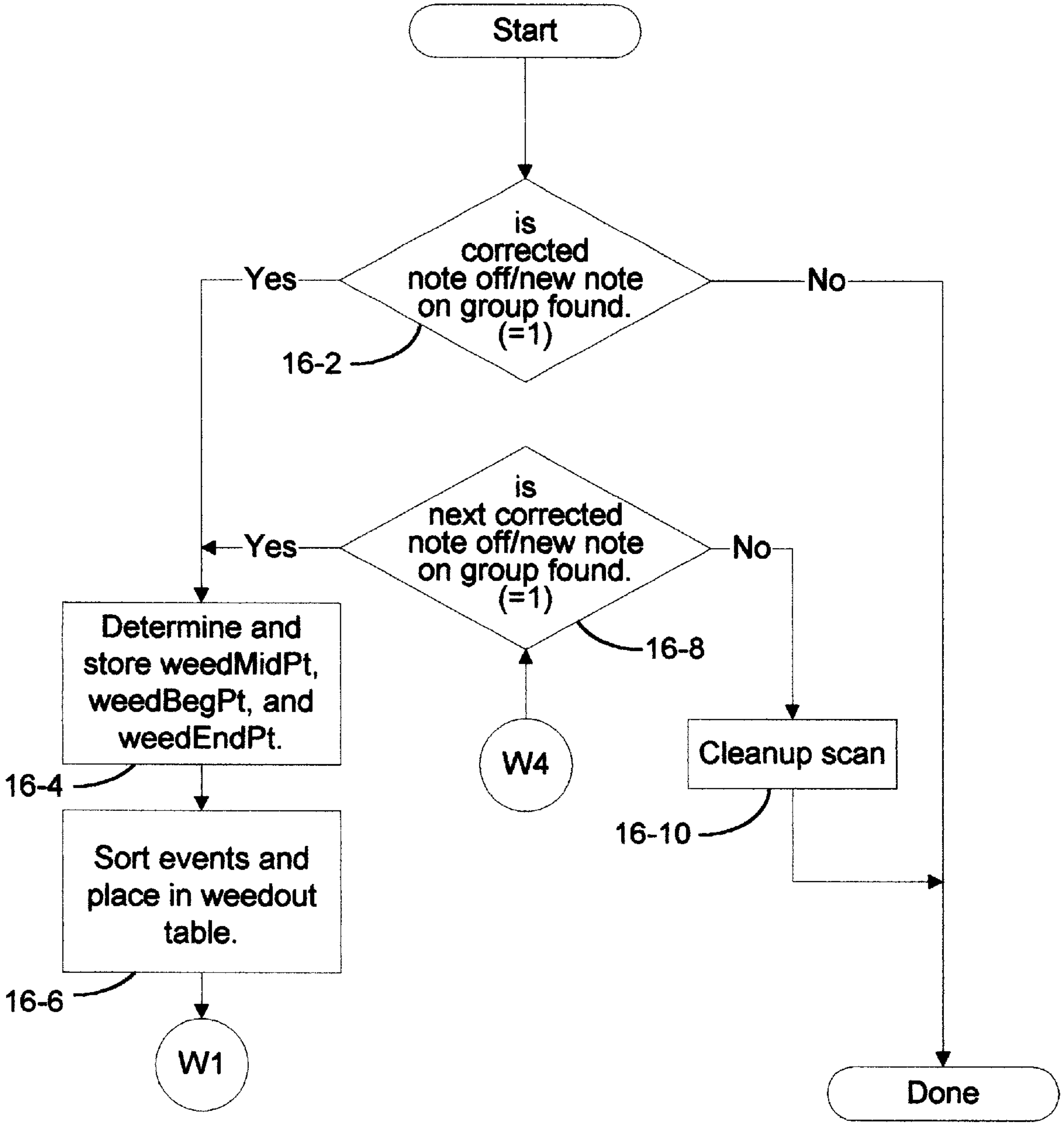
FIGS. 16C, through 16F together are a logic flow diagram of one example of the weedout function of the present invention

FIGS. 16C through 16F show a flow diagram for one embodiment of the weedout function of the present invention. The weedout process is normally performed on one selected storage area or "track" at a time. The routine is run more than once if there are additional selected storage areas or "tracks" requiring weedout. Referring first to FIG. 16C, step 16-2 traces forward through the selected storage area or "indexed event list" starting at the beginning. If no corrected note off event or new note on event (1) is found in the event list, then processing finishes (possibly proceeding to a next selected storage area). If a first corrected note off event or new note on event (1) is found in step 16-2, then its index is stored as currentWeedindex. Step 16-4 then stores the indexed note event's chordKeyWeed value as currentWeedGroup. The location of the indexed note event is determined and stored as weedMidPt (FIG. 16A 16-60). The weedMidPt 16-60 location value is normally determined according to tick resolution, timing byte(s), time out message(s), measure marker(s), etc., all of which are well known in the art and apparent to those of ordinary skill. Step 16-4 (FIG. 16C), then determines and stores the weedBeginningPt (FIG. 16A 16-59), and the weedEndPt 16-61 (weedMidpt−weedBeginningRegion=weedBeginningPt, and weedMidPt+weedEndRegion=weedEndPt). Normally, the weedBeginningRegion 16-64, and weedEndRegion 16-66, can be set by a user from the user interface. For example, on a 480 tick-per-quarter note sequencer, an eighth note range (240 ticks), a sixteenth note range (120 ticks), etc. can each be used as values for the weedBeginfl Region 16-64, and the weedEndRegion 16-66. Optionally, the weedBeginnigRegion 16-64, and the weedEndRegion 16-66, may be generated by calling a service (i.e. WeedRegionSettings ()). This allows the weedBeginningRegion 16-64, and the weedEndRegion 16-66, to be based on a style of play occurring before a given chord or scale change, for example. One example of this is to determine the location(s) of a selected note on event or note on events occurring before a given chord or scale change occurrence (such as in a measure). Intervals between note on events, or between a selected note on event and the chord or scale change occurrence, then be calculated and averaged. This will give a good indication of a user's particular style of play before the occurrence of the chord or scale change. The weedBeginningRegion 16-64, and the weedEndRegion 16-66, may be set based on this style of play, etc. Also, these region values may be automatically adjusted based on an adjustment in the current tempo of a song. As the tempo is increased, the regions will increase by a specified amount, and vice versa. It should be noted that the weedEndRegion 16-66 (FIG. 16A), should always be set to a value large enough so as to include at least all corrected note off events 16-70, and all new note on events 16-71, which are sent out as a result of a given chord or scale change 16-60. The size of the weedEndRegion 16-66 that is actually required, may vary depending on the system in which the weedout function of the present invention is utilized. Many variations of weedout range adjustment, and weedout range determination are possible, and will become apparent to those of ordinary skill in the art.

After completing step 16-4 (FIG. 16C), step 16-6 then copies into an array the indexed note event, as well as all other note events that reside in the area up to the weedEndPt 16-61 (shown as weedEndRegion 16-66, FIG. 16A). Each note event's location is also determined and stored in the array, along with its respective note event. Note events and their determined locations are then sorted and placed in a table as illustrated by FIG. 16B (determined locations and various other note event data are not shown). The array is sorted, and note event(s) and their respective location(s) are placed in the table as follows . . . Only note events with a chordKeyWeed value equal to the currentWeedGroup value, as well as a corrected status byte=1 are placed in the table, as shown in FIG. 16B. When the first note event meeting these first two criteria is found in the array, its absoluteWeedKey value is stored as tempWeedKey. Its absoluteWeedKey value is also placed in an array called tempWeedKeyArray[]. The note event and its determined location are then placed in column 16-82 if it is a note off event, and 16-84 if it is a note on event. Tracing commences for the next note event which meets the first two matching criteria, as well as a third criteria in which its absoluteWeedKey value must equal the current tempWeedKey value. If found, this next note event as well as its determined location, are placed as before in the table according to whether it is a note off event 16-82, or a note on event 16-84. This process repeats until no more note events are found in the array meeting these three criteria 16-86. Then, the array is scanned again from the beginning for a next note event meeting the first two previously said criteria, as well as one additional criteria . . . The note event's absoluteWeedKey value must not equal any of the absoluteWeedKey value(s) stored in tempWeedKeyArray[] 16-88. If a note event is found meeting the previously said criteria, then its absoluteWeedKey value is added to the tempWeedKeyArray[]. Its absoluteWeedKey value is also stored in tempWeedKey, replacing the previous value. Its note event and its determined location are placed in the next available empty row of the table 16-88, as well as in the appropriate column of the table, as described previously. As shown in FIG. 16B, this sometimes leaves empty spaces, wherein a corrected note off event may have no corresponding new note on event, or a new note on event may have no corresponding corrected note off event. Tracing commences for the next note event which meets the first two matching criteria, as well as a third criteria in which its absoluteWeedKey value must equal the current tempWeedKey value. If found, this next note event as well as its determined location, are placed as before in the table according to whether it is a note off event 16-82, or a note on event 16-84. The previously described process keeps repeating until all appropriate note events are placed in the table as shown. The table should never include note events with non-matching currentWeedGroup values 16-86 and 16-88. Also, all note events should be corrected note events (1). It should be noted that corrected note off events in the table 16-82, if any, may also be matched with a closest possible new note on event 16-84, if any (but only if they have matching absoluteWeedKeys). This allows for smoother playback after the weedout process is performed. The table previously created is referenced in order to perform editing in the current weedout region of the storage area (FIG. 16A). Processing now proceeds with W1 (FIG. 16D).

Figure 16D:
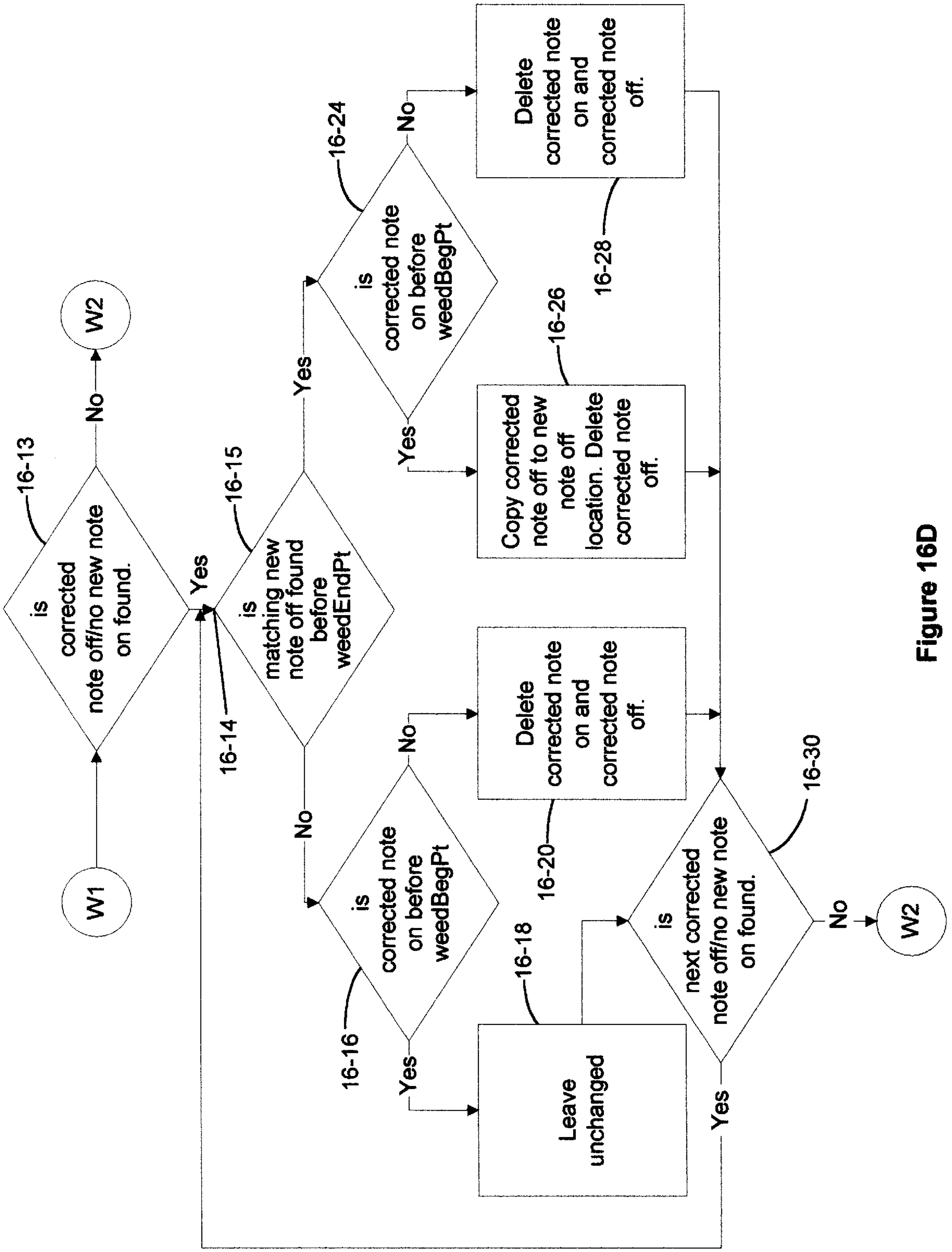
FIG. 16B is an illustrative table depicting note event data utilized in one example of the weedout function of the present invention.
Figure 16E:
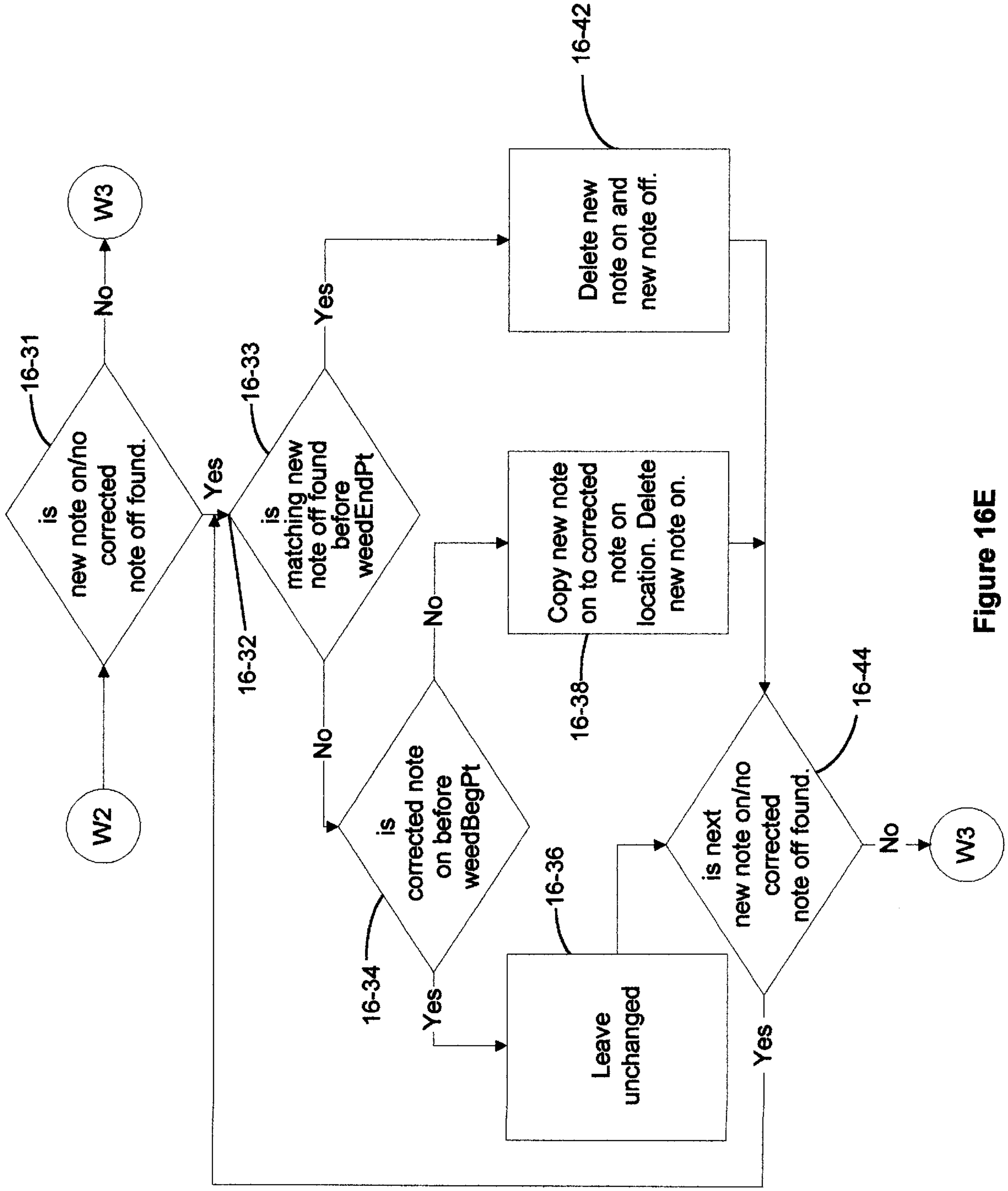

Step 16-13 of FIG. 16D, traces the previously created table on from the beginning, to determine if any row contains a corrected note off event with no corresponding new note on event. If this situation does not exist anywhere in the table, then processing continues to W2 (FIG. 16E). If a first row is found in which there is a corrected note off event and no corresponding new note on event, then this table index is stored and processing continues to step 16-14 (not shown in FIG. 16D). In step 16-14, the storage area is first scanned backwards from the indexed corrected note off event location, to find its corresponding corrected note on event and determined location. This corresponding corrected note on event and location, should always be found, and is stored as corrected note on event and location (correctedOnEventLocation[]). Next in step 16-14, the new note on event column 16-84 (FIG. 16B) is traced on from the beginning of the table to find any new note on event 16-84, having the same absoluteWeedKey value as the indexed corrected note off event. For each found new note on event 16-84, if any, scan the storage area forward from each found new note on event's determined location, to determine each's corresponding new note off event and location. A corresponding new note off event should always be found, and is determined by searching for the first note off event that has a matching note value (FIG. 16A, shown without parenthesis, i.e. 74 ("on event" matches 74 "off event"). Copy each of these found corresponding new note off events, along with each's determined location into an array. Determine which new note off event in the array has the lowest location value or is in effect "closest" to its corresponding new note on event. Store this "closest" new note off event along with its location value in new note off event and location (newOffEventLocation[]). Note, if two or more lowest location values are equal, it does not matter which one of these new note off events and corresponding lowest location values is stored in newOffEventLocation[]. Processing then proceeds to step 16-15 (FIG. 16D).

If in step 16-14 (FIG. 16D), no corresponding new note on event was found having the same absoluteWeedKey value as that of the indexed corrected note off event, then no newOffEventLocation[] could be determined. If this is the case, the indexed corrected note off event should be processed as follows . . . If the location value stored in correctedOnEventLocation[] is greater than the weedBeginningPt value, then delete both the indexed corrected note off event and its corresponding corrected note on event from the storage area, and processing continues to step 16-30 (FIG. 16D). If the location value in correctedOnEventLocation[] is not greater than the weedBeginningPt value, then leave the indexed corrected note off event and its corresponding corrected note on event unchanged in the storage area, and processing continues to step 16-30 (FIG. 16D). It should be noted that some embodiments of the present invention can output and store original performance data (absoluteKeyNumber). Since absoluteKeyNumber is equal to absoluteWeedKey, this stored original performance data may optionally be scanned to determine a location value for newOffEventLocation[].

If processing has proceeded to step 16-15 (FIG. 16D), it is assumed that at least one matching new note on event was found, as described previously, for the indexed corrected note off event. The new note on events(s) that were found, were placed in an array, and a lowest new note off event location value was determined and stored (along with its new note off event) in newOffEventLocation[]. Step 16-15 then checks to see if the newOffEventLocation[] value, is less than the weedEndPt value. If the value is less, then step 16-24 checks to see if the location value in correctedOnEventLocation[], is less than the weedBeginningPt value. If the value is less, then step 16-26 copies the indexed corrected note off event to a storage area location that matches the location stored in newOffEventLocation[]. The original indexed corrected note off event is then deleted from the storage area. If the location value in correctedOnEventLocation[] is not less than the weedBeginningPt value, then step 16-28 deletes the indexed corrected note off event as well as its corresponding corrected note on event from the storage area. Processing then proceeds to step 16-30 (FIG. 16D).

If in step 16-15 (FIG. 16D) the location value in newOffEventLocation[], is not less than the weedEndPt value, then step 16-16 checks to see if the location value in correctedOnEventLocation[] is less than the weedBeginningPt value. If the value is less, then step 16-18 leaves the indexed corrected note off event and its corresponding corrected note on event unchanged in the storage area. If the location value in correctedOnEventLocation[] is not less than the weedBeginningPt value, then step 16-20 deletes both the indexed corrected note off event, and its corresponding corrected note on event, from the storage area. Processing then proceeds to step 16-30 (FIG. 16D).

Step 16-30 of FIG. 16D, traces the table forward from the currently indexed corrected note off event. If a next row in the table is found containing a corrected note off event with no corresponding new note on event, then this new table index is stored, replacing the previous value, and processing loops back to 16-14 where the process repeats. If a next row in the table is not found containing a corrected note off event with no corresponding new note on event, then processing continues to W2 (FIG. 16E).

Figure 16F:
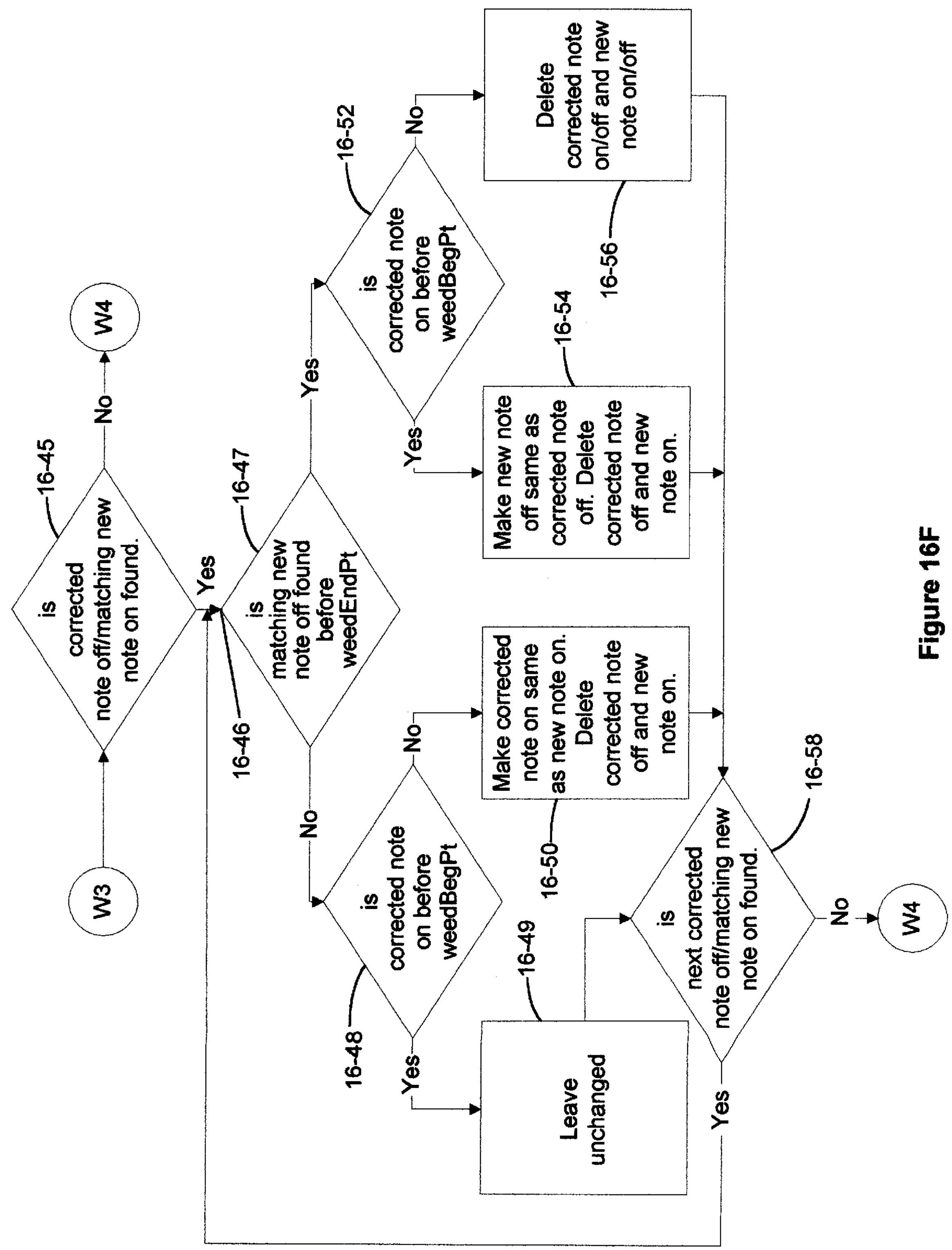

Step 16-31 of FIG. 16E, traces the table on from the beginning to determine if any row contains a new note on event and no corresponding corrected note off event. If this situation does not exist anywhere in the table, then processing continues to W3 (FIG. 16F). If a first row is found in which there is a new note on event with no corresponding corrected note off event, then this table index is stored, replacing any previous value, and processing continues to step 16-32 (not shown in FIG. 16E). In step 16-32, the storage area is first scanned forward from the indexed new note on event location, to determine its corresponding new note off event and location. This corresponding new note off event and determined location should always be found, and is stored as new note off event and location (newOffEventLocation[]), replacing any previously stored value. Next in step 16-32, the corrected note off event column 16-82 (FIG. 16B) is traced on from the beginning of the table to find any corrected note off event 16-82, having the same absoluteWeedKey value as that of the indexed new note on event. For each found corrected note off event 16-82, if any, scan the storage area backwards from each found corrected note off event's location, to determine each's corresponding corrected note on event and location. A corresponding corrected note on event should always be found. Copy each of these found corrected note on events, along with each's determined location into an array. Determine which corrected note on event in the array has the highest location value or is in effect "closest" to its corresponding corrected note off event. Store this "closest" corrected note on event and its location value in corrected note on event and location (correctedOnEventLocation[]), replacing any previously stored value. Note, if two or more highest location values are equal, it does not matter which one of these corrected note on events and corresponding highest location values is stored in correctedOnEventLocation[]. Processing then proceeds to step 16-33 (FIG. 16E).

If in step 16-32 (FIG. 16E), no corresponding corrected note off event was found having the same absoluteWeedKey value as that of the indexed new note on event, then no correctedOnEventLocation[] could be determined. If this is the case, the indexed new note on event should be processed as follows . . . If the location value in newOffEventLocation[] is less than the weedEndPt value, then delete both the indexed new note on event and its corresponding new note off event from the storage area, and processing continues to step 16-44 (FIG. 16E). If the location value in newOffEventLocation[] is not less than the weedEndPt value, then leave the indexed new note on event and its corresponding new note off event unchanged in the storage area, and processing continues to step 16-44 (FIG. 16E). Again, as described previously, stored original performance data may optionally be scanned to determine a location value for correctedOnEventLocation[].

If processing has proceeded to step 16-33 (FIG. 16E), it is assumed that there was at least one found corrected note off event, as described previously, for the indexed new note on event. The found corrected note off event(s) were then placed in an array. The highest corrected note on event location value was determined and stored (along with its corrected note on event) in correctedOnEventLocation[]. Step 16-33 then checks to see if the newOffEventLocation[] value, is less than the weedEndPt value. If the value is less, then step 16-42 deletes the indexed new note on event and its corresponding new note off event from the storage area. Processing then proceeds to step 16-44 (FIG. 16E).

If in step 16-33 (FIG. 16E) the location value in newOffEventLocation[], is not less than the weedEndPt value, then step 16-34 checks to see if the location value in correctedOnEventLocation[] is less than the weedBeginningPt value. If the value is less, then step 16-36 leaves the indexed new note on event and its corresponding new note off event unchanged in the storage area. If the location value in correctedOnEventLocation[] is not less than the weedBeginningPt value, then step 16-38 copies the indexed new note on event to a storage area location that matches the location stored in correctedOnEventLocation[]. The original indexed new note on event is then deleted from the storage area. Processing then proceeds to step 16-44 (FIG. 16E).

Step 16-44 of FIG. 16E, traces the table forward from the currently indexed new note on event. If a next row in the table is found containing a new note on event with no corresponding corrected note off event, then this new table index is stored, replacing the previous value, and processing loops back to 16-32 where the process repeats. If a next row in the table is not found which contains a new note on event and no corrected note off event, then processing continues to W3 (FIG. 16F).

Step 16-45 of FIG. 16F, traces the table on from the beginning to determine if any row contains both a corrected note off event and a new note on event. If this situation does not exist anywhere in the table, then processing continues to W4 (FIG. 16C). If a first row is found in which there is both a corrected note off event and a new note on event, then this table index is stored, replacing any previous value, and processing continues to step 16-46 (not shown).

Step 16-46 first scans the storage area forward from the indexed new note on event's location, to determine its corresponding new note off event and location. This corresponding new note off event and location, should always be found, and is stored as new note off event and location (newOffEventLocation[]), replacing any previously stored value. The storage area is then scanned backwards from the indexed corrected note off event's location, to determine its corresponding corrected note on event and location. This corresponding corrected note on event and location should always be found, and is stored as corrected note on event and location (correctedOnEventLocation[]), replacing any previously stored value. Step 16-47 then checks to see if the location value in newOffEventLocation[], is less than the weedEndPt value. If the value is less, then step 16-52 checks to see if the location value in correctedOnEventLocation[] is less than the weedBeginningPt value. If the value is less, then step 16-54 makes the new note off event in the storage area (corresponding to newOffEventLocation[]) the same as the indexed corrected note off event. The original indexed corrected note off event, and the indexed new note on event, are then deleted from the storage area. If the location value in correctedOnEventLocation[], is not less than the weed-Beginningpt value, then step 16-56 deletes the indexed corrected note off event, as well as its corresponding corrected note on event from the storage area. The indexed new note on event, as well as its corresponding new note off event are also deleted from the storage area. Note, step 16-56 may optionally be handled in two other ways. The first method is to handle step 16-56 the same as step 16-54. When using this first method, step 16-28 (FIG. 16D) may optionally be handled by copying the indexed corrected note off event to the stored location of the new note off event, and then deleting the original indexed corrected note off event. The second method of handling step 16-56, is to make the corrected note on event in the storage area (corresponding to correctedOnEventLocation[]) the same as the indexed new note on event. Then delete the indexed corrected note off event and indexed new note on event from the storage area. Which method(s) to use is based on preference. The method to be used may be based on weedout region size of the current area being edited, for example. Processing then proceeds to step 16-58 (FIG. 16F).

If in step 16-47 (FIG. 16F) the location value in newOffEventLocation[], is not less than the weedEndPt value, then step 16-48 checks to see if the location value in correctedOnEventLocation[] is less than the weedbeginningPt value. If the value is less, then step 16-49 leaves the indexed corrected note off event and its corresponding indexed new note on event unchanged in the storage area. If the location value in correctedOnEventLocation[] is not less than the weedBeginningPt value, then step 16-50 makes the corrected note on event in the storage area (corresponding to correctedOnEventLocation[]), the same as the indexed new note on event. The original indexed corrected note off event, and the original indexed new note on event, are then deleted from the storage area. Processing then proceeds to step 16-58 (FIG. 16F).

Step 16-58 of FIG. 16F, traces the table forward from the currently indexed corrected note off event and new note on event. If a next row in the table is found containing both a corrected note off event and a new note on event, then this new table index is stored, and processing loops back to 16-46 where the process repeats. If a next row in the table is not found containing both a corrected note off event and a corresponding new note on event, then processing continues to W4 (FIG. 16C).

Step 16-8 of FIG. 16C, traces forward from the currentWeedIndex searching for a next corrected note off event or new note on event (1) (with a chordKeyWeed value that is not equal to the currentWeedGroup value). If a next corrected note off event or new note on event is found meeting these criteria, then its index is stored as currentWeedIndex, replacing the previous value. Step 16-4 stores its chordKeyWeed value as currentWeedGroup, replacing the previous value. The weedMidPt, weedBeginningPt, and weedEndPt are then determined and stored as before (using the indexed note event's determined location), replacing all previous values. Step 16-6 places selected note events and their determined locations in a array, replacing all previous values, sorts them, and places them in a table as before, replacing the previous table. Processing then repeats until step 16-8 determines that no more corrected note off events or new note on events (1) (with a chordKeyWeed value that is not equal to the currentWeedGroup value) are found in the event list. The end of the event list has been reached. Step 16-10 then performs an optional cleanup scan. The storage area is first scanned for each note on event. When each note on event is found, the storage area is scanned forward from the location of the note on event to find its corresponding note off event. If no corresponding note off event is found, then the note on event is deleted. The storage area is then scanned for each note off event. When each note off event is found, the storage area is scanned backwards from the location of the note off event to find its corresponding note on event. If no corresponding note on event is found, then the note off event is deleted. Processing then finishes (possibly proceeding to a next selected storage area).

When a recorded or copied current status message or trigger track is played back, it can be slid forward (or backwards) in time. This allows a chord and/or scale change to occur before or after the downbeat of a measure, for example. Sliding it forward will eliminate many of the on-the-fly note corrections heard during a performance. The fundamental note for a previous current chord may be allowed to play through the chord and/or scale change event, for example. On-the-fly note correction can also be improved by implementing the array lastKeyPressTime[] and the attribute currentRunningTime. The attribute currentRunningTime keeps the current running time location of the song, known in the art, and is continuously updated as the song is played back. The array lastKeyPressTime[] holds 128 keys for each of 16 input channels. As each melodyKey is pressed during a performance, its real-time note on location (as determined by the currentRunningTime) is stored in lastKeyPressTime[], updating any previous note on location value. When a chord or scale change is requested during the performance, the weedBeginningRegion setting (16-64 of FIG. 16A) is subtracted from the currentRunningTime on-the-fly, to determine the weedBeginningPt 16-59. If a key is on (1), then this determined weedBeginningPt value is compared with the key's lastKeyPressTime[] value. If the lastKeyPressTime[] value is greater than this determined weedBeginningPt value, then the service CorrectKey() is not called for the key. If the lastKeyPressTime[] value is less than this determined weedBeginningPt value, then the service CorrectKey() is called for the key. This allows autocorrection to be bypassed for a given chord or scale change event, based on real-time note on performance of a particular key. When a user is establishing a chord progression, "misfires" can also occur, in which chord triggers are recorded too closely together. These misfires can be weeded out before performing the weedout function, by deleting a current status message and/or trigger that exists too closely to another one. Its corresponding processed and/or original performance data is first modified appropriately (if needed) in the area of the misfire. The weedout method of the present invention can be implemented in a variety of ways and combinations, as will become apparent to those of ordinary skill in the art.

User Interface 3-2

There is one User Interface object 3-2. The user interface is responsible for getting user input from computer keyboard and other inputs such as foot switches, buttons, etc., and making the necessary calls to the other objects to configure the software as a user wishes. The user interface also monitors the current condition and updates the display(s) accordingly. The display(s) can be a computer monitor, alphanumeric displays, LEDs, etc.

In the present invention, the music administrator object 3-3 has priority for CPU time. The user interface 3-2 is allowed to run (have CPU time) only when there is no music input to process. This is probably not observable by the user on today's fast processors (CPUs). The user interface does not participate directly in music processing, and therefore no table of attributes or services is provided (except the Update() service called by the main object 3-1. The user interface on an embedded instrument will look quite different from a PC version. A PC using a window type operating system interface will be different from a non-window type operating system.

User interface scenarios.

The user tells the user interface to turn the system off. The user interface calls musicAdm.SetNode(0) 3-3 which causes subsequent music input to be directed, unprocessed, to the music output object 3-12.

The user sets the song key to D MAJOR. The user interface 3-2 calls songKey.SetSongKey(D MAJOR) (3-8). All subsequent music processing will be in D MAJOR.

A user assigns a minor chord to key 48. The user interface 3-2 calls config.AssignChord(minor, 48) 3-5. The next time pianoKey[48] responds to a key on, the current chord type will be set to minor.

As a user is performing, the current chord and scale are changed per new keys being played. The user interface monitors this activity by calling the various services of crntChord, crntScale etc. and updates the display(s) accordingly.

Figure 17A:
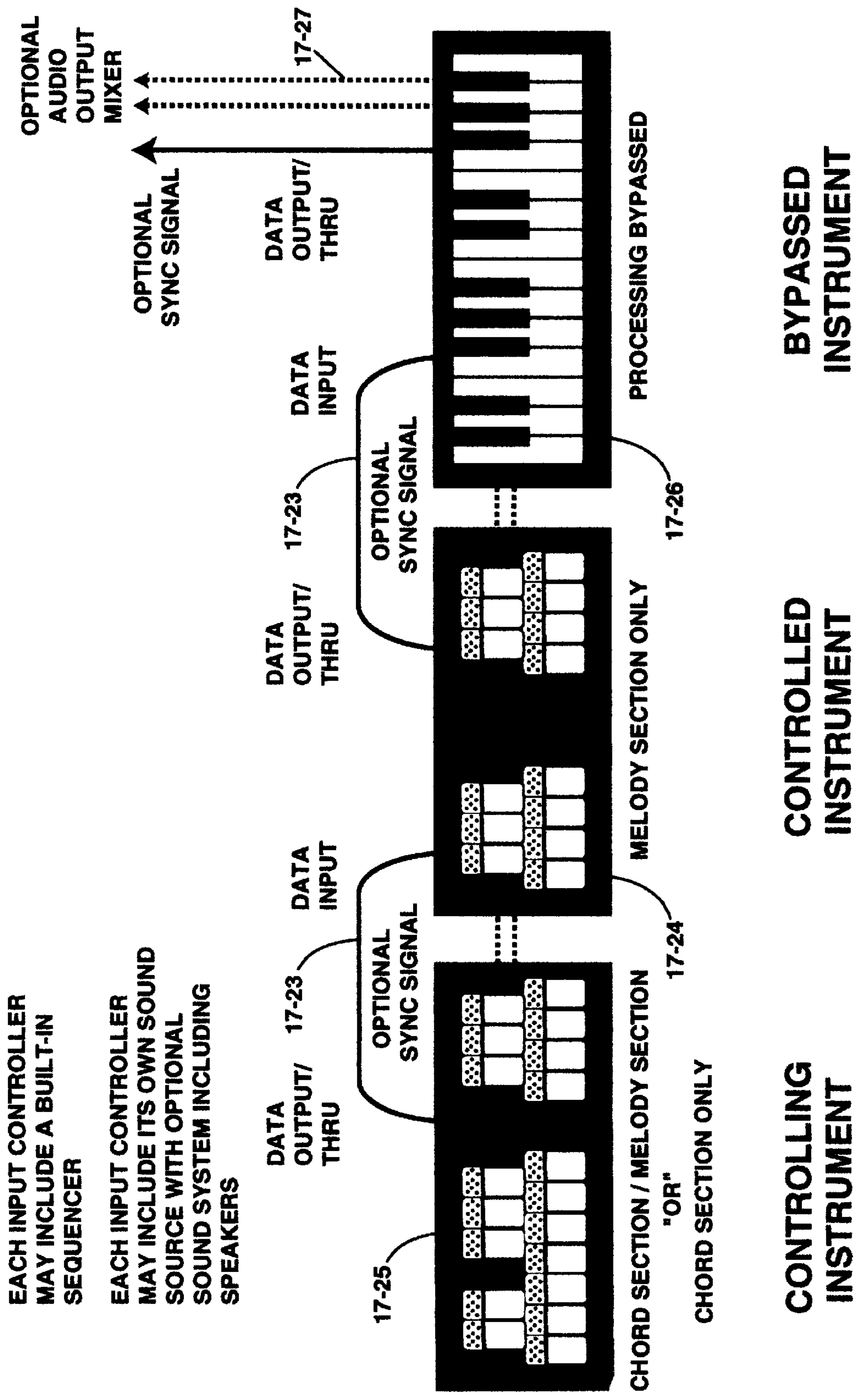
FIG. 17A is a general overview of one embodiment using multiple instruments of the present invention synced or daisy-chained together for simultaneous performance.

FIG. 17A depicts a general overview of one embodiment of the present invention utilizing multiple instruments. Shown, are multiple instruments of the present invention synced or daisy-chained together, thus allowing simultaneous recording and/or playback. Each input controller may include its own built-in sequencer, music processing software, sound source, sound system, and speakers. Two or more sequencers may be synced or locked together 17-23 during recording and/or playback. Common forms of synchronization such as MTC (MIDI time code), SMPTE, or other known forms of sync can all be utilized. Methods of synchronization and music data recording are well known in the art, and are fully described in numerous MIDI-related textbooks, as well as in MIDI Specification 1.0, which is incorporated herein by reference. The configuration shown in FIG. 17A provides the advantage of allowing each user to record performance tracks and/or trigger tracks on their own instrument's sequencer. The sequencers will stay locked 17-23 during both recording and/or playback. This will allow users to record additional performance tracks on their own instrument's sequencer, while staying in sync with the other instruments. The controlled instruments 17-24 can be controlled by data representative of chord changes, scale changes, current song key, setup configuration, etc. being output from the controlling instrument(s) 17-25. This information can optionally be recorded by one or more controlled or bypassed instruments 17-26. This will allow a user to finish a work-in-progress later, possibly on their own, without requiring the controlling instrument's 17-25 recorded trigger track. Any one of the instruments shown in FIG. 17A can be designated as a controlling instrument 17-25, a controlled instrument 17-24, or a bypassed instrument 17-26, as described herein.

In FIG. 17A, if an instrument set to controlled mode 17-24 or bypassed mode 17-26 contains a recorded trigger track, the track may be ignored during performance, if needed. The instrument may then be controlled by a controlling instrument 17-25, such as the one shown. An instrument set to controller mode 17-25 which already contains a recorded trigger track, can automatically become a controlled instrument 17-24 to its own trigger track. This will allow more input controllers on the instrument to be utilized for melody section performance. Processed and/or original performance data, as described herein, can also be output from any instrument of the present invention. This will allow selected performance data to be recorded into another instrument's sequencer 17-23, if desired. It may also be output to a sound source 17-27. Selected performance data from one instrument, can be merged with selected performance data from another instrument or instruments 17-23. This merged performance data 17-23 may then be output from a selected instrument or instruments 17-27. The merged performance data 17-23 may also be recorded into the sequencer of another instrument, if desired. The instruments shown in FIG. 17A, can provide audio output by utilizing an internal sound source. Audio output from two or more instruments of the present invention can also be mixed, such as with a digital mixer. It may then be output 17-27 from a selected instrument or instruments utilizing a D/A converter or digital output.

Figure 17B:
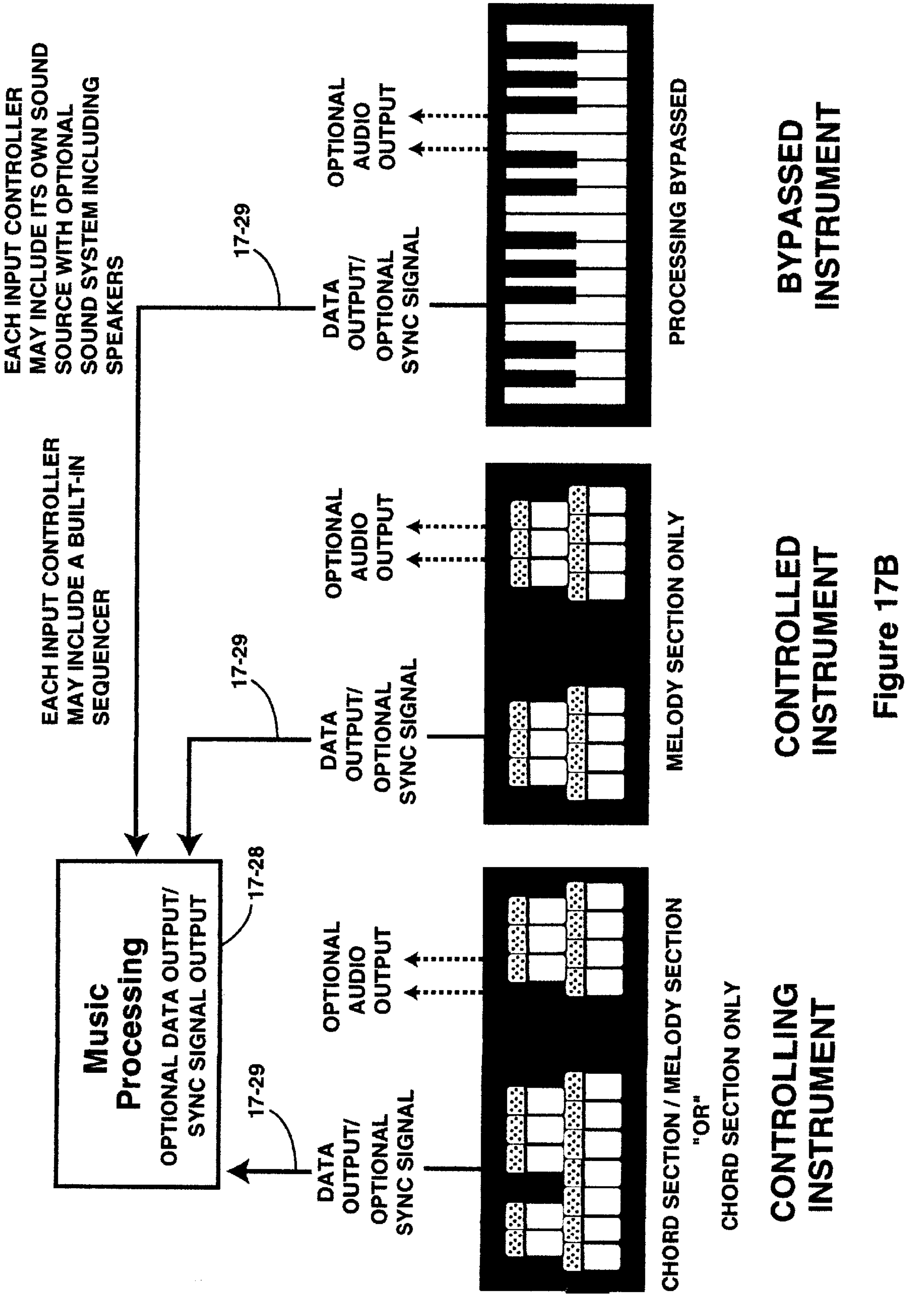
FIG. 17B is a general overview of one embodiment in which multiple instruments of the present invention are used together with an external processor for simultaneous performance.

FIG. 17B depicts a general overview of another embodiment of the present invention utilizing multiple instruments. Shown, are multiple instruments of the present invention being utilized together with an external processor 17-28, thus allowing simultaneous recording and/or playback. Optional syncing, as described previously, may also be used to lock one or more of the instruments to the external processor 17-29, during recording and/or playback.

Figure 17C:
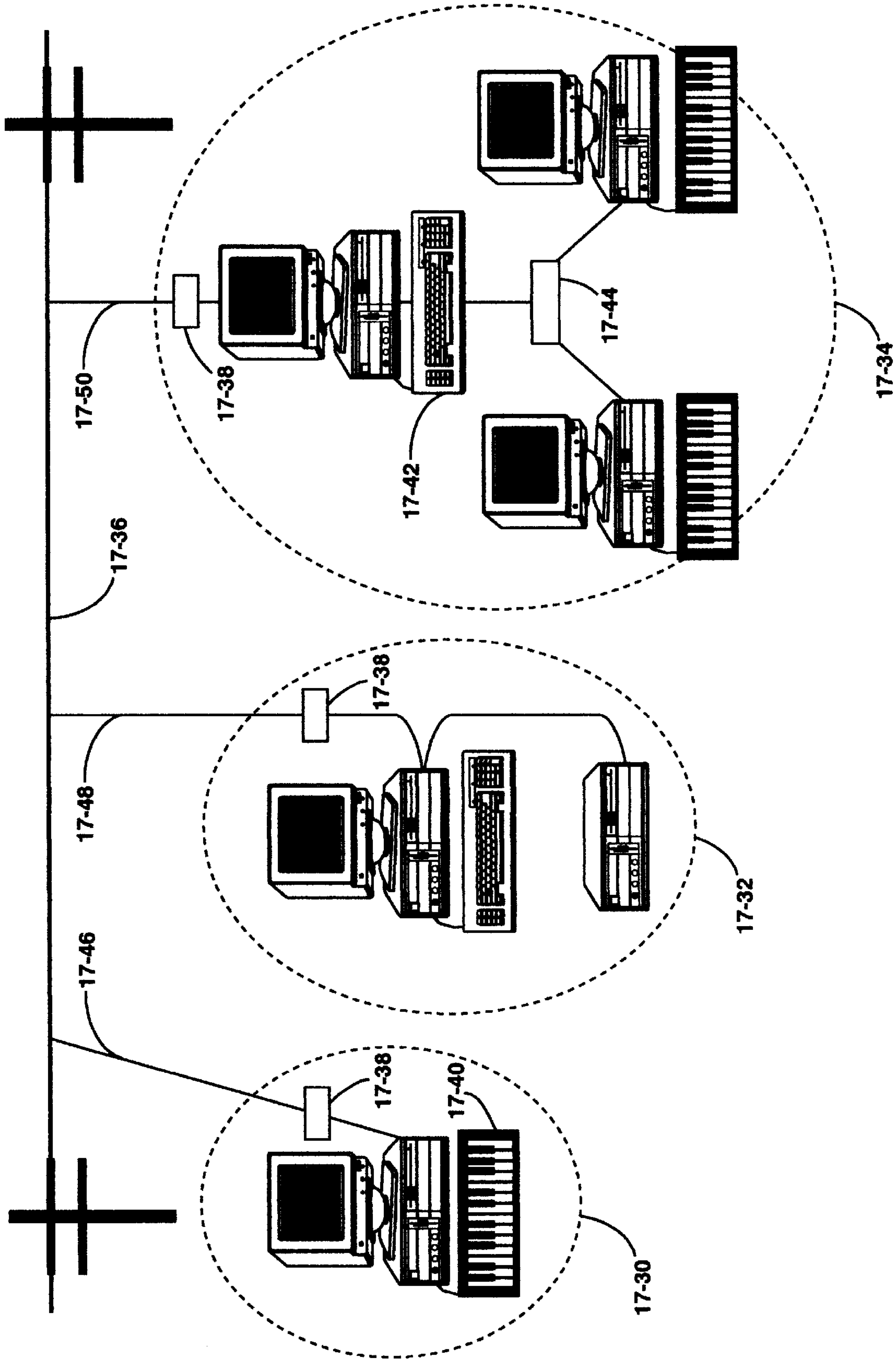
FIG. 17C is a general overview of one embodiment in which multiple instruments of the present invention are utilized together in a network.

FIG. 17C depicts a general overview of another embodiment of the present invention utilizing multiple instruments.

Shown, are multiple instruments of the present invention being utilized in a network 17-30, 17-32, and 17-34, such as the Internet, for example. Each of the instruments of the present invention shown may include its own software, and/or may share a program or programs. Methods of communicating or transmitting data or messages in networks 17-36 and 17-50, as well as various types of networks and network protocols, are well known in the art. All data described herein by the present invention can utilized in a network. Data such as original performance data, processed performance data, data representative of at least a chord or scale change, channel or instrument identifier data, pitch bend data, etc. may all be utilized in a network, and in a variety of ways and combinations. This allows a musical performance to be generated in a network using multiple instruments of the present invention. The users who are performing the music, can also be non-localized, meaning that they can exist in separate localities.

Networks comprise "nodes" FIG. 17C 17-30, 17-32, and 17-34 (shown in this example as various forms of computers). A node can communicate with another node, by passing data or messages between nodes. The data or messages are passed between nodes using various types of communication "links", such as between communication nodes, local area networks (LANs), wide area networks (WANs), etc. As one example, 17-34 comprises nodes which are connected utilizing a hub 17-44 to form a LAN 17-34, and additional nodes shown 17-30 and/or 17-32 can be connected to 17-34 using various communication means to form a WAN. Communication means for connecting nodes in a network, such as the means shown by 17-46, 17-48, 17-50, and 17-36 are well known and may include telephone lines, fiber optics, infrared, microwave, satellite, wireless devices, cables, etc. Various types of modems and/or routers 17-38 are also commonly used, and are readily available from numerous vendors. A variety of input controller types as described herein, including those shown by 17-40 and 17-42, can be utilized for musical performance in a network. Inputs can be provided from a computer monitor, such as by clicking a mouse, or by utilizing touch-sensitive displays, etc. A variety of input devices, as described herein, may be utilized by the present invention for sounding notes. An input controller which is used to complete the musical instrument of the present invention may optionally include its own communication means for connecting to a network. A communication means may be incorporated into the input controller, or may be provided for use with the input controller to complete one embodiment of the musical instrument of the present invention. As one example, a music keyboard may include its own communication means, thus making it in effect a node as described herein.

One way of utilizing the instruments and methods of the present invention in a network, is through the use of multicast message distribution or "relaying" of data. Multicast message distribution is well known in the art, and in one of its common usages, takes the form of Internet Relay Chat (IRC). IRC is a user-to-user form of communication. It allows interactive, text-based conversations to be had by two or more users in real-time over a network. Normally, a user will enter a specific "chat room" which is of interest to the user. As each individual in the chat room types a message and submits it, each message can be relayed to selected users in the room, and displayed on each selected user's display device. Multicast message distribution can be combined with the methods of the present invention, thus allowing users to create professional music over a network, with no training required. For purposes of clarification, the words messages and data are used interchangeably herein. Also, a "portion" of data can mean any combination(s) of messages, any portion(s) of a message, or any and all combinations of these.

One example of the use of multicast message distribution with the present invention, is to use one or more servers 17-32 for relaying messages. The server(s) may optionally comprise a recording or storage device, known in the art, such as a sequencer for example. The recording or storage device may be used to record or store data comprising musical data, as described herein. Users can perform music from various nodes on the network 17-30, 17-34, and/or 17-32. A user may enter a specific "music room" based on the user's interest. An interest may be in that of a particular music style, and/or choice of an instrument or instruments to perform, etc. Each user in the music room can be designated to play a particular instrument or instruments, thus forming a musical group. One or more users in the room may perform using a "bypassed instrument" as described herein, thus allowing drum play, traditional play, etc. Playback can then be initiated from the server's recording and/or storage device, to provide data representative of chord and/or scale changes, etc. As each user in the room plays their instrument, various combinations of data as described herein is output and provided to the server. It is then processed according to the previously said chord and scale change data provided by the server's 17-32 storage device. Selected data, such as data representing note on/offs, channel and/or instrument identifiers, pitch bend, etc. is then relayed in real-time to selected users in the music room. A compiled processed performance can then be heard by one or more users, through the use of each user's respective node 17-30, 17-34, and/or 17-32, and its corresponding sound source, if any. A speaker system may also be used to provide sound for several nodes, if preferred.

An improvement to the previously described performance example, is to allow a completely "live" music session, which uses no prerecorded data. To accomplish this, one or more users in a music room, will lead the session by providing data representative of chord and/or scale changes during their performance. Data is then processed by the server and/or node computers, selected data relayed to various nodes, and a compiled processed performance is then heard by one or more users in the music room, as described previously. Any individual node may comprise its own recording and/or storage device, such as a sequencer, etc. The recording and/or storage device may be used to record and/or store data comprising musical data. This will allow one or more users to save a music session. A user or users can then complete a music session later, possibly on their own. Selected data may also be recorded or stored by a user and/or non-user on a network. One or more various individuals, such those on a network, may then be allowed access to the selected data. This data may be allowed access for purposes such as song completion, editing, review, download, etc. One or more nodes may also broadcast a compiled performance, such as by using radio waves, and other means known in the art. The compiled performance can be broadcast to a receiver or receivers which may be connected to one or more sound sources. One or more sound sources can correspond to one or more nodes on the network. This will allow a user who is performing music utilizing a node, to hear a compiled processed performance. Any sound source or receiver, as described previously, may or may not be connected directly to any given node on the network. This allows musical playback to a user, utilizing resources outside of the network. Those of ordinary skill in the art will recognize that many network scenarios, protocols, and implementations of the methods described herein may be utilized, and will become apparent to those of ordinary skill in the art.

A method of multicast message distribution, as well as various network systems, and means of providing data or messages in a network system, of the type that can be used to create music in a network as described herein are described in U.S. Pat. No. 4,864,559, incorporated herein by reference.

Many modifications and variations may be made in the embodiments described herein and depicted in the accompanying drawings without departing from the concept and spirit of the present invention. Accordingly, it is clearly understood that the embodiments described and illustrated herein are illustrative only and are not intended as a limitation upon the scope of the present invention.

For example, utilizing the techniques described herein, the present invention may easily be modified to send and receive a variety of performance identifiers. Some of these may include current note group setup identifiers, current octave setting identifiers, shifting identifiers which indicate a current shifting position, "link" identifiers which identify one or more melody keys as being linked to the chord section during a given performance, relative chord position identifiers (i.e. 1-4-5), identifiers which indicate a performance as a melody section performance or a chord section performance, and identifiers which indicate a performance as being that of a bypassed performance. These identifiers may be sent and stored with each original and/or processed performance track, or may be derived as preferred, etc. Those of ordinary skill in the art will recognize that the previously said events can be identified in a variety of ways. Event identification can be utilized in many different combinations depending on the specific embodiment of the present invention. For example, current note group setup identifiers, chord section/melody section performance identifiers, bypassed performance identifiers, relative chord position identifiers, and shifting identifiers can all be used with the re-performance methods described herein. This will allow any stored data to be re-performed as intended.

The performance function of the present invention was described herein using one illustrative example. A variety of mapping scenarios can also easily be accomplished. For example, mapping may be predetermined manually or automatically by assigning a map identifier to each original performance input 15-2 (FIG. 15) in a given musical piece. The map identifier is then read during re-performance to provide routing, thus allowing each separate original performance input to be routed to any re-performance key. Maps may also be created on-the-fly which vary dynamically. This will allow performance of a musical piece to be accomplished without requiring redundant consecutive key depressions, for example. Running totals can be kept, and appropriate routings can be provided as needed. Consecutive inputs which are identical, may be allowed redundant performance from the same key, if preferred. The previously described mapping techniques can also allow each musical piece to be optimized for each different skill level available to a user for re-performance. Each musical piece can also be optimized for re-performance on a variety of different instruments as well. A re-performance utilizing methods of the present invention, can be accomplished using any chosen number of keys. However, four keys or more are preferred for re-performance, to allow a user to feel an interaction with the instrument. A further reduction in skill level can also be accomplished by routing "quick" or "difficult" to play musical passages to one or more keys. When the user holds down the said key or keys, the entire quick musical passage will be output automatically. This will allow the user to avoid having to perform these difficult passages. With minor modification, a sustained indicator can also be provided for any key with a currently routed difficult passage. The indicator will signify that a difficult passage is currently being routed to a key. A user will then know to keep that key depressed for the full indication period, in order to perform the difficult passage. It should be noted that the recorded status message may also be used to identify the chord (fundamental and type) to be performed from a given input controller. An identifier (=absoluteKeyNumber) is encoded into each status message during initial recording. It is then read during re-performance to determine which key to arm, and the identifier (note value) is placed in armedkey[] array. The original performance inputs may be used to provide the indications for the armed key. Also, the performance function of the present invention may optionally be used without the trigger data as described herein. However, initiating chord and scale changes during a performance allows a substantial increase in system flexibility, as well as provides professional results.

The present invention may also use a different range or different ranges than the 54–65 range described herein, as the basis for note generation, chord voicing, and scale voicing. Also, although the present embodiment designates keys 0–59 as the chord progression section, and 60–127 as the melody section, a variety of ranges can be used for a single instrument, as well as for each instrument in a multiple instrument group. The split point of the chord section and melody section can be set differently from the independent shifting ranges of the chord section and melody section for increased flexibility on various systems. Chords in the chord progression section can be set to sound in a different octave than described herein. The preferred embodiment allows chords in the chord progression section to be shifted up or down by octaves with a footswitch, etc., instead of splitting the chord progression section into multiple groups and allowing each group to be sounded in a different octave when played. This was done so that the keys could be allocated for making more chord types available to a user, or for possibly even making more than one song key available simultaneously to a user. Multiple groups may, however, be made to sound in different octaves if needed by simply following the procedures set forth herein for chords in the melody section. Even more chord types may be made available by pressing multiple keys. For example, holding down combinations of keys in the chord progression section such as 1, 1+2, 1+2+3, 1+2+3+4, known in the art, may each sound a different chord type providing many more chord types to the user. The same system can be used to trigger different inversions of each chord, or even to sound a specific note, combination of notes, or no notes of the chosen chord. When using multiple key presses, the programmer has the option of which combination or combinations shall output a current status message and/or trigger as described herein.

Since current status messages and/or triggers described herein are used to initiate at least chord or scale changes, among a variety of other things, they may be referred to as data representative of at least a chord change and/or scale change. Those of ordinary skill in the art will recognize that the data representative of at least a chord change or scale change as described herein can be provided in a variety of ways. As one example, current chord and/or current scale notes may be generated based on a note group such as a non-scale note group. Data representative of at least a chord and/or scale change can be provided in varying combinations from a recording and/or storage device, from live inputs by a user, or by utilizing a variety of identifers, etc., all of which will become readily apparent to those of ordinary skill in the art. Individual chord notes may also be assigned to individual input controllers in the chord progression section by calling the appropriate chord note mode as described herein. This will allow users to sound each individual note in a chord from separate input controllers in the chord progression section while establishing a chord progression, and while simultaneously making available scale notes, non-scale notes, chords, etc. in the melody section. Each individual chord note may also be set to output a current status message and/or trigger as described herein.

The preferred embodiments of this invention were described using MIDI specifications, although any adequate protocol can be used to accomplish the results described herein. This can be done by simply carrying out all processing relative to the desired protocol. Therefore, the disclosed invention is not limited to MIDI only. Also, a foot pedal, buttons, and/or other input controllers may be used instead of the key depressions as described herein to change song keys, scales, inversions, and modes, and also for general performance or for playing the chord progression.

Any chord type or scale may be used including modified, altered, or partial scales, and any scale may be assigned to any chord by a user. Chord and scale notes to be sounded by a user during a performance can be defined in many ways. Multiple scales and chord voicings may also be made available simultaneously. The preferred embodiment describes how to derive inversions 1,2,3,4 and popular voicing of each chord, although any specific inversion or chord voicing can be derived using these methods, and in any octave. Additional notes may also be output for each chord to create fuller sound, such as outputting an additional fundamental note which is one octave below the original fundamental, outputting scalic and chordal harmony notes, etc. Also, although chord notes in the preferred embodiment are output with a shared common velocity, it is possible to independently allocate velocity data for each note to give chords a "humanized" feel. In addition to this velocity data allocation, other data such as different delay times, polyphonic key pressure, etc. may also be output. Also, the chord assignments for the current song key in the chord progression section were based on the Major scale, even though any scale or scales such as blues, relative minor, modified scales, partial scales (ex. 1-4-5 only), scales with different roots, etc. can easily be used. A variety of methods can be used, so long as the note or notes assigned to be performed from a particular input controller, make up a chord which is representative of the correct chord number and song key corresponding to said input controller. The chord number being based on the song key's customary scale or customary scale equivalent.

Chord groups in the chord progression section can be made available in any order and labeled according to preference. Non-scale chords and/or chord group indicators were provided using the "#" symbol and appropriate relative position number. Any other symbols or indicators will do such as color coding, providing various icons, or titling a group with a name, such as non-scale, etc. so long as it is adequately conveyed to a user a chord or chord group's scale or non-scale status.

A specific relative position indicator may also be used to indicate an entire group of input controllers when each input controller in the group plays an individual chord note of a specific chord in the chord progression, such as all of the notes of a "1" chord, etc. It should be noted that the indicators described herein can be used to benefit any system in which chord progressions are to be performed from a chord progression section of the instrument, including any systems which may provide data representative of chord and scale changes. Indicator methods described herein can also be used to improve any system where at least one song key is selected for the chord progression section.

Key labels in the present invention used only sharps (#) in order to simplify the description. These labels can easily be expanded using the Universal Table of Keys with the appropriate formulas, 1-b3-5, etc., which is known in the art. It should also be noted that all processed output may be shifted by semitones to explore various song keys, although all labels will need to be transposed accordingly. The current status message can optionally be transposed accordingly depending on the system implementation being used.

Duplicate chord notes may be eliminated, if preferred. Indicators for specific chord notes, such as the fundamental and/or alternate, can be provided to a user in a variety of ways.

For example, fund. and alt., 1 and 5, or through other indicators which may be accommodated by an explanation in a manual, etc. They may also be provided through a variety of other means such as those described herein.

In the preferred embodiment, 7 positions are allocated for the fixed scale location. Notes are sorted from lowest to highest and then the highest is duplicated if needed. Although this is the preferred method, any number of positions can be allocated to accommodate different scale sizes. Scale notes can be made available in any order, and without note duplication, if preferred. Scales may be made available with the root note in the first position, for example. Scale notes can also be arranged based on other groups of notes next to them. This is useful when scale note groups and remaining non-scale note groups are made available next to each other or in the same approximate location. Each scale and non-scale note is located in a position so as to be in closest proximity to one another. This will sometimes leave blank positions between notes which may then be filled with duplicate(s) of the previous lower note or next highest note or both, etc. These same rules apply for the remaining non-scale note groups and remaining scale note groups described herein. Any number of positions can be allocated to them and in any order. The scale note groups, combined scale note groups, individual chord note groups, chord inversion/voicing groups, remaining scale note groups, remaining non-scale note groups, and various harmony groups for each of these described groups, can be made available to a user in separate groups or together in any combination of groups based on preference and on the capabilities of the instrument on which these methods are employed. The locations of these groups are not to be limited to the locations described herein, with scale notes on the white keys and chord notes on the black keys. Any group or groups may be located anywhere on the instrument, and even broken up if need be. Futuristic instruments may have the ability to make many of the groups available simultaneously, including the right hand chords, block notes, thirds, etc. They may also use input controllers such as pads, buttons, or other devices which do not make-use of traditional keys at all. All methods described herein will work on these futuristic instruments regardless of the type of input controller they utilize and should be protected by the claims described herein, including input controllers which may provide as its input, multiple signals or inputs allowing chord progression notes and chords to be sounded at a different time than actual note generation and/or assignments take place.

The preferred embodiment also describes a means of switching between two different song keys, and also a means of switching between two different scales for each current chord. By using the teachings described herein, a person of average skill in the art can easily expand these to more than just two each.

In the preferred embodiment, the chord progression section and the melody section can be made to function together or separately. It may also be useful to make the chord progression section and the first octave of the melody section to function together and independently of the rest of the melody section. Since the first octave of the melody section may often times sound notes which are in the same octave as notes sounded in the chord progression section, this may prove useful in certain circumstances. Functions such as octave shifting, full range chords, etc. can all be applied to the chord progression section and first melody octave, independently of the functioning of the rest of the melody section. It may also be useful to make various modes and sections available by switching between them on the same sets of keys. For example, switching between the chord progression section and first melody octave on the same set of keys, or between scale and non-scale chord groups, etc. This will allow a reduction in the amount of keys needed to effectively implement the system. Separate channels may be assigned to a variety of different zones and/or note groups, known in the art. This allows a user to hear different sounds for each zone or note group. This can also apply to the trigger output, original performance, and harmony note output as well.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

I claim:

1. A method for sounding notes on an electronic instrument, the instrument having a plurality of input controllers, the method comprising the steps of:

providing in a given performance a plurality of indications for a plurality of input controllers, wherein each/or said indications indicates to a user where the user should physically engage the instrument to provide musical data, said musical data containing note-identifying information, and wherein at least a portion of said note-identifying information is provided based on stored musical data;

providing a first instance of indication for a first input controller, wherein said first instance of indication indicates to a user where the user should physically engage the instrument to provide first musical data, said first musical data containing first note-identifying information which identifies a first note or a first group of notes, and wherein said first musical data is provided in response to a first selection and deselection of said first input controller; and providing additional instances of indication for said first input controller, wherein during at least one of said additional instances of indication additional musical data is provided in response to another selection and deselection of said first input controller, said additional musical data containing note-identifying information which identifies at least one note that is different from said first note or from at least one note in said first group of notes identified by said first note-identifying information.

2. A method for sounding notes on an electronic instrument, the instrument having a plurality of input controllers, the method comprising the steps of:

providing in a given performance a plurality of indications for a plurality of input controllers, wherein each of said indications indicates to a user where the user should physically engage the instrument for providing musical data, said musical data containing note-identifying information, and wherein at least a portion of said note-identifying information is provided based on stored musical data;

providing a first instance of indication for a first input controller, wherein said first instance of indication indicates to a user where the user should physically engage the instrument to provide first musical data, said first musical data containing first note-identifying information which identifies a first note or a first group of notes, and wherein said first musical data is provided in response to a first selection and deselection of said first input controller; and providing additional instances of indication for said first input controller, wherein during at least one of said additional instances of indication additional musical data is provided in response to another selection and deselection of said first input controller; said additional musical data containing note-identifying information which identifies at least one note that is different from said first note or from at least one note in said first group of notes identified by said first note-identifying information.

3. The method of claim 2, further comprising the step of varying the number of input controllers needed to effect the given performance.

4. The method of claim 2, further comprising the step of selectively varying harmony note output in the given performance.

5. The method of claim 4, further comprising the step of providing for said first input controller an indicator representative of a fundamental chord note.

6. The method of claim 2, wherein note-identifying information provided utilizing said first input controller identifies chords only, said chords being in accordance with either a previous current chord, a present current chord, or a subsequent current chord in the given performance.

7. The method of claim 6, wherein each of said chords represents the same relative position as defined by at least one current song key corresponding to said first input controller.

8. A method for sounding notes utilizing two or more connected electronic instruments, each instrument having a plurality of input controllers, the method comprising the steps of:

providing first musical data utilizing a first input controller on a first connected instrument, wherein said first musical data includes first note-identifying information identifying one or more chord notes, and wherein said first musical data is provided in response to a selection and deselection of said first input controller;

providing second musical data utilizing a second input controller on said first connected instrument, wherein said second musical data includes second note-identifying information identifying one or more chord notes, and wherein said second musical data is provided in response to a selection and deselection of said second input controller;

in at least one of said steps of providing first musical data or providing second musical data, providing additional musical data utilizing an additional input controller on said first connected instrument, wherein said additional musical data includes additional note-identifying information identifying either one or more chord notes, one or more scale notes, or one or more chord notes and one or more scale notes, and wherein at least a portion of said additional note-identifying information is provided in accordance with a real-time event representative of at least a chord change or scale change, said real-time event initiated in at least one of said steps of providing first musical data or providing second musical data;

providing data representative of bypassed musical data utilizing at least one input controller on a second connected instrument, wherein said data representative of bypassed musical data includes note-identifying information identifying a note to be sounded which is in accordance with that of a regular keyboard; and providing data representative of either chord changes, scale changes, or chord and scale changes.

9. The method of claim 8, further comprising the step of providing for at least said first input controller at least one relative chord position indicator which indicates the relative position of a chord as it relates to a corresponding song key.

10. The method of claim 9, wherein said relative chord position indicator is representative of a non-scale chord.

11. The method of claim 9, further comprising the step of selecting a song key corresponding to said first input controller, said second input controller, and said additional input controller, wherein said note-identifying information is adjusted in accordance with said song key selection.

12. The method of claim 11, wherein said song key selection represents the Circle of 4ths or Circle of 5ths.

13. The method of claim 9, wherein said first input controller and said second input controller each sound the same chord type but with a different inversion.

14. The method of claim 9, wherein said first input controller and said additional input controller each sound the same chord type but with a different inversion.

15. The method of claim 9, further comprising the step of providing for said additional input controller an indicator representative of a fundamental chord note.

16. The method of claim 9, wherein said note-identifying information of said first input controller and said note-identifying information of said additional input controller can each be shifted independently of the other.

17. The method of claim 9, wherein said first input controller, said second input controller, and said additional input controller are those on a standard MIDI keyboard, wherein the note range of said MIDI keyboard is divided into at least two ranges, said first input controller and said second input controller included in one range, and said additional input controller included in another range.

18. A method for sounding notes utilizing three or more connected electronic instruments, each instrument having a plurality of input controllers, the method comprising the steps of:

providing first musical data utilizing a first input controller on a first connected instrument, wherein said first musical data includes note-identifying information identifying one or more chord notes, and wherein said first musical data is provided in response to a selection and deselection of said first input controller;

providing second musical data utilizing a second input controller on said first connected instrument, wherein said second musical data includes note-identifying information identifying one or more chord notes, and wherein said second musical data is provided in response to a selection and deselection of said second input controller;

in at least one of said steps of providing first musical data or providing second musical data, providing additional musical data utilizing a first input controller on a second connected instrument, wherein said additional musical data includes note-identifying information identifying either one or more chord notes, one or more scale notes, or one or more chord notes and one or more scale notes, and wherein at least a portion of said note-identifying information is provided in accordance with a real-time event representative of at least a chord change or scale change, said real-time event initiated in at least one of said steps of providing first musical data or providing second musical data;

providing data representative of bypassed musical data utilizing at least one input controller on a third connected instrument, wherein said data representative of bypassed musical data includes note-identifying information identifying a note which is in accordance with that of a regular keyboard;

selecting a song key corresponding to said first input controller, said second input controller, and said first input controller on said second connected instrument, wherein said note-identifying information is adjusted in accordance with said song key selection; and providing data representative of either chord changes, scale changes, or chord and scale changes.

19. A method for sounding notes utilizing three or more connected electronic instruments and a common processing means, each instrument having a plurality of input controllers, the method comprising the steps of:

providing first musical data utilizing a first input controller on a first connected instrument, wherein said first musical data includes note-identifying information identifying one or more chord notes, and wherein said first musical data is provided in response to a selection and deselection of said first input controller;

providing second musical data utilizing a second input controller on said first connected instrument, wherein said second musical data includes note-identifying information identifying one or more chord notes, and wherein said second musical data is provided in response to a selection and deselection of said second input controller;

in at least one of said steps of providing first musical data or providing second musical data, providing additional musical data utilizing a first input controller on a second connected instrument, wherein said additional musical data includes note-identifying information identifying either one or more chord notes, one or more scale notes, or one or more chord notes and one or more scale notes, and wherein at least a portion of said note-identifying information is provided in accordance with a real-time event representative of at least a chord change or scale change, said real-time event initiated in at least one of said steps of providing first musical data or providing second musical data;

providing data representative of bypassed musical data utilizing at least one input controller on a third connected instrument, wherein said data representative of bypassed musical data includes note-identifying information identifying a note which is in accordance with that of a regular keyboard;

selecting a song key corresponding to said first input controller, said second input controller, and said first input controller on said second connected instrument, wherein said note-identifying information is adjusted in accordance with said song key selection; and providing data representative of either chord changes, scale changes, or chord and scale changes.

20. The method of claim 19, wherein said relative chord position indicator is representative of a non-scale chord.

21. The method of claim 19, wherein a stored performance originally effected from said first input controller and said first input controller on said second connected instrument can each be identified for re-performance purposes.

22. A method for sounding notes utilizing two or more connected electronic instruments and a common processing means, each instrument having a plurality of input controllers, the method comprising the steps of:

providing first musical data utilizing a first input controller on a first connected instrument, wherein said first musical data includes note-identifying information identifying either one or more chord notes, one or more scale notes, or one or more chord notes and one or more scale notes, and wherein at least a portion of said note-identifying information is provided in accordance with a real-time event representative of at least a chord change or scale change;

providing data representative of bypassed musical data utilizing at least one input controller on a second connected instrument, wherein said data representative of bypassed musical data includes note-identifying information identifying a note which is in accordance with that of a regular keyboard;

selecting a song key corresponding to said first input controller, wherein said note-identifying information is adjusted in accordance with said song key selection; and providing data representative of either chord changes, scale changes, or chord and scale changes.

* * * * *